US008963951B2

(12) United States Patent
Tsurumi

(10) Patent No.: US 8,963,951 B2
(45) Date of Patent: Feb. 24, 2015

(54) IMAGE PROCESSING APPARATUS, MOVING-IMAGE PLAYING APPARATUS, AND PROCESSING METHOD AND PROGRAM THEREFOR TO ALLOW BROWSING OF A SEQUENCE OF IMAGES

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 1012 days.

(21) Appl. No.: 12/524,757

(22) PCT Filed: Aug. 22, 2008

(86) PCT No.: PCT/JP2008/064992
§ 371 (c)(1),
(2), (4) Date: Jul. 28, 2009

(87) PCT Pub. No.: WO2009/028413
PCT Pub. Date: Mar. 5, 2009

(65) Prior Publication Data
US 2010/0097398 A1    Apr. 22, 2010

(30) Foreign Application Priority Data

Aug. 24, 2007  (JP) ................................ 2007-219093
Dec. 7, 2007   (JP) ................................ 2007-317767

(51) Int. Cl.
*G09G 5/00*    (2006.01)
*H04N 5/14*    (2006.01)
(Continued)

(52) U.S. Cl.
CPC .............. *H04N 5/144* (2013.01); *G06T 3/4038* (2013.01); *G06T 19/006* (2013.01);
(Continued)

(58) Field of Classification Search
CPC .............. G06T 19/006; G06T 2340/12; G06T 2340/125; G06T 3/0087; G06T 3/4038; G06T 3/0075; G06T 3/0093; H04N 5/144; H04N 5/23238
USPC .......... 345/474–474, 629, 633, 634; 382/195, 382/255, 284, 13–107
See application file for complete search history.

(56) References Cited

U.S. PATENT DOCUMENTS 5,469,274 A   11/1995  Iwasaki et al.
5,649,032 A    7/1997  Burt et al.
(Continued)

FOREIGN PATENT DOCUMENTS

JP    5 260264    10/1993
JP    9 626861     3/1997
(Continued)

OTHER PUBLICATIONS

U.S. Appl. No. 12/565,499, filed Sep. 23, 2009, Tsurumi.
(Continued)

*Primary Examiner* — Jin-Cheng Wang
(74) *Attorney, Agent, or Firm* — Oblon, Spivak, McClelland, Maier & Neustadt, L.L.P.

(57) ABSTRACT

To allow a viewer to easily understand the details of a moving image shot by an image capturing apparatus in the case where the moving image is browsed. A camerawork detecting unit 120 detects the amount of movement of an image capturing apparatus at the time of shooting a moving image input from a moving-image input unit 110, and, on the basis of the amount of movement of the image capturing apparatus, calculates affine transformation parameters for transforming an image on a frame-by-frame basis. An image transforming unit 160 performs an affine transformation of at least one of the captured image and a history image held in an image memory 170, on the basis of the calculated affine transformation parameters. An image combining unit 180 combines, on a frame-by-frame basis, the captured image and the history image, at least one of which has been transformed, and causes the image memory 170 to hold a composite image. The composite image generated by the image combining unit 180 is displayed on a display unit 191.

29 Claims, 58 Drawing Sheets

(51) Int. Cl.
*G06T 7/00* (2006.01)
*G11B 27/034* (2006.01)
*G11B 27/10* (2006.01)
*G11B 27/28* (2006.01)
*G11B 27/32* (2006.01)
*G11B 27/34* (2006.01)
*G06T 3/40* (2006.01)
*G06T 19/00* (2011.01)
*H04N 5/232* (2006.01)
*G06T 3/00* (2006.01)

(52) U.S. Cl.
CPC .......... *H04N 5/23238* (2013.01); *G06T 3/0087* (2013.01); *G06T 3/0075* (2013.01); *G06T 3/0093* (2013.01); *G06T 7/0028* (2013.01); *G11B 27/034* (2013.01); *G11B 27/105* (2013.01); *G11B 27/28* (2013.01); *G11B 27/322* (2013.01); *G11B 27/34* (2013.01); *G11B 2220/2541* (2013.01)
USPC ........... 345/629; 345/473; 345/474; 345/632; 345/633; 345/634; 382/103; 382/107; 382/195; 382/255; 382/284

(56) References Cited

U.S. PATENT DOCUMENTS

| | | | |
|---|---|---|---|
| 5,657,402 | A | 8/1997 | Bender et al. |
| 5,706,416 | A | 1/1998 | Mann et al. |
| 5,920,657 | A | 7/1999 | Bender et al. |
| 5,991,444 | A | 11/1999 | Burt et al. |
| 5,999,662 | A | 12/1999 | Burt et al. |
| 6,278,466 | B1* | 8/2001 | Chen .............................. 345/473 |
| 6,393,163 | B1 | 5/2002 | Burt et al. |
| 6,895,126 | B2 | 5/2005 | Di Bernardo et al. |
| 7,027,054 | B1* | 4/2006 | Cheiky et al. ................. 345/473 |
| 7,327,494 | B2 | 2/2008 | Aiso |
| 2001/0046309 | A1* | 11/2001 | Kamei ........................... 382/103 |
| 2003/0076406 | A1* | 4/2003 | Peleg et al. ..................... 348/36 |
| 2004/0001705 | A1* | 1/2004 | Soupliotis et al. ............. 386/117 |
| 2004/0062440 | A1* | 4/2004 | Srinivasa ....................... 382/173 |
| 2004/0150657 | A1 | 8/2004 | Wittenburg et al. |
| 2005/0265453 | A1* | 12/2005 | Saito .......................... 375/240.16 |
| 2005/0275727 | A1* | 12/2005 | Lai et al. ..................... 348/208.1 |
| 2006/0072663 | A1* | 4/2006 | Li et al. ...................... 375/240.16 |
| 2006/0088191 | A1* | 4/2006 | Zhang et al. .................. 382/107 |
| 2006/0109283 | A1 | 5/2006 | Shipman et al. |
| 2006/0257042 | A1* | 11/2006 | Ofek et al. ..................... 382/255 |
| 2006/0290821 | A1* | 12/2006 | Soupliotis et al. ............. 348/701 |
| 2007/0008499 | A1 | 1/2007 | Iketani et al. |
| 2007/0031062 | A1* | 2/2007 | Pal et al. ....................... 382/284 |
| 2007/0058717 | A1 | 3/2007 | Chosak et al. |
| 2007/0103544 | A1 | 5/2007 | Nakazawa |
| 2010/0272369 | A1* | 10/2010 | Hiraga et al. ................. 382/195 |

FOREIGN PATENT DOCUMENTS

| | | |
|---|---|---|
| JP | 11 120353 | 4/1999 |
| JP | 11 134352 | 5/1999 |
| JP | 2002 359798 | 12/2002 |
| JP | 2004 266670 | 9/2004 |
| JP | 2005 217874 | 8/2005 |
| JP | 2007 183588 | 7/2007 |
| WO | 2005 032125 | 4/2005 |

OTHER PUBLICATIONS

European Search Report issued Jul. 8, 2011, in Patent Application No. 08792651.5.
U.S. Appl. No. 12/447,923, filed Apr. 30, 2009, Tsurumi.
U.S. Appl. No. 12/524,887, filed Jul. 29, 2009, Tsurumi.
U.S. Appl. No. 12/526,058, filed Aug. 6, 2009, Tsurumi.
U.S. Appl. No. 12/524,777, filed Jul. 28, 2009, Fukumoto, et al.
U.S. Appl. No. 12/524,734, filed Jul. 28, 2009, Tsurumi.
U.S. Appl. No. 12/524,383, filed Jul. 24, 2009, Wang, et al.
U.S. Appl. No. 13/486,209, filed Jun. 1, 2012, Tsurumi.
U.S. Appl. No. 14/054,178, filed Oct. 15, 2013, Tsurumi.

\* cited by examiner

FIG. 2
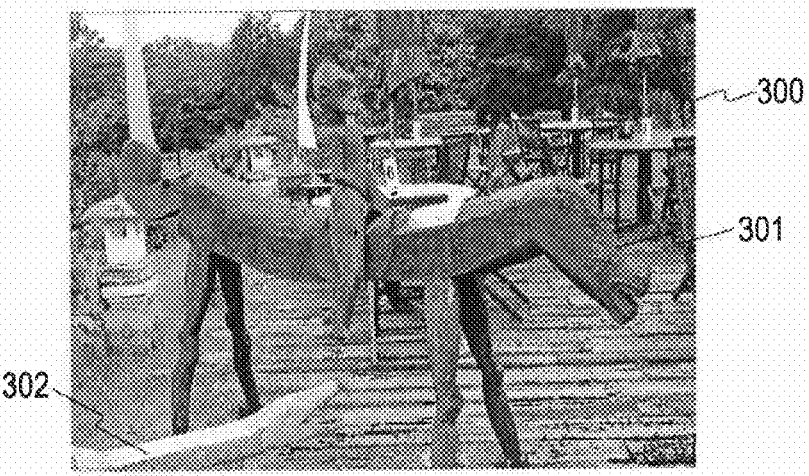
(a)
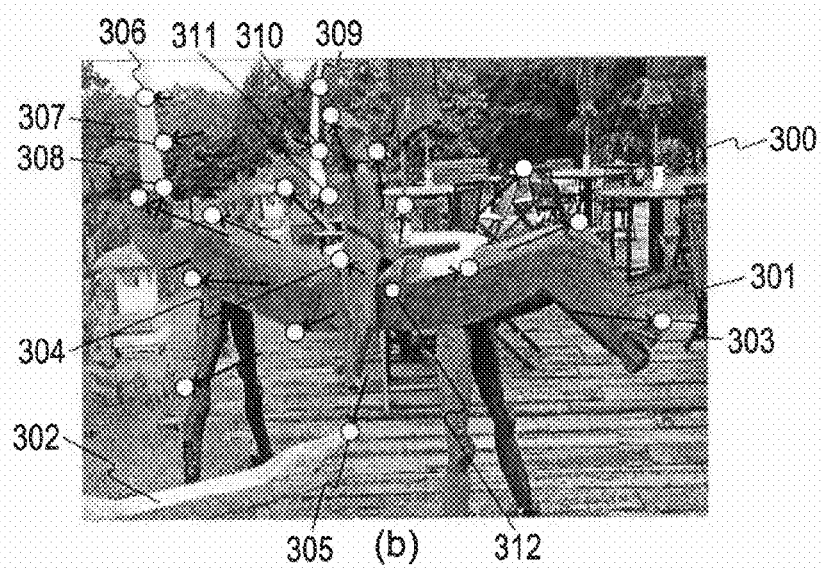
(b)
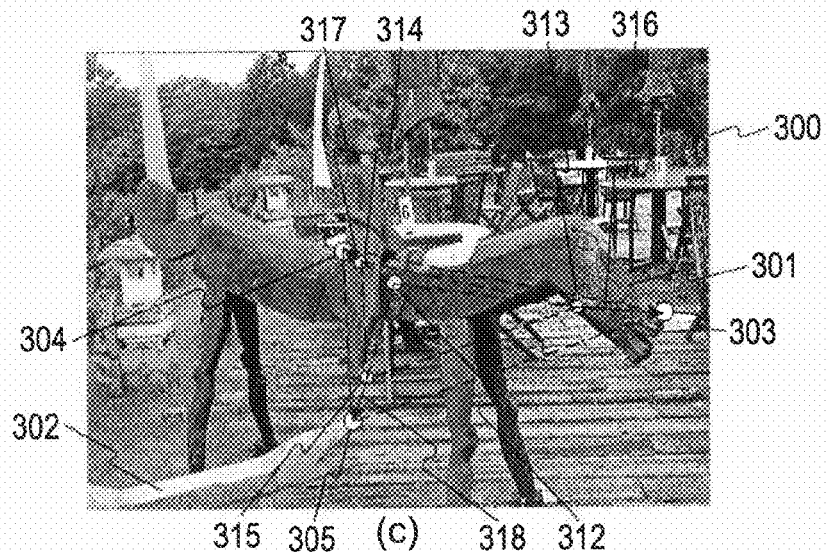
(c)

FIG. 3
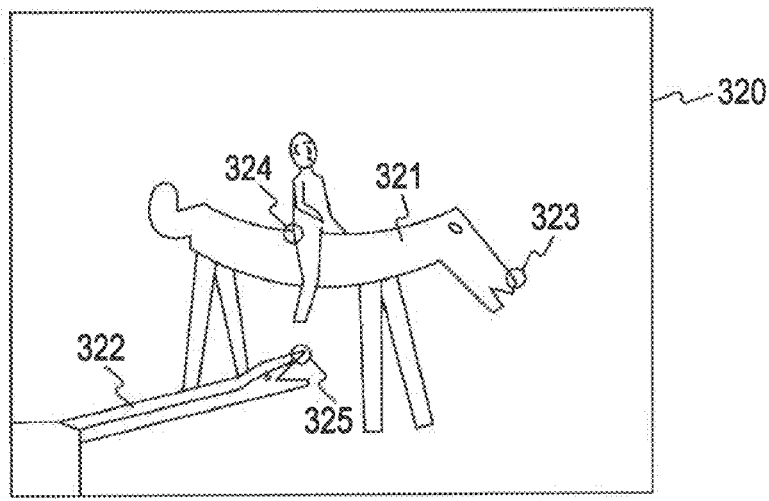
(a)
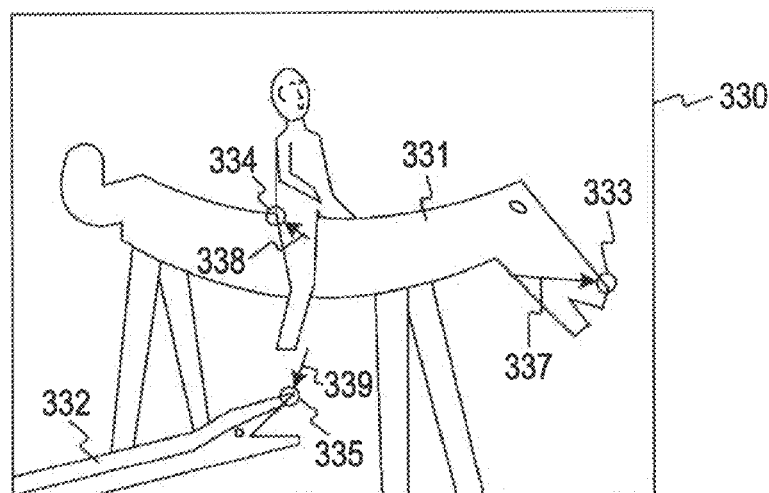
(b)
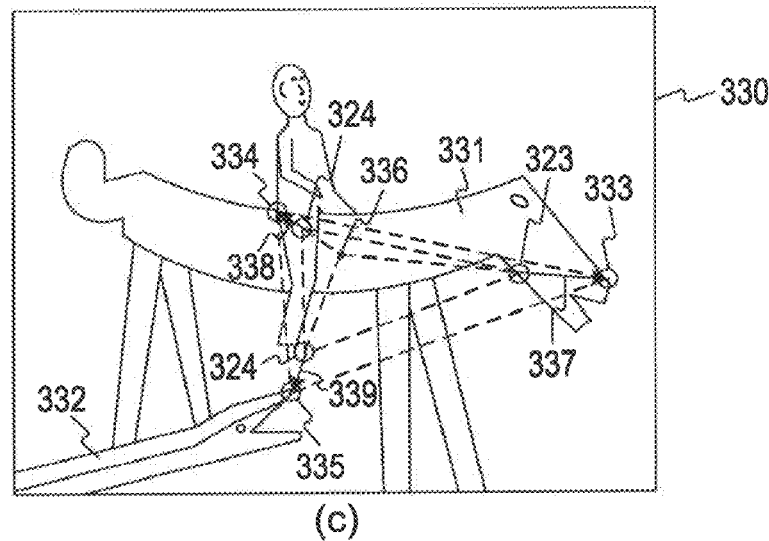
(c)

FIG. 5
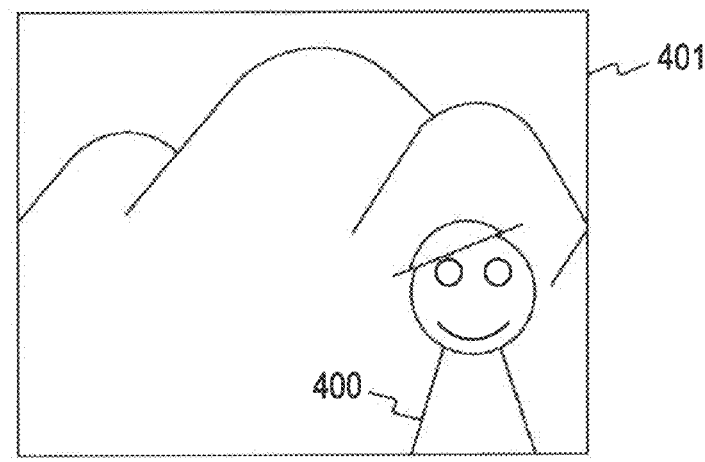
(a)
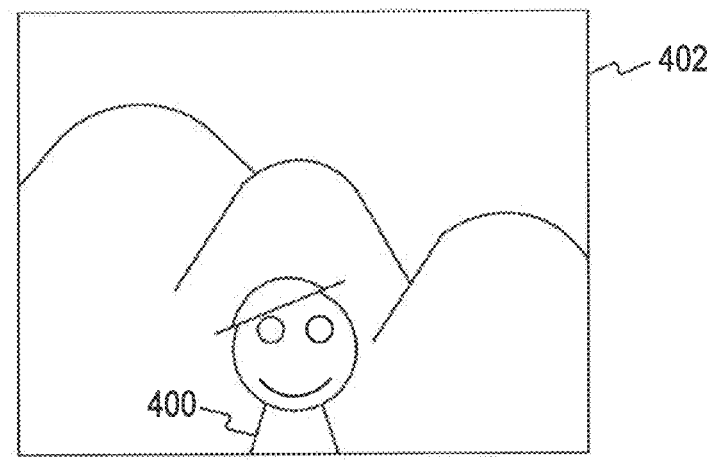
(b)
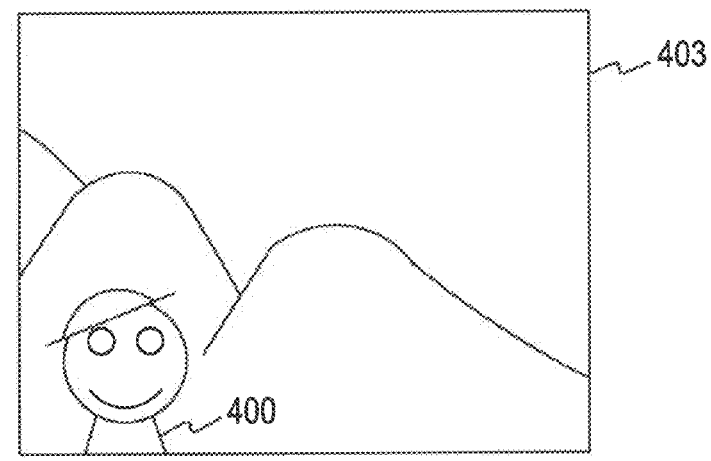
(c)

FIG. 6
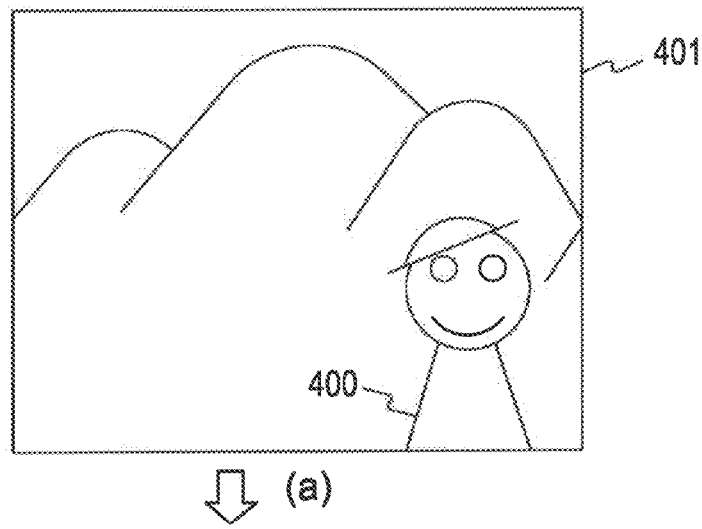
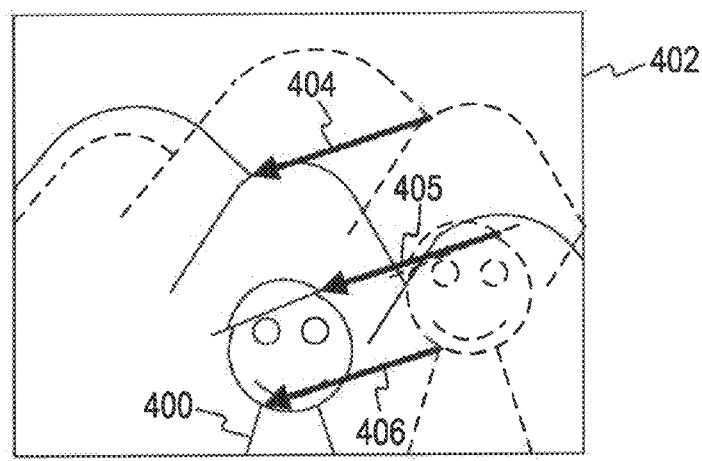
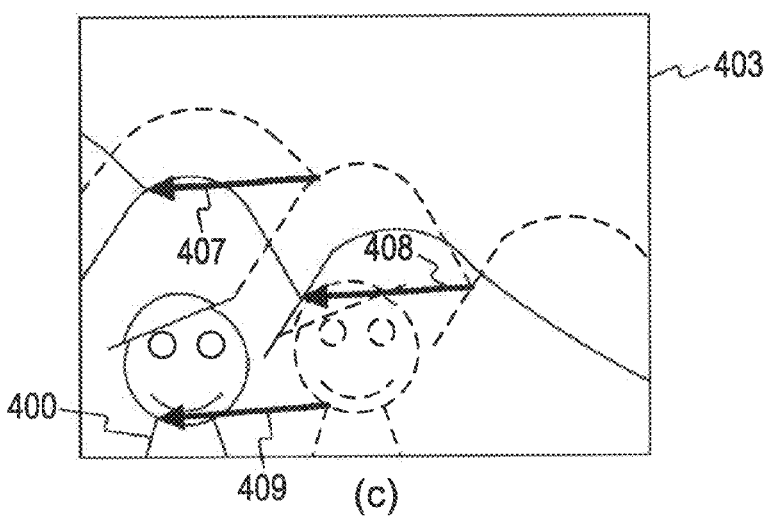

FIG. 8
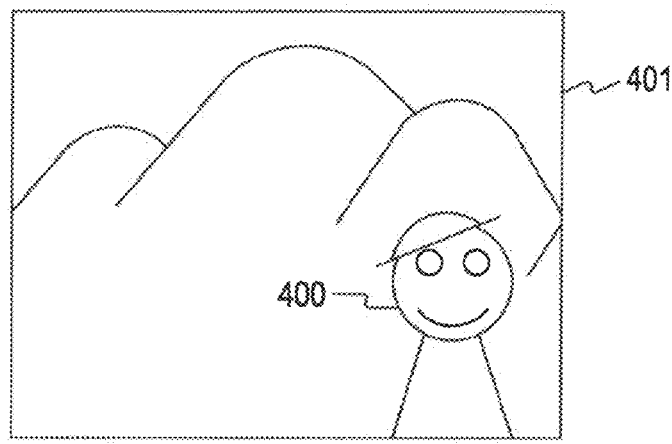
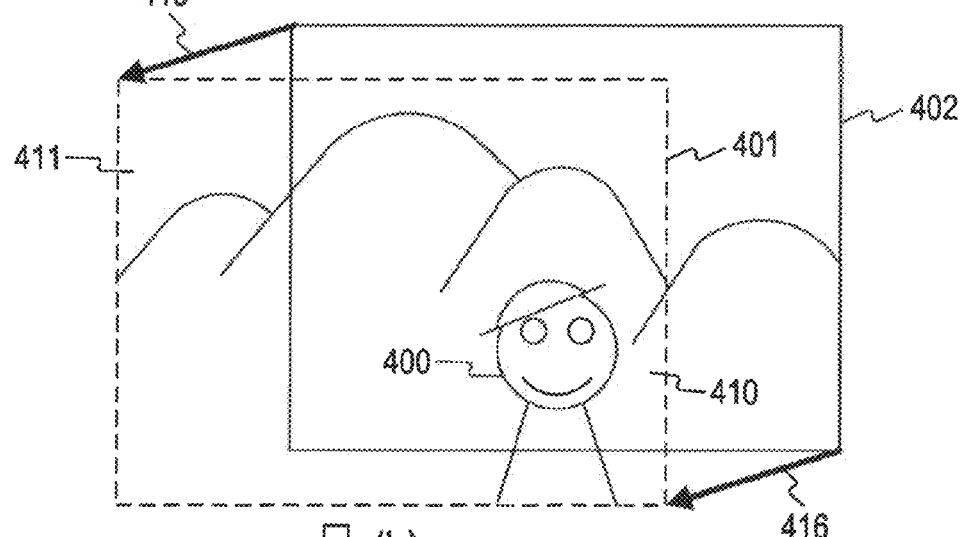
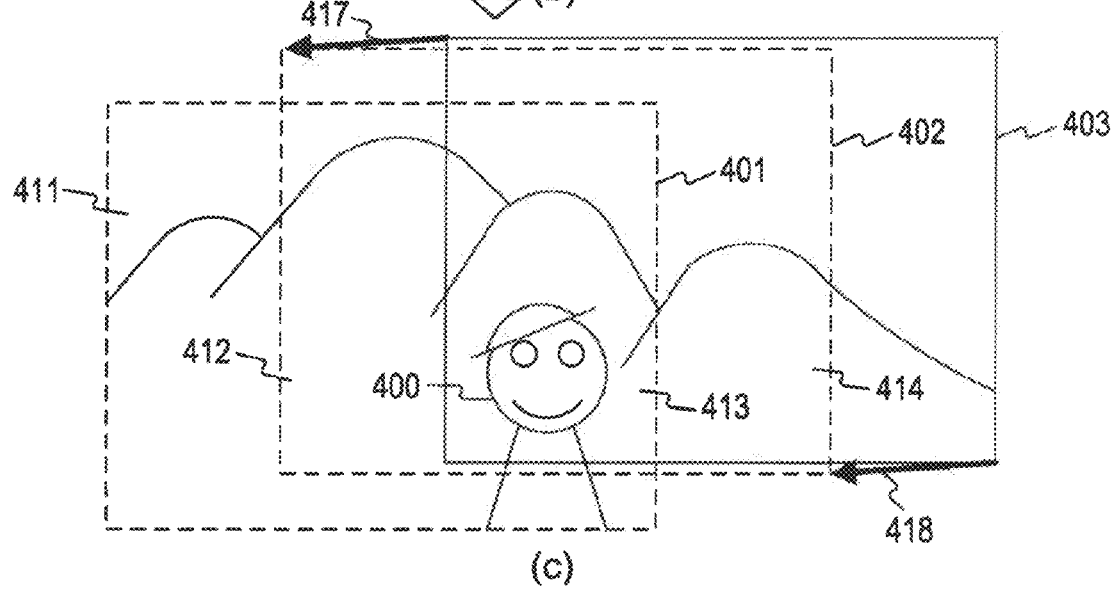

FIG. 9
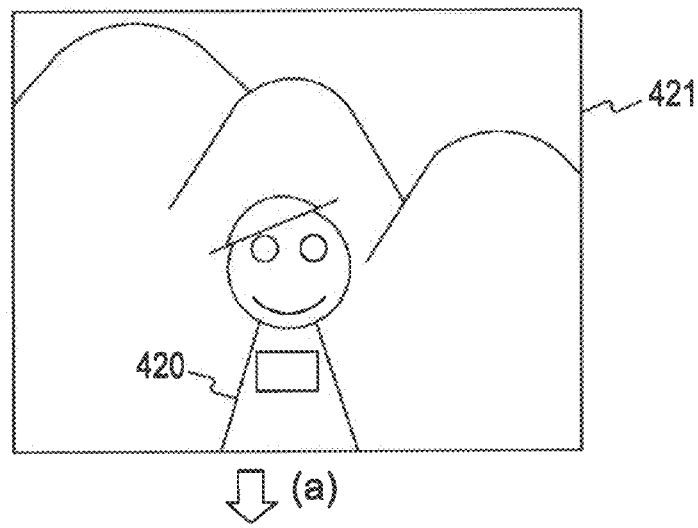
(a)
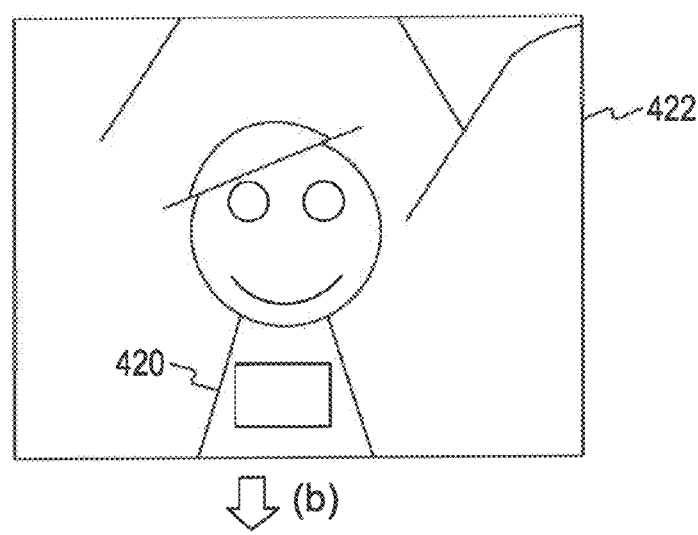
(b)
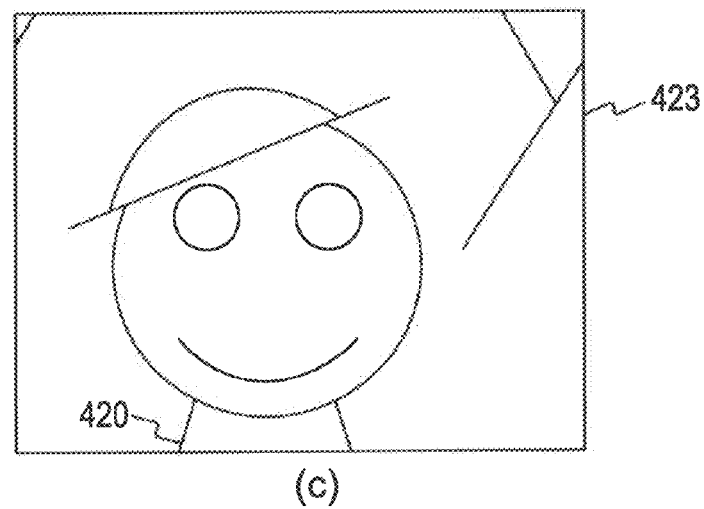
(c)

FIG. 10
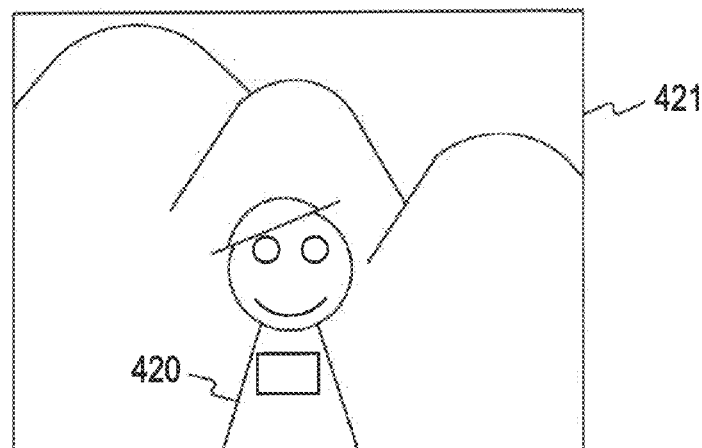
(a)
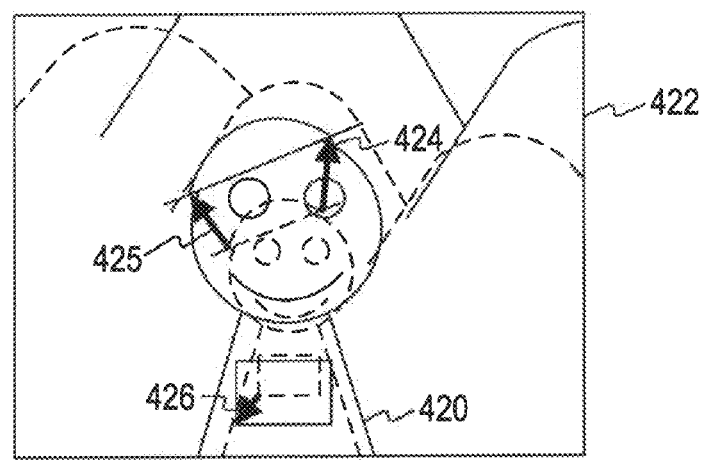
(b)
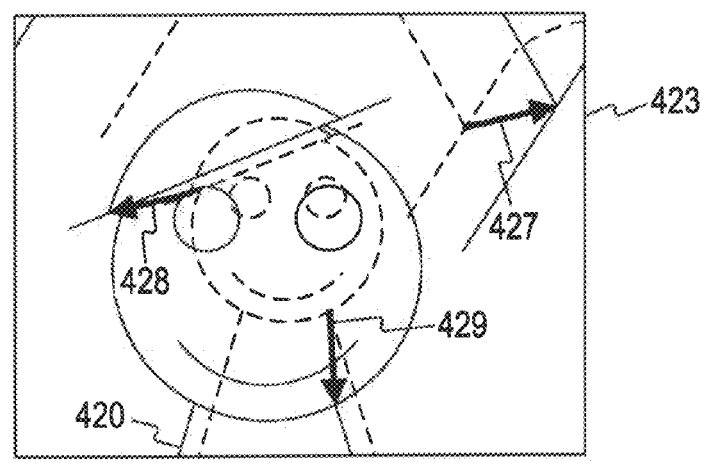
(c)

FIG. 13
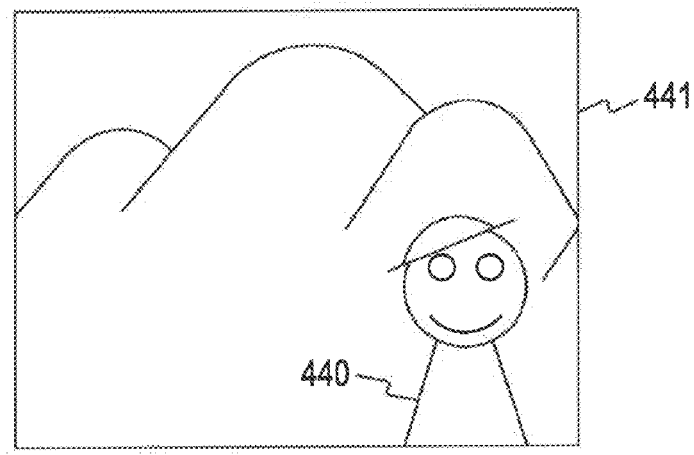
(a)
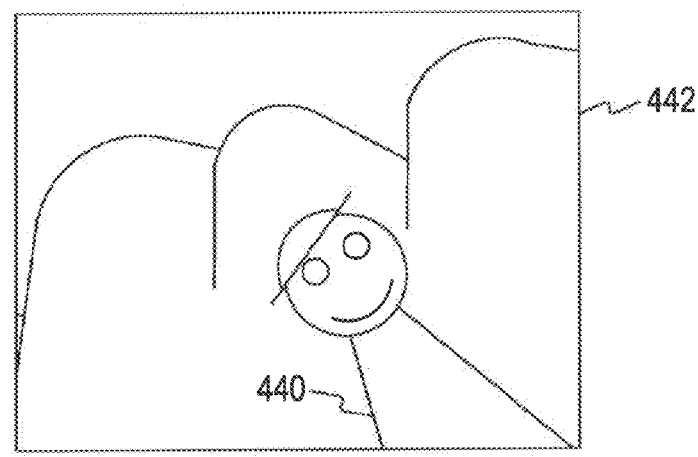
(b)
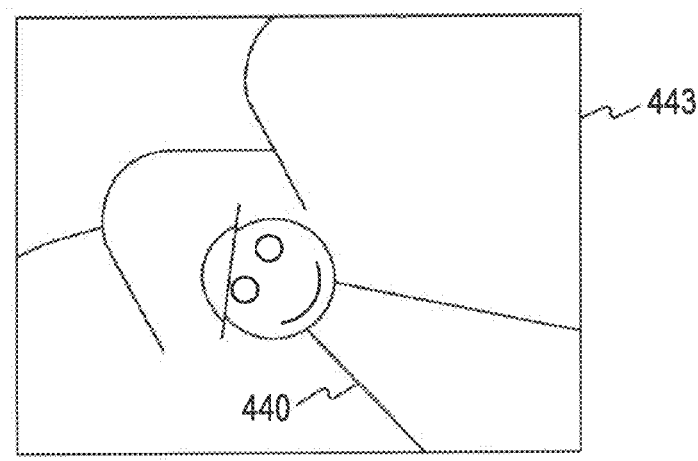
(c)

FIG. 14
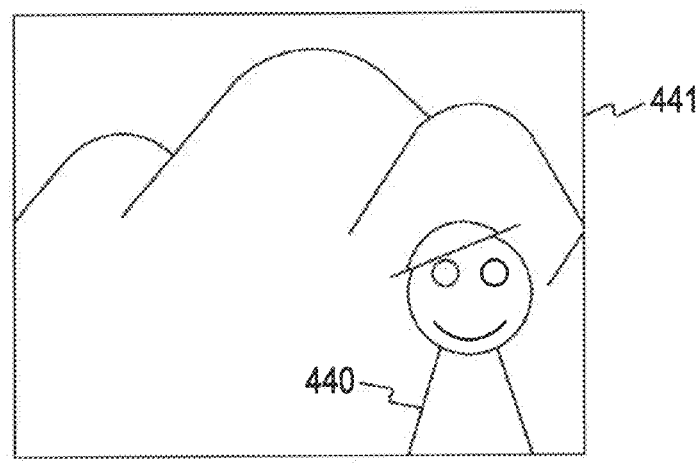
⇩ (a)
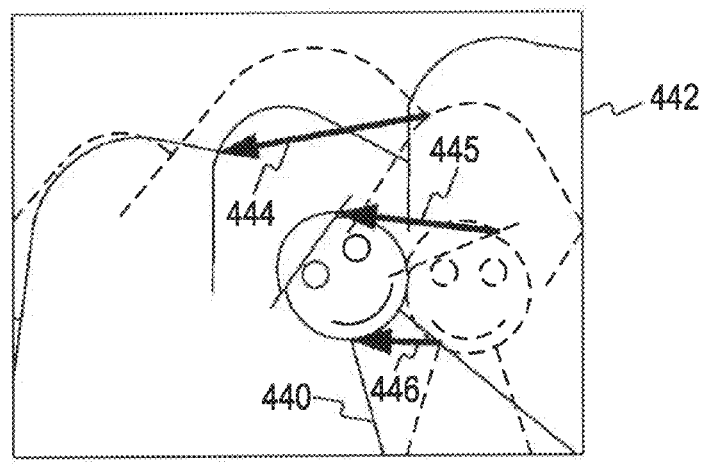
⇩ (b)
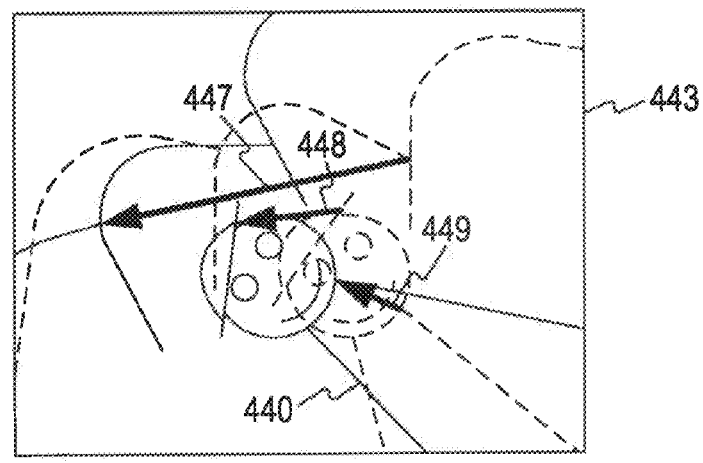
(c)

FIG. 18
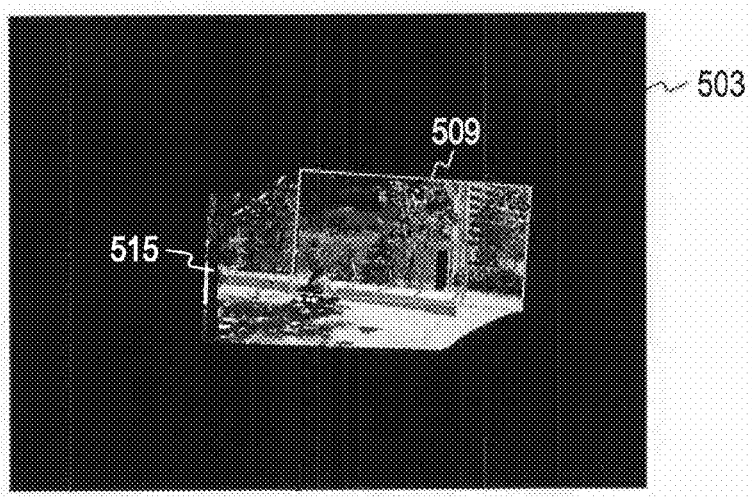
(a)
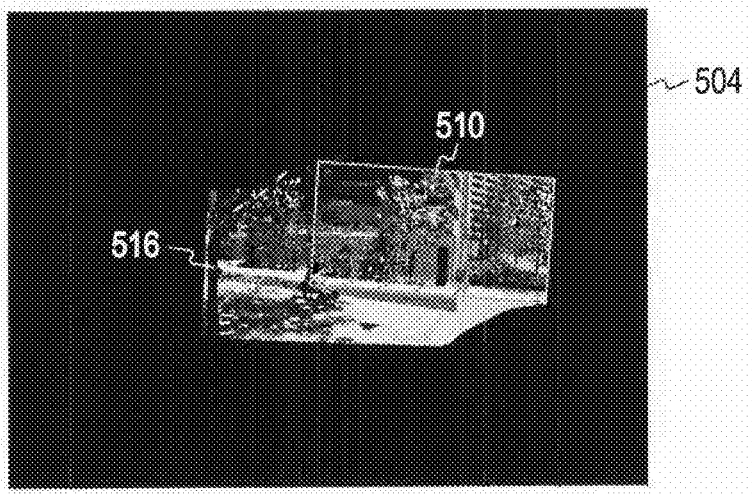
(b)
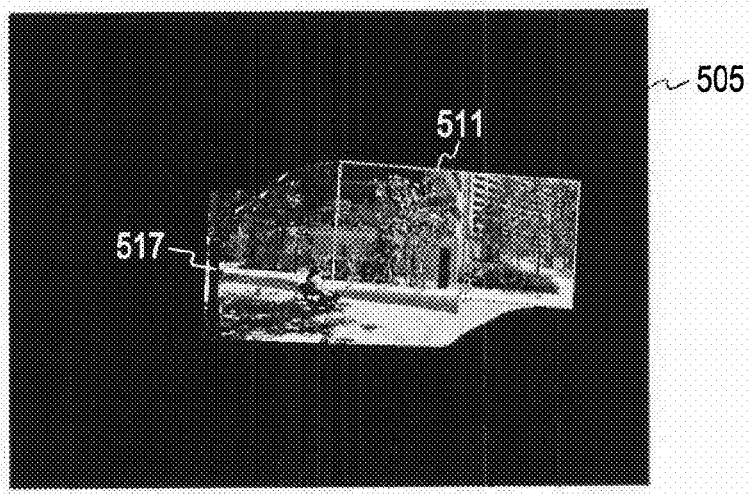
(c)

FIG. 19
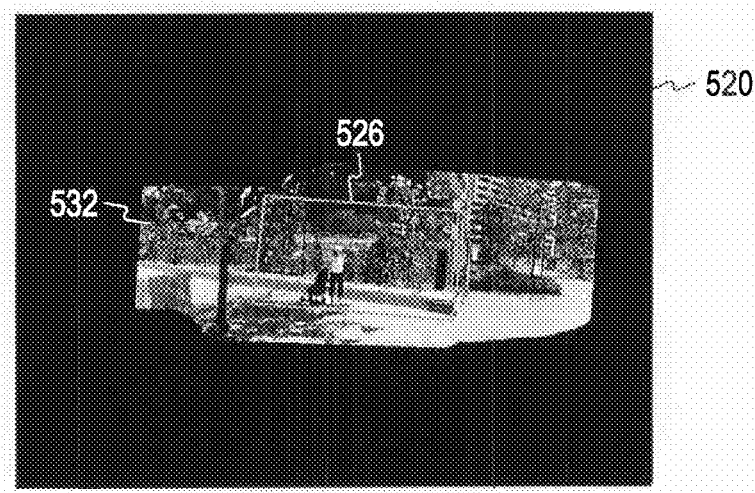
⇩ (a)
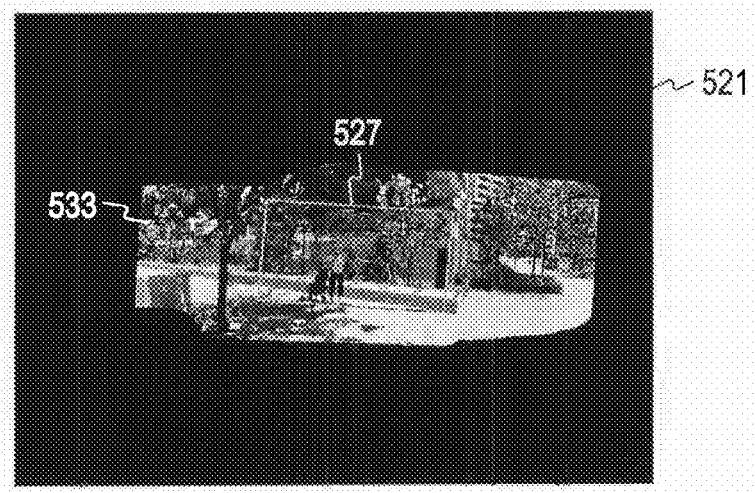
⇩ (b)
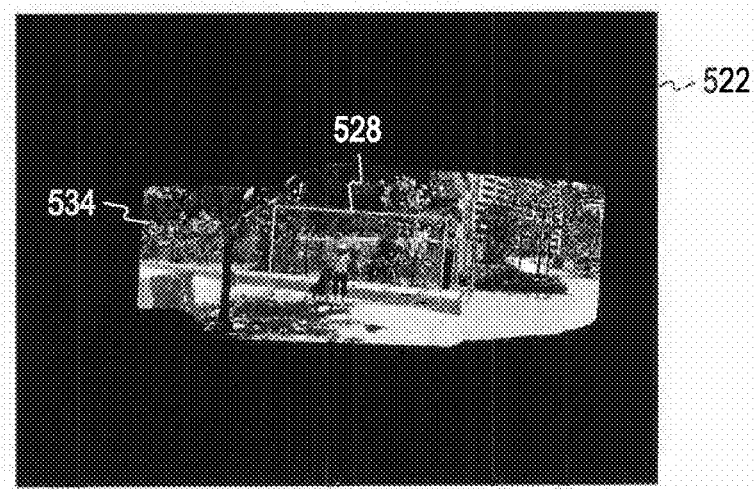
⇩ (c)

FIG. 20
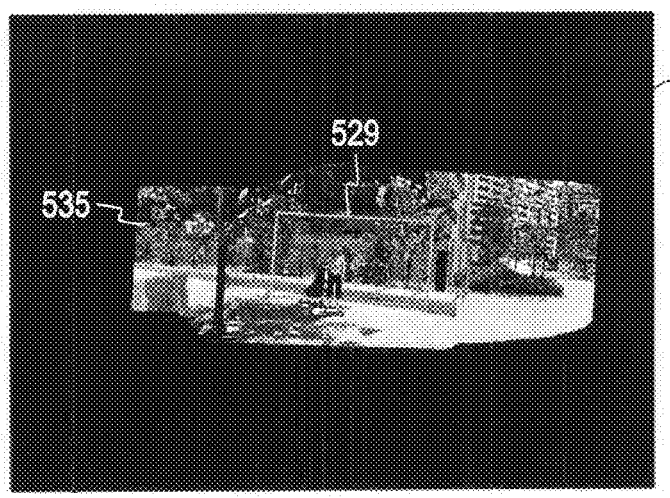
(a)
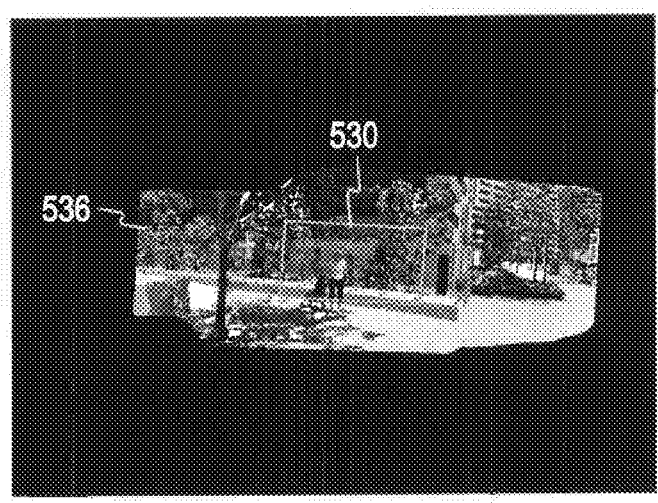
(b)
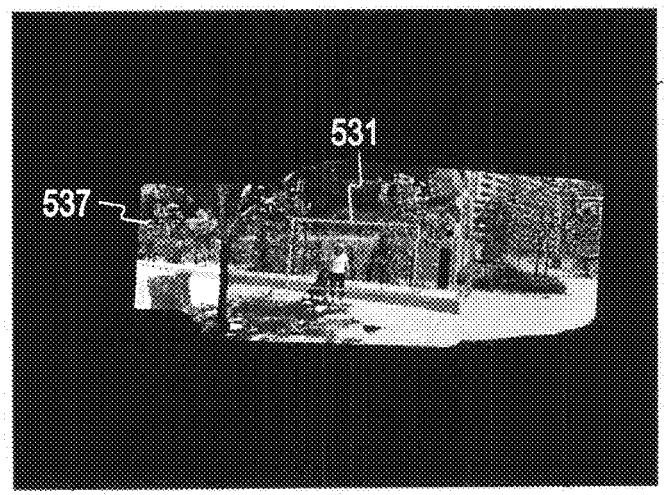
(c)

FIG. 21
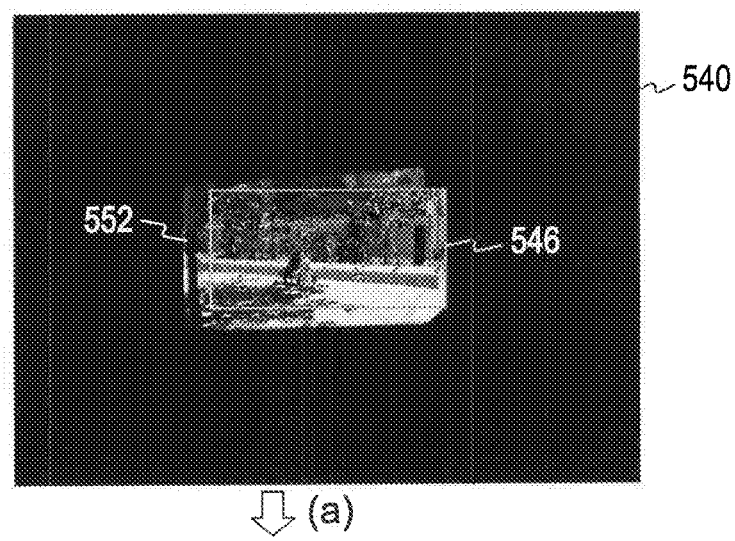
⬇ (a)
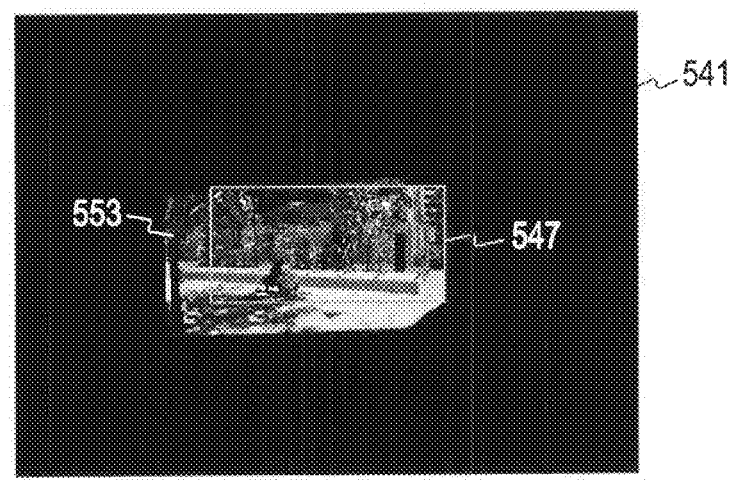
⬇ (b)
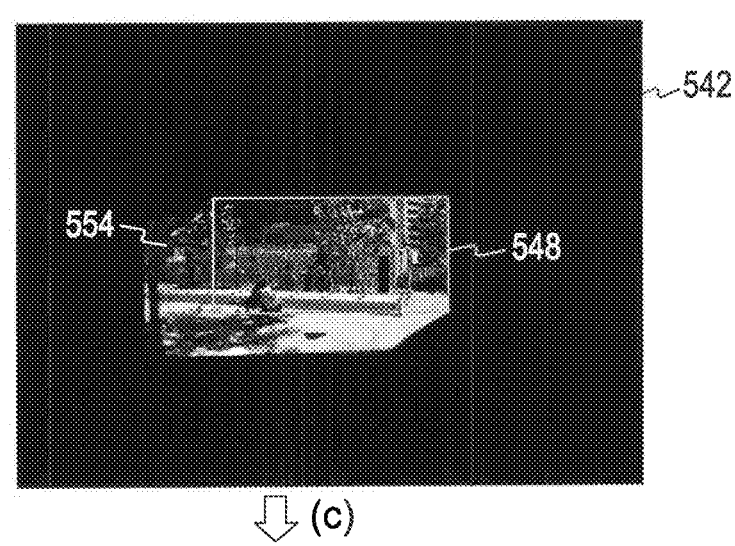
⬇ (c)

FIG. 22
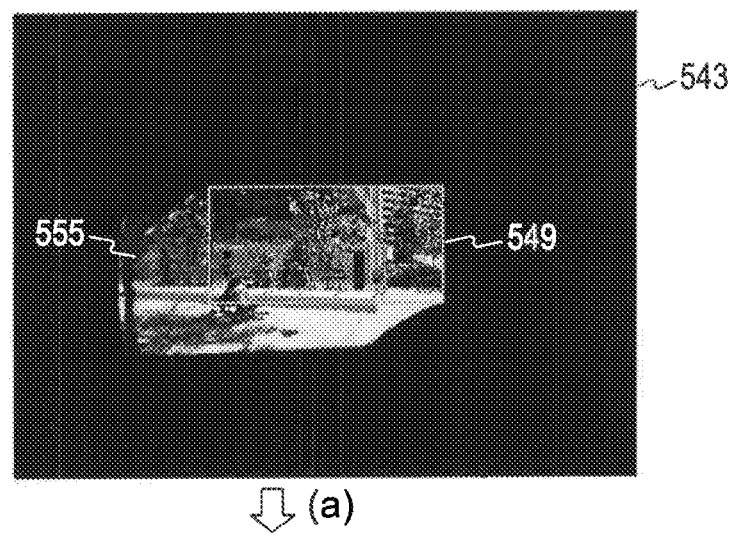
(a)
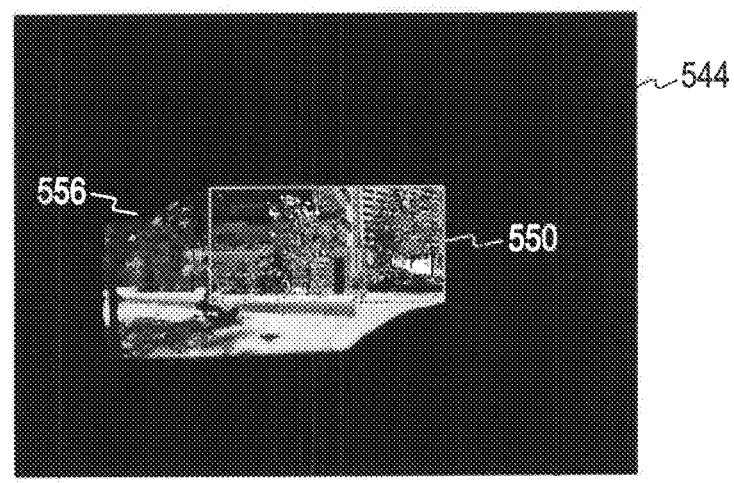
(b)
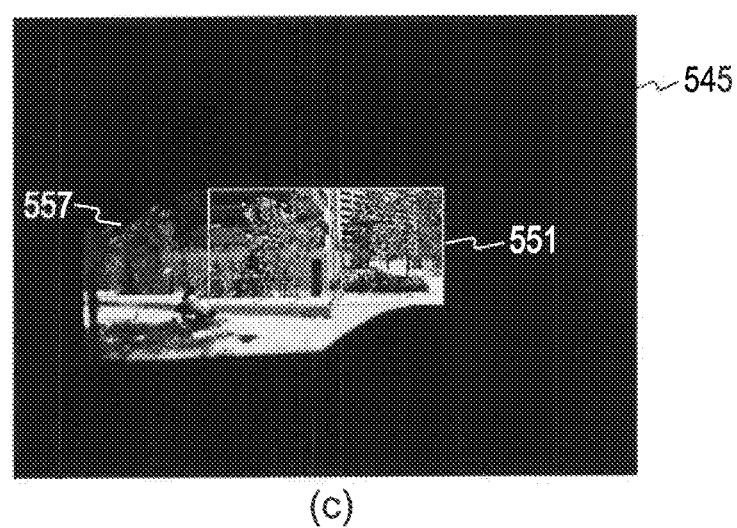
(c)

FIG. 24
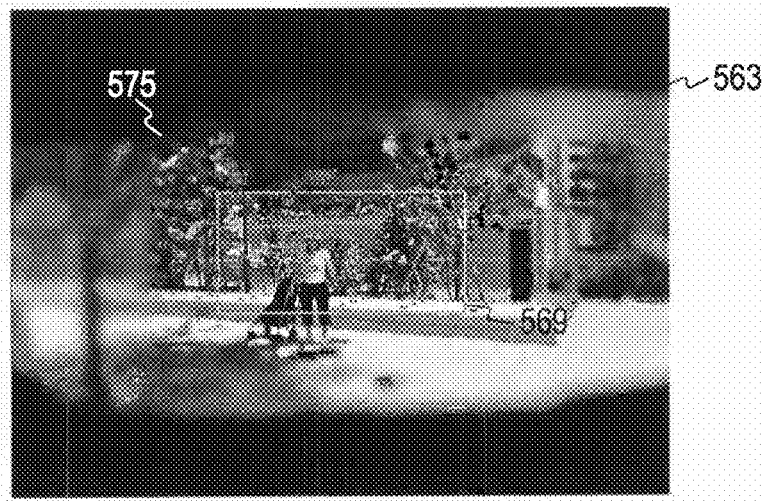
(a)
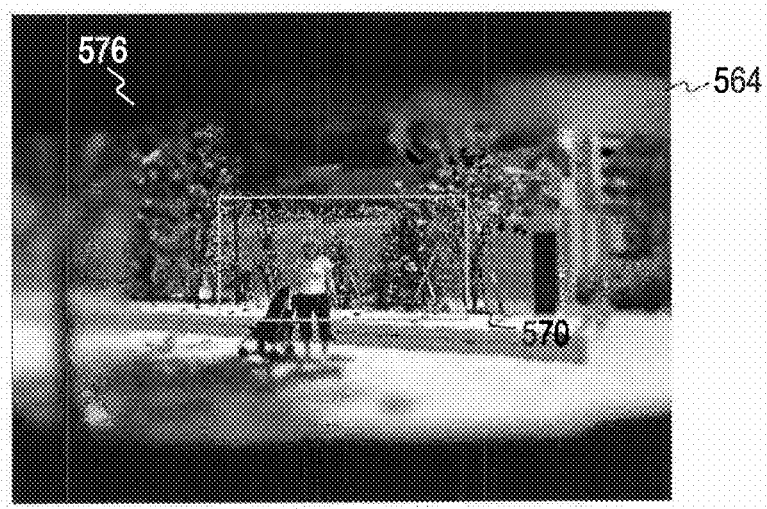
(b)
(c)

FIG. 29
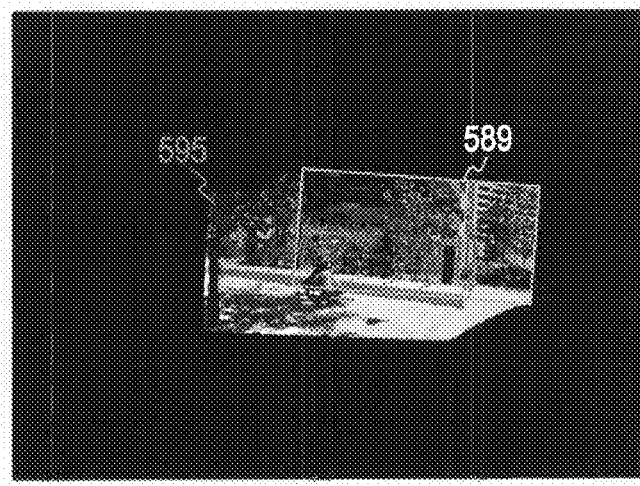
(a)
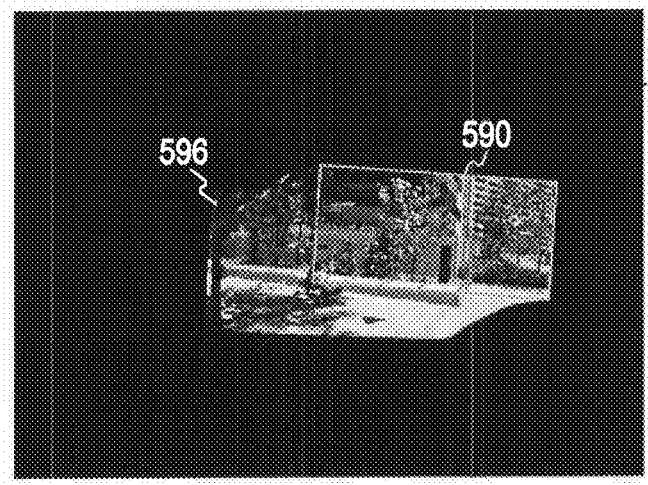
(b)
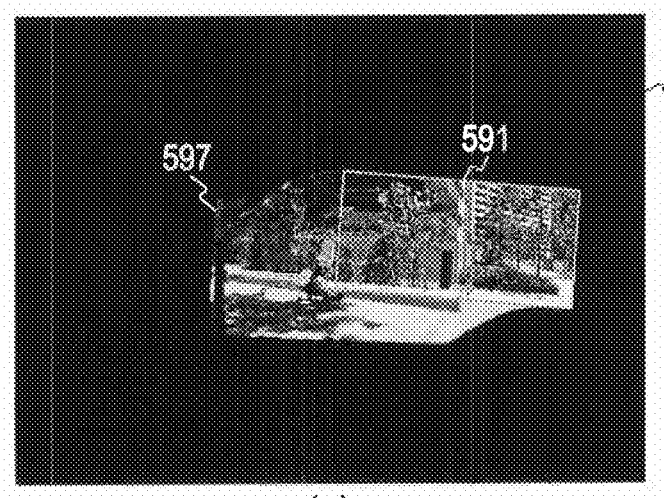
(c)

FIG. 33
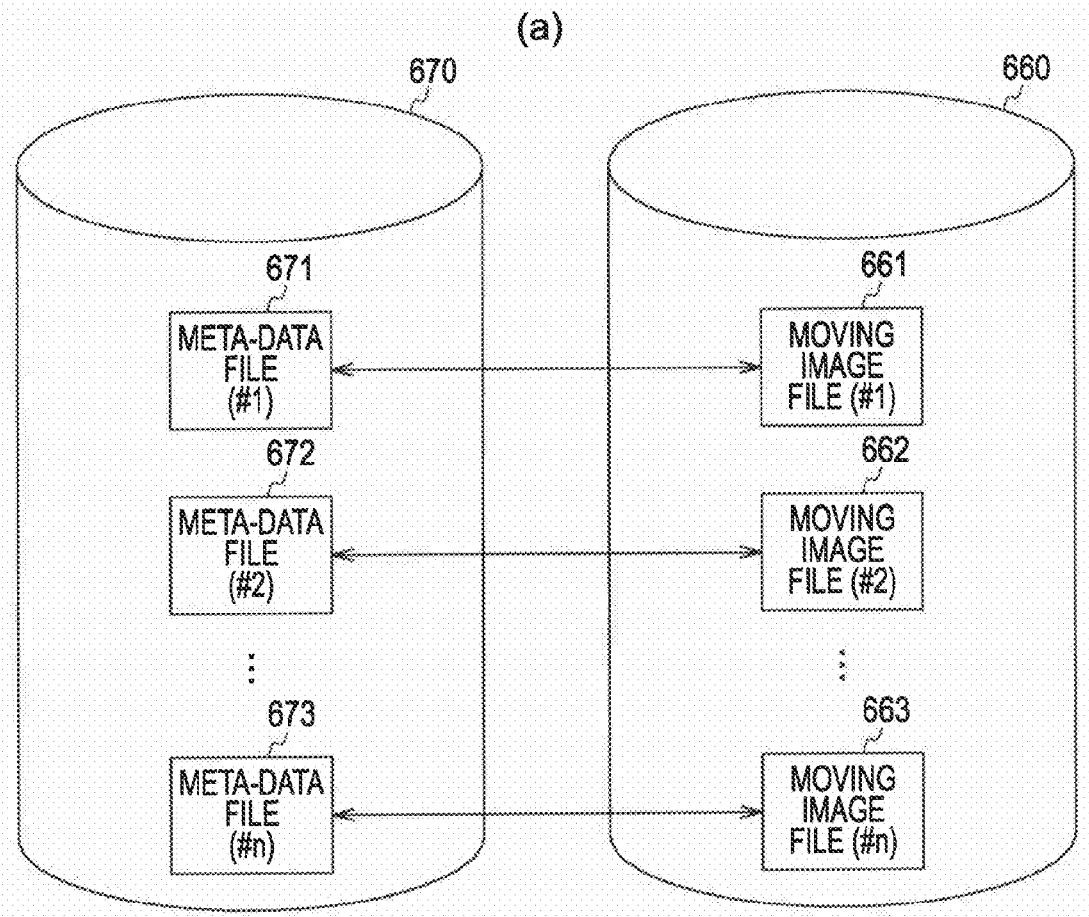
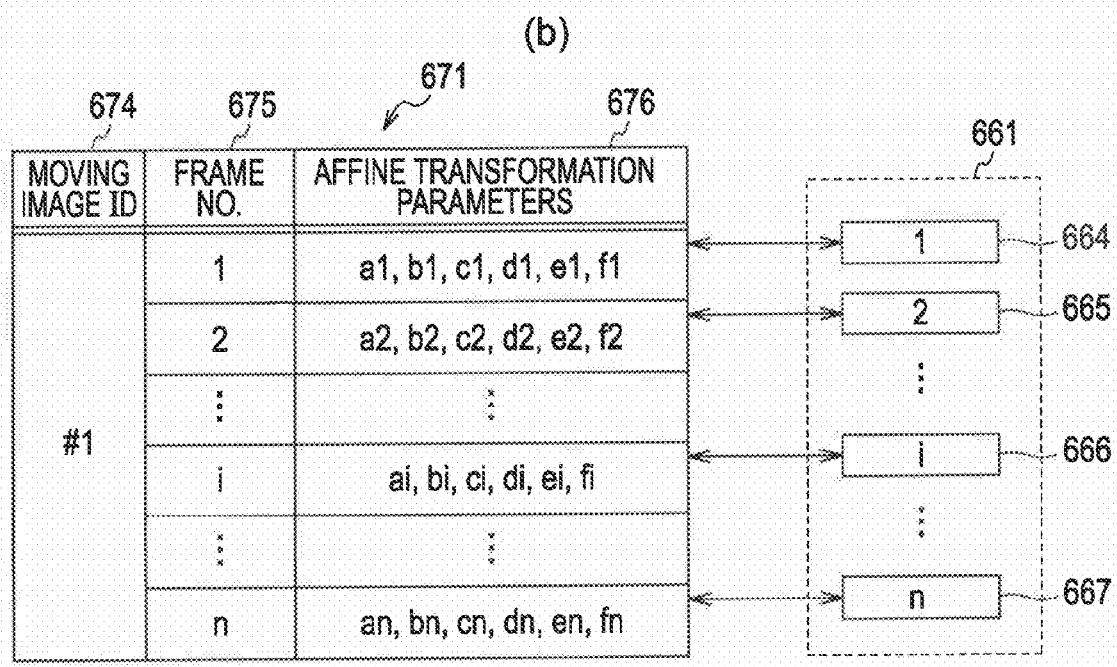

FIG. 36
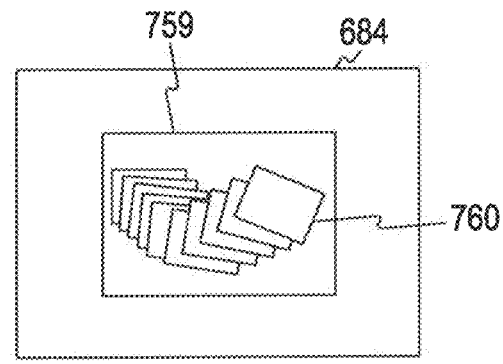
(a)
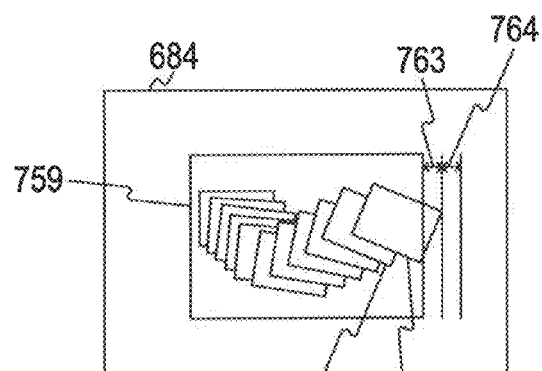
(b)
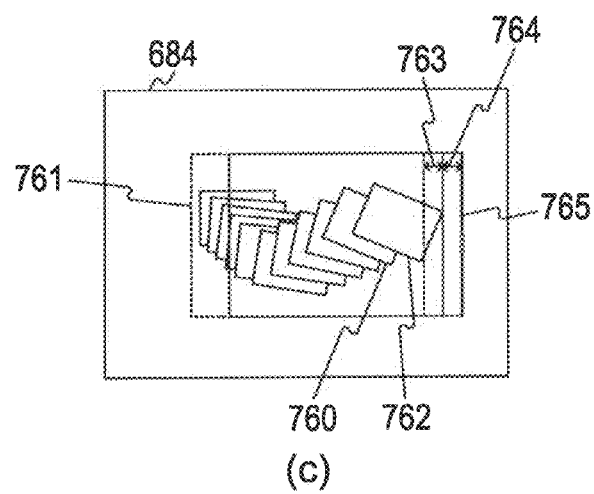
(c)

FIG. 42
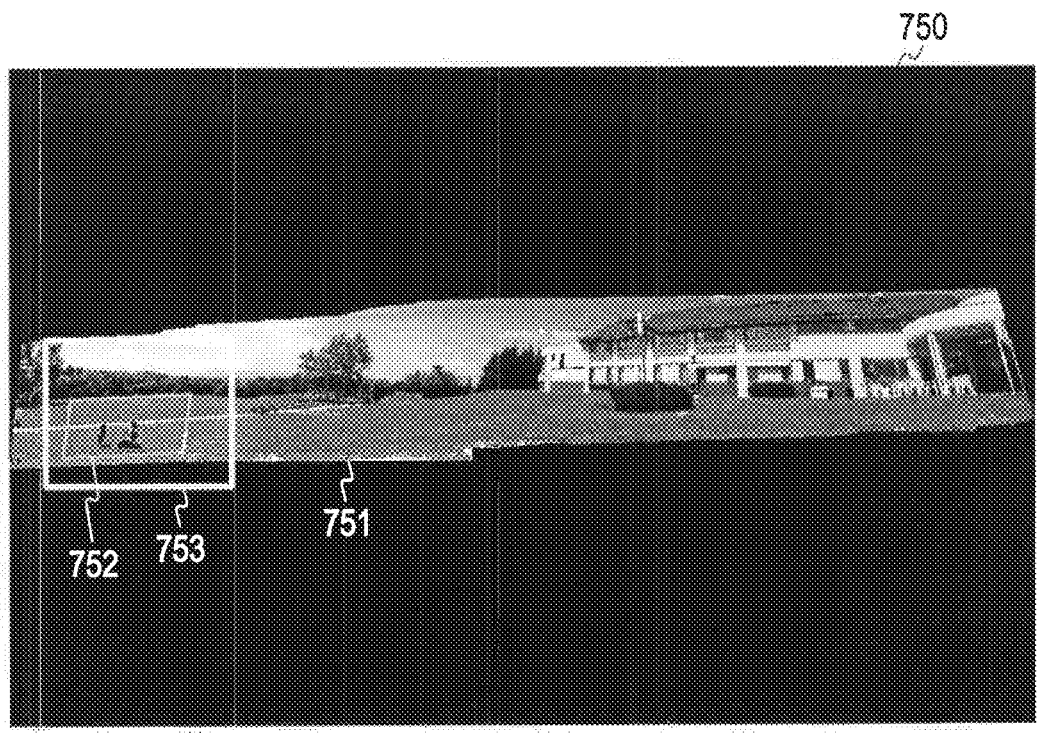
(a)
(b)

FIG. 43
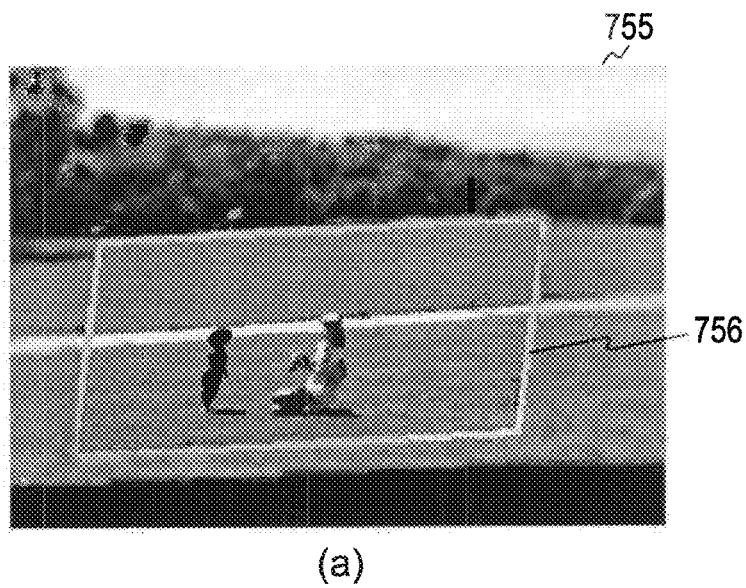
(a)
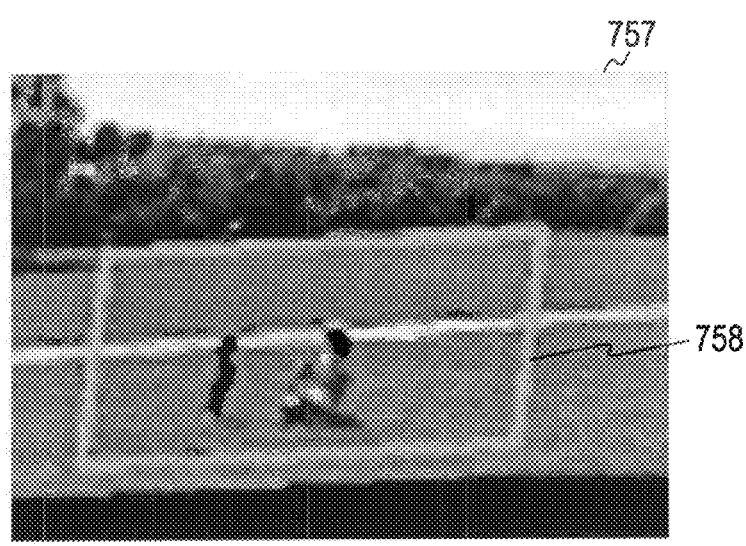
(b)

⇩ SIMD OPERATION 827    828    829

| A1 |     | B1 |     | C1 |
| A2 |  +  | B2 |  =  | C2 |
| A3 |     | B3 |     | C3 |
| A4 |     | B4 |     | C4 |

(b)

FIG. 53
RESULT OUTPUT

FIG. 56

$$\text{VECTOR A} = \left( \boxed{-1} \times \begin{array}{|c|} \hline 0 \\ \hline 1 \\ \hline 2 \\ \hline 3 \\ \hline \end{array}^{841} + \boxed{0} \times \begin{array}{|c|} \hline 1 \\ \hline 2 \\ \hline 3 \\ \hline 4 \\ \hline \end{array}^{842} + \boxed{1} \times \begin{array}{|c|} \hline 2 \\ \hline 3 \\ \hline 4 \\ \hline 5 \\ \hline \end{array}^{843} \right)$$

$$\text{VECTOR B} = \left( \boxed{-2} \times \begin{array}{|c|} \hline 32 \\ \hline 33 \\ \hline 34 \\ \hline 35 \\ \hline \end{array}^{844} + \boxed{0} \times \begin{array}{|c|} \hline 33 \\ \hline 34 \\ \hline 35 \\ \hline 36 \\ \hline \end{array}^{845} + \boxed{2} \times \begin{array}{|c|} \hline 34 \\ \hline 35 \\ \hline 36 \\ \hline 37 \\ \hline \end{array}^{846} \right)$$

$$\text{VECTOR C} = \left( \boxed{-1} \times \begin{array}{|c|} \hline 64 \\ \hline 65 \\ \hline 66 \\ \hline 67 \\ \hline \end{array}^{847} + \boxed{0} \times \begin{array}{|c|} \hline 65 \\ \hline 66 \\ \hline 67 \\ \hline 68 \\ \hline \end{array}^{848} + \boxed{1} \times \begin{array}{|c|} \hline 66 \\ \hline 67 \\ \hline 68 \\ \hline 69 \\ \hline \end{array}^{849} \right)$$

VECTOR D = ( VECTOR A + VECTOR B ) + VECTOR C

IMAGE PROCESSING APPARATUS, MOVING-IMAGE PLAYING APPARATUS, AND PROCESSING METHOD AND PROGRAM THEREFOR TO ALLOW BROWSING OF A SEQUENCE OF IMAGES

TECHNICAL FIELD

The present invention relates to an image processing apparatus, and more particularly, to an image processing apparatus capable of playing a moving image, a moving-image playing apparatus, a processing method therefor, and a program for causing a computer to execute the method.

BACKGROUND ART

In recent years, digital video cameras have been widely spread. Therefore, for example, at events at kindergartens children attend, images of the appearance of the events are often shot by parents or the like by using digital video cameras. When image shooting is done by parents or the like at such events, though images of their children are mainly shot, images of scenes or the like of the events are often shot, as needed, so that how the events appear can be understood.

Moving images shot in such a manner can be played at home using, for example, a moving-image playing apparatus on a display thereof. For example, in the case where a parent is to browse a moving image in which the parent's child serves as a main subject, the moving image mainly including the parent's child is played. However, when a viewer continues browsing a moving image of the same target for a long playback time, the viewer may become less interested in the moving image being played as the playback time elapses. Therefore, in order to make the viewer more interested, it is conceivable to display other images and the like relating to an image currently being displayed.

For example, an image display method for scroll-displaying, together with a moving image, a video index (still image) in accordance with the progression of the moving image has been proposed (for example, see Japanese Unexamined Patent Application Publication No. 11-289517 (FIG. 7)).

According to the above-described conventional art, past, present, and future still images with reference to a moving image are displayed as video indices. This allows browsing of, together with the currently displayed moving image, the past, present, and future still images. Therefore, for example, in the case where a parent is browsing a moving image shot at an event at a kindergarten a child attends, even in the case where an image of the parent's child is being displayed as the current moving image, the scene of the event relating to the current moving image, for example, may be displayed as a past or future still image. In this case, the parent can watch the appearance of the parent's child as well as watch the event's scene or the like. This facilitates understanding of the appearance of the event and makes the viewer more interested.

However, with the above-described conventional art, in the case where an image of the parent's child is being displayed as the current moving image, the scene of the event or the like may not be displayed, and images whose details are substantially the same as the current moving image may be displayed as past or future still images. In such a case, it is important to keep the viewer interested in the moving image. Therefore, it is considered that, if the viewer can appropriately understand how things are around a central person serving as a subject of an image being shot while browsing the central person and the like, the viewer can easily understand the details of the moving image, whereby the viewer can become more interested in the moving image.

Therefore, it is an object of the present invention to easily understand the details of a moving image shot by an image capturing apparatus in the case where the moving image is browsed.

DISCLOSURE OF INVENTION

The present invention has been made in order to solve the foregoing problems, and, a first aspect thereof resides in an image processing apparatus, a processing method therefor, and a program for causing a computer to execute the method. The information processing apparatus is characterized by including: moving-image input means for receiving a captured moving image captured by an image capturing apparatus; transformation-information calculating means for calculating, on the basis of a first captured image included in the captured moving image and a second captured image positioned subsequent to the first captured image along a time axis of the captured moving image, transformation information relating to the first captured image and the second captured image; image holding means for holding, as a history image, individual images including the first captured image and being positioned prior to the second captured image along the time axis of the captured moving image; image transforming means for transforming at least one of the history image and the second captured image on the basis of the calculated transformation information; operation accepting means for accepting a selecting operation of selecting an image to be transformed by the image transforming means; image combining means for combining the history image and the second captured image, at least one of which has been transformed by the image transforming means in response to the accepted selecting operation, to generate a composite image; output means for outputting the composite image; and control means for causing the output means to sequentially output the composite image. Accordingly, the following operation is achieved: transformation information is calculated on the basis of a first captured image and a second captured image; on the basis of the calculated transformation information, at least one of a history image and the second captured image is transformed; the history image and the second captured image, at least one of which has been transformed in response to an accepted selecting operation, are combined to generate a composite image; and the composite image is sequentially output.

Also, in the first aspect, the image combining means may combine the second captured image and the history image, at least one of which has been transformed by the image transforming means, by writing the second captured image over the history image to generate the composite image, and cause the image holding means to hold the composite image as a new history image. Accordingly, the following operation is achieved: the second captured image and the history image, at least one of which has been transformed, are combined by writing the second captured image over the history image to generate a composite image, and the composite image is held as a new history image.

Also, in the first aspect, the image combining means may write the second captured image, which has been transformed by the image transforming means, over the history image and combine the transformed second captured image with the history image by transforming an image quality of the transformed second captured image in accordance with the history image. Accordingly, the following operation is achieved: by transforming the image quality of the transformed second captured image in accordance with the history image, the second captured image is written over and combined with the history image.

Also, in the first aspect, the image combining means may write the second image transformed by the image transforming means, which existed before the transformation of the image quality, over the new history image to generate a new composite image, and the control means may cause the output means to sequentially output the new composite image. Accordingly, the following operation is achieved: the second image that existed before the transformation of the image quality is written over the new history image to generate a new composite image, and the new composite image is sequentially output.

Also, in the first aspect, the image processing apparatus may further include output-image extracting means for extracting an output image to be output by the output means, from the new history image held in the image holding means. The image combining means may write the second image transformed by the image transforming means, which existed before the transformation of the image quality, over the output image and combine the second image with the output image to generate a new output image, and the control means may cause the output means to sequentially output the new output image. Accordingly, the following operation is achieved: an output image is extracted from the new history image held in image holding means; the second image that existed before the transformation of the image quality is written over and combined with the output image to generate a new output image; and the new output image is sequentially output.

Also, in the first aspect, the output-image extracting means may calculate, on the basis of a position and size of the transformed second captured image in a holding region of the image holding means and a position and size of the output image in the holding region, a position at which the second image transformed by the image transforming means, which existed before the transformation of the image quality, is written over the output image and a size of the second image; and the image combining means may write the second image transformed by the image transforming means, which existed before the transformation of the image quality, over the output image and combine the second image with the output image, on the basis of the calculated position and size. Accordingly, the following operation is achieved: on the basis of the position and size of the second captured image in a holding region and the position and size of the output image in the holding region, the position at which the second image that existed before the transformation of the image quality is written over the output image, and the size thereof are calculated; and the second image that existed before the transformation of the image quality is written over and combined with the output image.

Also, in the first aspect, when at least a portion of the transformed second captured image included in the new history image protrudes from an output region that is a region for extracting the output image, the output-image extracting means may move the output region in a direction of the protruding image portion and extract the output image from the new history image. Accordingly, the following operation is achieved: when at least a portion of the second captured image included in the new history image protrudes from an output region, the output region is moved in a direction of the protruding image portion, and the output image is extracted.

Also, in the first aspect, the image quality may be at least one of a resolution and a compression ratio. Accordingly, the following operation is achieved: by transforming at least one of the resolution and the compression ratio of the transformed second captured image in accordance with the history image, the second captured image is written over and combined with the history image.

Also, in the first aspect, the image processing apparatus may further include output-image extracting means for extracting, as an output image to be output by the output means, an image included in a region calculated on the basis of the calculated transformation information, from the new history image held in the image holding means. The image combining means may write the second captured image that existed before the transformation performed by the image transforming means over the output image and combine the second captured image with the output image to generate a new output image, and the control means may cause the output means to sequentially output the new output image. Accordingly, the following operation is achieved: an image included in a region calculated on the basis of the transformation information is extracted from the new history image as the output image; the second captured image that existed before the transformation is written over and combined with the output image to generate a new output image; and the output means is caused to sequentially output the new output image.

Also, in the first aspect, the output-image extracting means may transform, on the basis of the calculated transformation information, the output image in a direction opposite to a direction in which the second captured image is transformed by the image transforming means; and the image combining means may write the second captured image that existed before the transformation performed by the image transforming means over the transformed output image and combine the second captured image with the transformed output image to generate a new output image. Accordingly, the following operation is achieved: on the basis of the transformation information, the output image is transformed in a direction opposite to a direction in which the second captured image is transformed; and the second captured image that existed before the transformation is written over and combined with the transformed output image to generate a new output image.

Also, in the first aspect, the image transforming means may transform, on the basis of the calculated transformation information, the history image in a direction opposite to a direction in which the second captured image is transformed. Accordingly, the following operation is achieved: the history image is transformed, on the basis of the transformation information, in a direction opposite to the direction in which the second captured image is transformed.

Also, in the first aspect, the transformation information may include elements relating to enlargement/reduction, movement, and rotation; and the image transforming means may transform the second captured image on the basis of the elements relating to movement and rotation, which are included in the calculated transformation information, and transform the history image on the basis of the element relating to enlargement/reduction, which is included in the calculated transformation information. Accordingly, the following operation is achieved: the second captured image is transformed on the basis of elements relating to movement and rotation, which are included in the transformation information; and the history image is transformed on the basis of an element relating to enlargement/reduction, which is included in the transformation information.

Also, in the first aspect, the image transforming means may transform the history image in a direction opposite to a direction in which the second captured image is transformed. Accordingly, the following operation is achieved: the history image is transformed in a direction opposite to the direction in which the second captured image is transformed.

Also, in the first aspect, the transformation-information calculating means may sequentially calculate the transformation information for each of frames constituting the captured moving image; the image transforming means may transform, for each of the frames, at least one of the history image and the second captured image; the image combining means may sequentially combine, for each of the frames, the history image and the second captured image, at least one of which has been transformed by the image transforming means; and the control means may cause the composite image to be sequentially output for each of the frames. Accordingly, the following operation is achieved: the transformation information is sequentially calculated for each of frames constituting the captured moving image; at least one of the history image and the second captured image is transformed for each of the frames; the history image and the second captured image, at least one of which has been transformed, are sequentially combined for each of the frames to generate a composite image; and the composite image is sequentially output for each of the frames.

Also, in the first aspect, the first captured image and the second captured image may be images corresponding to two successive frames included in the captured moving image. Accordingly, the following operation is achieved: using images corresponding to two consecutive frames included in the captured moving image, calculation of the transformation information, combining of the captured images, and outputting of the composite image are performed.

Also, in the first aspect, the transformation information may be movement information of the image capturing apparatus at the time the first captured image or the second captured image was captured; and the transformation-information calculating means may calculate the transformation information by comparing the first captured image and the second captured image. Accordingly, the following operation is achieved: by comparing the first captured image and the second captured image, movement information of the image capturing apparatus at the time the first captured image or the second captured image was captured is calculated.

Also, in the first aspect, the transformation information may be movement information relating to relative amounts of movement of the image capturing apparatus and a photographic subject at the time the first captured image or the second captured image was captured; and the transformation-information calculating means may calculate the transformation information by comparing the first captured image and the second captured image. Accordingly, the following operation is achieved: by comparing the first captured image and the second captured image, movement information relating to relative amounts of movement of the image capturing apparatus and a photographic subject at the time the first captured image or the second captured image was captured is calculated.

Also, in the first aspect, the transformation-information calculating means may include: feature-point extracting means for extracting feature points in the first captured image and the second captured image on the basis of individual pixels constituting the first captured image and the second captured image; movement-amount calculating means for calculating an amount of movement relating to the first captured image and the second captured image on the basis of the extracted individual feature points; and transformation-parameter calculating means for calculating the transformation information by calculating a predetermined transformation parameter on the basis of the calculated amount of movement. Accordingly, the following operation is achieved: on the basis of individual pixels constituting the first captured image and the second captured image, feature points in the first captured image and the second captured image are extracted; on the basis of the extracted individual feature points, an amount of movement relating to the first captured image and the second captured image is calculated; and, on the basis of the calculated amount of movement, a predetermined transformation parameter is calculated, thereby calculating the transformation information.

Also, in the first aspect, the feature-point extracting means may be configured by a multi-core processor. The multi-core processor may extract feature amounts in the first captured image and the second captured image by performing parallel processing using SIMD operations on the individual pixels constituting the first captured image and the second captured image. Accordingly, the following operation is achieved: by performing, using a multi-core processor, parallel processing using SIMD operations on individual pixels constituting the first captured image and the second captured image, feature amounts in the first captured image and the second captured image are extracted.

Also, in the first aspect, the movement-amount calculating means may be configured by a multi-core processor. The multi-core processor may calculate the amount of movement relating to the first captured image and the second captured image by performing parallel processing using SIMD operations on the extracted individual feature points. Accordingly, the following operation is achieved: by performing, using a multi-core processor, parallel processing using SIMD operations on the extracted individual feature points, the amount of movement relating to the first captured image and the second captured image is calculated.

Also, in the first aspect, the image processing apparatus may further include compression means for compressing the captured image. The history image at the time of outputting the composite image may be a compressed image, and the second captured image may be a non-compressed image or a captured image with a higher resolution than the compressed history image. Accordingly, the following operation is achieved: the history image at the time of outputting the composite image is a compressed image; and the second captured image is a non-compressed image or a captured image with a higher resolution than the compressed history image.

Also, a second aspect of the present invention resides in an image processing apparatus, a processing method therefor, and a program for causing a computer to execute the method. The image processing apparatus is characterized by including: moving-image obtaining means for obtaining a captured moving image with which transformation information for transforming at least one of a first captured image and a second captured image included in the captured moving image is associated and recorded, the captured moving image being captured by an image capturing apparatus; transformation-information extracting means for extracting the transformation information from the obtained captured moving image; image holding means for holding, as a history image, individual images including the first captured image and being positioned prior to the second captured image along a time axis of the captured moving image; image transforming means for transforming at least one of the history image and the second captured image on the basis of the extracted transformation information; operation accepting means for accepting a selecting operation of selecting an image to be transformed by the image transforming means; image combining means for combining the history image and the second captured image, at least one of which has been transformed by the image transforming means in response to the accepted selecting operation, to generate a composite image; output means for outputting the composite image; and control means for causing the output means to sequentially output the composite image. Accordingly, the following operation is achieved: at least one of a history image and a second captured image is transformed on the basis of extracted transformation information; the history image and the second captured image, at least one of which has been transformed in response to an accepted selecting operation, are combined to generate a composite image; and the composite image is sequentially output.

Also, a third aspect of the present invention resides in an image processing apparatus, a processing method therefor, and a program for causing a computer to execute the method. The image processing apparatus is characterized by including: transformation-information storage means for storing transformation information for transforming at least one of a first captured image and a second captured image included in a captured moving image captured by an image capturing apparatus, in association with each of frames constituting the captured moving image; moving-image obtaining means for obtaining the captured moving image; transformation-information obtaining means for obtaining transformation information stored in association with the obtained captured moving image in the transformation-information storage means; image holding means for holding, as a history image, individual images including the first captured image and being positioned prior to the second captured image along a time axis of the captured moving image; image transforming means for transforming at least one of the history image and the second captured image on the basis of the obtained transformation information; operation accepting means for accepting a selecting operation of selecting an image to be transformed by the image transforming means; image combining means for combining the history image and the second captured image, at least one of which has been transformed by the image transforming means in response to the accepted selecting operation, to generate a composite image; output means for outputting the composite image; and control means for causing the output means to sequentially output the composite image. Accordingly, the following operation is achieved: at least one of a history image and a second captured image is transformed on the basis of obtained transformation information; the history image and the second captured image, at least one of which has been transformed in response to an accepted selecting operation, are combined to generate a composite image; and the composite image is sequentially output.

Also, a fourth aspect of the present invention resides in an image processing apparatus, a processing method therefor, and a program for causing a computer to execute the method. The image processing apparatus is characterized by including: moving-image input means for receiving a captured moving image captured by an image capturing apparatus; transformation-information calculating means for calculating transformation information for transforming, with reference to at least one captured image among captured images constituting the captured moving image, another captured image for each of the captured images; image transforming means for transforming, on the basis of the transformation information calculated with reference to, as a reference image, the at least one captured image among the captured images constituting the captured moving image, a captured image corresponding to the transformation information; image holding means for holding the transformed captured image; and control means for causing the output means to sequentially output the captured image last held in the image holding means. Accordingly, the following operation is achieved: transformation information for transforming, with reference to at least one captured image among captured images constituting a captured moving image, another captured image is calculated for each of the captured images; the captured image is transformed, with reference to, as a reference image, at least one captured image among the captured images, on the basis of the transformation information; and the transformed captured image is held; and the last-held captured image is sequentially output.

Also, a fifth aspect of the present invention resides in a moving-image playing apparatus, a processing method therefor, and a program for causing a computer to execute the method. The moving-image playing apparatus is characterized by including: moving-image input means for receiving a captured moving image captured by an image capturing apparatus; transformation-information calculating means for calculating, on the basis of a first captured image included in the captured moving image and a second captured image positioned subsequent to the first captured image along a time axis of the captured moving image, transformation information relating to the first captured image and the second captured image; image holding means for holding, as a history image, individual images including the first captured image and being positioned prior to the second captured image along the time axis of the captured moving image; image transforming means for transforming at least one of the history image and the second captured image on the basis of the calculated transformation information; operation accepting means for accepting a selecting operation of selecting an image to be transformed by the image transforming means; image combining means for combining the history image and the second captured image, at least one of which has been transformed by the image transforming means in response to the accepted selecting operation, to generate a composite image; display means for displaying the composite image; and control means for causing the display means to sequentially display the composite image. Accordingly, the following operation is achieved: transformation information is calculated on the basis of a first captured image and a second captured image; on the basis of the calculated transformation information, at least one of a history image and the second captured image is transformed; the history image and the second captured image, at least one of which has been transformed in response to an accepted selecting operation, are combined to generate a composite image; and the composite image is sequentially displayed.

Also, a sixth aspect of the present invention resides in an image processing apparatus, a processing method therefor, and a program for causing a computer to execute the method. The image processing apparatus is characterized by including: moving-image input means for receiving a moving image captured by an image capturing apparatus as a captured moving image; captured-moving-image storage means for storing the captured moving image; transformation-information calculating means for calculating, for each of frames constituting the captured moving image, transformation information for transforming, with reference to at least one captured image among captured images constituting the captured moving image, another captured image; and recording control means for recording the calculated transformation information in association with each of the frames in the captured-moving-image storage means. Accordingly, the following operation is achieved: transformation information for transforming, with reference to at least one captured image among captured images constituting a captured moving image, another captured image is calculated for each of frames; and the calculated transformation information is recorded in association with each of the frames.

Also, a seventh aspect of the present invention resides in an image processing apparatus, a processing method therefor, and a program for causing a computer to execute the method. The image processing apparatus is characterized by including: moving-image input means for receiving a moving image captured by an image capturing apparatus as a captured moving image; meta-data storage means for storing meta-data relating to the captured moving image; transformation-information calculating means for calculating, for each of frames constituting the captured moving image, transformation information for transforming, with reference to at least one captured image among captured images constituting the captured moving image, another captured image; and recording control means for recording, as the meta-data, the calculated transformation information in association with the captured moving image and the frame in the meta-data storage means. Accordingly, the following operation is achieved: transformation information for transforming, with reference to at least one captured image among captured images constituting a captured moving image, another captured image is calculated for each of frames; and the calculated transformation information is recorded as meta-data in association with the captured moving image and the frame.

Also, in the seventh aspect, the meta-data may include at least position information and posture information described in a coordinate system of the image capturing apparatus. Accordingly, the following operation is achieved: meta-data including at least position information and posture information described in a coordinate system of the image capturing apparatus is recorded.

According to the present invention, a great advantage that the details of a moving image shot by an image capturing apparatus can be easily understood in the case where the moving image is browsed can be achieved.

BRIEF DESCRIPTION OF DRAWINGS

FIG. 2 includes diagrams showing an example of an image corresponding to a frame included in a moving image.

FIG. 3 includes diagrams showing simplified images obtained by omitting the background and the like of the image corresponding to the frame included in the moving image.

FIG. 5 includes diagrams showing an example of transition in a moving image shot by a camera.

FIG. 6 includes diagrams in which, in individual images shown in FIG. 5, an image corresponding to the immediately preceding frame is indicated by broken lines, and additionally, exemplary detected optical flows are shown.

FIG. 8 includes diagrams showing a display example in the case where the moving image including the images 401 to 403 shown in FIG. 5 is played.

FIG. 9 includes diagrams showing an example of transition in a moving image shot by a camera.

FIG. 10 includes diagrams in which, in individual images shown in FIG. 9, an image corresponding to the immediately preceding frame is indicated by broken lines, and additionally, exemplary detected optical flows are shown.

FIG. 13 includes diagrams showing an example of transition in a moving image shot by a camera.

FIG. 14 includes diagrams in which, in individual images shown in FIG. 13, an image corresponding to the immediately preceding frame is indicated by broken lines, and additionally, exemplary detected optical flows are shown.

FIG. 18 includes diagrams showing an example of transition in a moving image shot by a camera.

FIG. 19 includes diagrams showing an example of transition in a moving image shot by a camera.

FIG. 20 includes diagrams showing an example of transition in a moving image shot by a camera.

FIG. 21 includes diagrams showing an example of transition in a moving image shot by a camera.

FIG. 22 includes diagrams showing an example of transition in a moving image shot by a camera.

FIG. 24 includes diagrams showing an example of transition in a moving image shot by a camera.

FIG. 29 includes diagrams showing an example of transition in a moving image shot by a camera.

FIG. 33 includes diagrams schematically showing individual files recorded in a moving-image storage unit 660 and in a meta-data storage unit 670 in the embodiment of the present invention.

FIG. 36 includes diagrams schematically showing a display-region moving method in the case where the current image protrudes from the display region.

FIG. 42 includes a diagram showing a display example (image 750) in the case where a moving image shot by a camera is played, and a diagram showing an image 754 in a state prior to performing an affine transformation of a current image 752 in the image 750.

FIG. 43 includes a diagram showing an image 755 in the case where an image region surrounded by a border 753 shown in FIG. 42 is enlarged and displayed, and a diagram showing an image 757 saved in a display memory 686 in a state where the affine-transformed current image is saved in an image memory 684.

FIG. 51 includes diagrams schematically showing the outline of an arithmetic scheme of performing processing of a plurality of items of data using individual commands, and a diagram showing the outline of a SIMD operation in which processing of a plurality of items of data is performed using a single command.

FIG. 53 is a diagram schematically showing the data structure and the flow of a process in the case where a filtering process is performed using a Sobel filter 830 on image data stored in a main memory 781 in the embodiment of the present invention.

FIG. 56 is a diagram schematically showing a vector operation method of performing vector operations using SIMD commands on items of vector data 841 to 849 in the case where a filtering process is performed using the Sobel filter 830 in the embodiment of the present invention.

BEST MODE FOR CARRYING OUT THE INVENTION

Next, embodiments of the present invention will now herein be described in detail with reference to the drawings.

Figure 1:
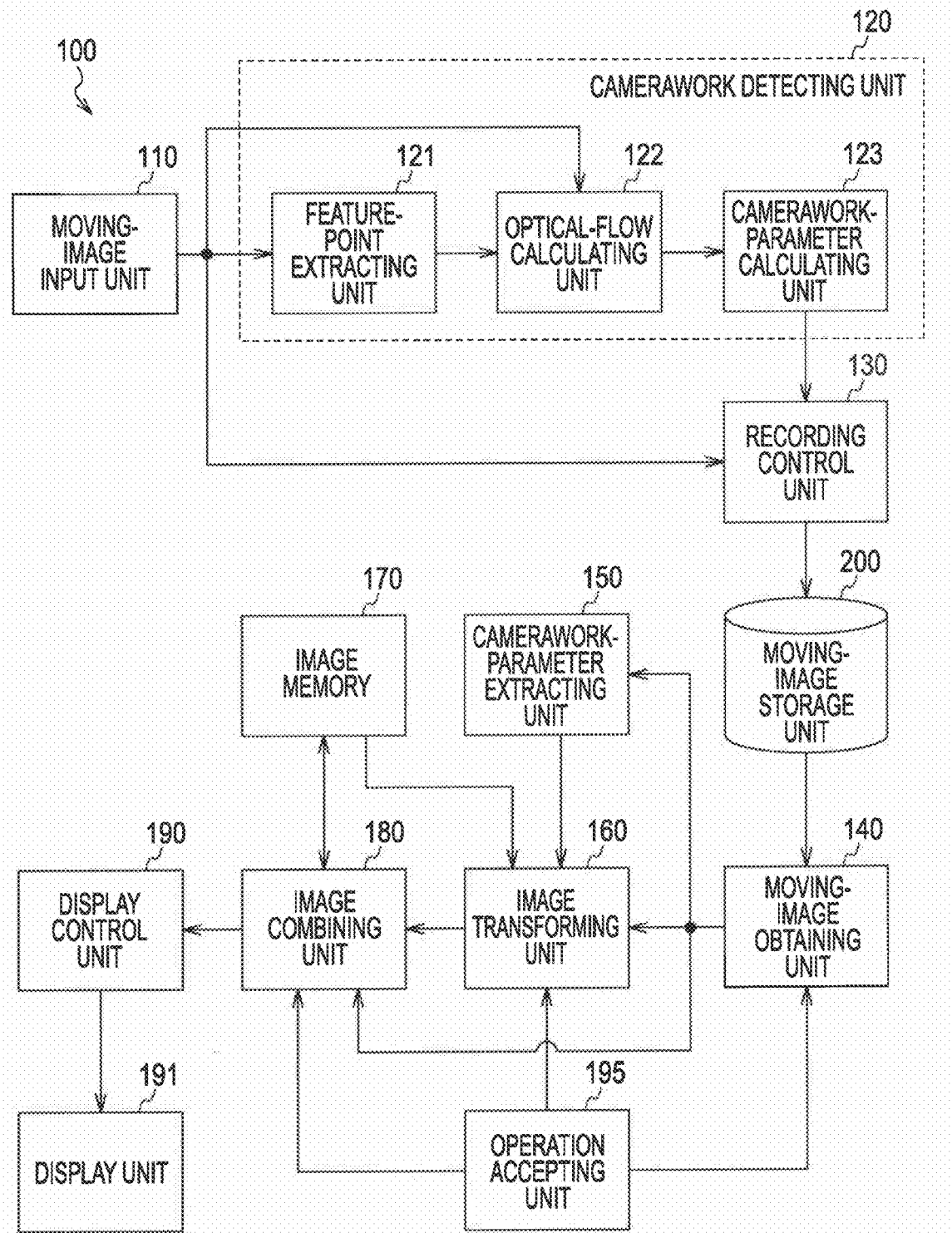
FIG. 1 is a block diagram showing a functional structure example of an image processing apparatus 100 in an embodiment of the present invention.

FIG. 1 is a block diagram showing a functional structure example of an image processing apparatus 100 in an embodiment of the present invention. The image processing apparatus 100 includes a moving-image input unit 110, a camerawork detecting unit 120, a recording control unit 130, a moving-image storage unit 200, a moving-image obtaining unit 140, a camerawork-parameter extracting unit 150, an image transforming unit 160, an image memory 170, an image combining unit 180, a display control unit 190, a display unit 191, and an operation accepting unit 195. The image processing apparatus 100 can be implemented by, for example, a personal computer that can extract, by performing a video image analysis, a feature amount of a moving image shot by an image capturing apparatus such as a digital video camera, and apply various types of image processing using the extracted feature amount.

The moving-image input unit 110 is a moving-image input unit that receives a moving image captured by an image capturing apparatus such as a digital video camera (hereinafter simply called a "camera"), and outputs the received moving image to the camerawork detecting unit 120.

The camerawork detecting unit 120 is configured to detect camera movement information (camerawork) at the time of shooting an image, by analyzing a moving image output from the moving-image input unit 110. The camerawork detecting unit 120 includes a feature-point extracting unit 121, an optical-flow calculating unit 122, and a camerawork-parameter calculating unit 123. That is, the camerawork detecting unit 120 extracts feature points from each of images constituting a moving image, additionally extracts optical flows (motion vectors) corresponding to the feature points, selects a feature point that shows a dominant motion by analyzing the optical flows corresponding to the extracted feature points, and estimates the camera movement on the basis of the optical flow corresponding to the feature point that shows the dominant motion. Here, the dominant motion means a regular motion indicated by a relatively large number of optical flows, among optical flows corresponding to a plurality of feature points.

The feature-point extracting unit 121 is configured to extract feature points from images corresponding to frames constituting a moving image output from the moving-image input unit 110 and to output the extracted feature points to the optical-flow calculating unit 122. Here, the feature-point extracting unit 121 extracts, for the head frame among frames constituting a moving image output from the moving-image input unit 110, feature points from the entire image, and, for frames other than the head frame, extracts feature points from a region part, an image of which was newly shot, compared with an image corresponding to the immediately preceding frame. Note that, for example, a point with a steeper edge gradient in the vertical direction or the horizontal direction (generally called a "corner point"; hereinafter called a "corner point") can be extracted as a feature point. The corner point is a feature point that is strong in calculating an optical flow and can be obtained using edge detection. Note that the extraction of corner points will be described in detail with reference to FIG. 2 and FIG. 3. Also, in this example, the feature-point extracting unit 121 extracts feature points from the entire image for the head frame, and, for frames other than that at the head, extracts feature points from a region part, an image of which was newly shot, compared with the immediately preceding image. However, in accordance with the processing capability or the like, the feature-point extracting unit 121 may extract feature points from the entire image for each of frames other than that at the head.

The optical-flow calculating unit 122 is configured to calculate an optical flow corresponding to each feature point output from the feature-point extracting unit 121, and outputs an optical flow obtained by calculation to the camerawork-parameter calculating unit 123. Specifically, the optical-flow calculating unit 122 obtains, as optical flows of the current frame, optical flows corresponding to individual feature points in an image corresponding to the immediately preceding frame by comparing images individually corresponding to two consecutive frames included in a moving image output from the moving-image input unit 110 (the current frame and the immediately preceding frame). Also, optical flows are obtained for each of frames constituting a moving image. Note that detection methods such as a gradient method and a block matching method can be used as detection methods for detecting optical flows. Note that the calculation of optical flows will be described in detail with reference to FIG. 2 and FIG. 3.

The camerawork-parameter calculating unit 123 is configured to perform a camerawork-parameter calculating process of calculating camerawork parameters using optical flows corresponding to individual feature points, which are output from the optical-flow calculating unit 122, and outputs the calculated camerawork parameters to the recording control unit 130. Here, in the embodiment of the present invention, images constituting a moving image to be played are transformed in accordance with the camera movement and are displayed. In order to perform transformation of the images, the camera movement is extracted using optical flows calculated by the optical-flow calculating unit 122, and, on the basis of the extracted movement, camerawork parameters (transformation parameters) are calculated. Note that, in the embodiment of the present invention, an example in which an affine transformation is used as an image transformation method of transforming images constituting a moving image to be played will be described. Also, an example in which affine transformation parameters corresponding to an inverse matrix of a matrix of affine transformation parameters calculated on the basis of optical flows are used as camerawork parameters will be described. That is, in the embodiment of the present invention, affine transformation parameters used as transformation information are defined as affine transformation parameters corresponding, not to an affine matrix representing the motion of feature points between consecutive images, but to an affine matrix indicating, when one of consecutive images is used as a reference image, where an image subsequent to the reference image moves. Also, although an example in which affine transformation parameters are used as camerawork parameters will be described, other image transforming methods, such as projective transformation, may be used. Note that an affine transformation parameter can be obtained by calculation using vectors of three points. Also, a projective transformation parameter can be obtained by calculation using vectors of four points. Here, camerawork parameters are transformation information for transforming, with reference to at least one captured image among captured images constituting a captured moving image, another captured image, and at least includes position information and posture information described in the camera coordinate system. That is, camerawork parameters include information regarding the position and posture of a camera in the case where an image is being shot by a photographer. Also, on the basis of affine transformation parameters obtained by the camerawork-parameter calculating unit 123, the camera movement in response to an operation entered by the photographer, such as zooming in, zooming out, panning, tilting, and rotation, can be estimated. Note that the calculation of affine transformation parameters will be described in detail with reference to FIG. 2 and FIG. 3.

The recording control unit 130 is configured to record, in the moving-image storage unit 200, a moving image output from the moving-image input unit 110 and affine transformation parameters output from the camerawork-parameter calculating unit 123 as a moving image file by associating the corresponding frame and affine transformation parameters with each other.

The moving-image storage unit 200 is configured to store a moving image file in which a frame and affine transformation parameters that correspond to each other are associated with each other. Also, the moving-image storage unit 200 supplies a moving image file to the moving-image obtaining unit 140 in response to a request from the moving-image obtaining unit 140.

The moving-image obtaining unit 140 is configured to obtain a moving image file stored in the moving-image storage unit 200 in response to an operation input from the operation accepting unit 195, which relates to obtaining of a moving image, and to output the obtained moving image file to the camerawork-parameter extracting unit 150, the image transforming unit 160, and the image combining unit 180.

The camerawork-parameter extracting unit 150 is configured to extract, on a frame-by-frame basis, affine transformation parameters recorded in association with a moving image file output from the moving-image obtaining unit 140, and outputs the extracted affine transformation parameters to the image transforming unit 160.

The image transforming unit 160 is configured to apply, on a frame-by-frame basis, an affine transformation to images constituting a moving image in a moving image file output from the moving-image obtaining unit 140, or an image held in the image memory 170, using affine transformation parameters output from the camerawork-parameter extracting unit 150, and to output the affine-transformed images to the image combining unit 180. Specifically, in the case where a moving image is to be played and displayed while fixing a composite image that is generated by combining images corresponding to individual frames preceding the current frame, the image transforming unit 160 performs an affine transformation of an image corresponding to the current frame, which is output from the moving-image obtaining unit 140, using affine transformation parameters output from the camerawork-parameter extracting unit 150. In contrast, in the case where a moving image is to be played and displayed while fixing an image corresponding to the current frame, the image transforming unit 160 performs an affine transformation of a composite image generated by combining images corresponding to individual preceding frames, which is held in the image memory 170, using affine transformation parameters output from the camerawork-parameter extracting unit 150, in a direction opposite to that of the affine transformation parameters. Also, in the case where a moving image is to be played and displayed while fixing the display magnification of an image corresponding to the current frame, the image transforming unit 160 separates affine transformation parameters output from the camerawork-parameter extracting unit 150 into elements relating to enlargement/reduction (zoom components) and elements other than enlargement/reduction (elements relating to movement or rotation). The image transforming unit 160 applies an affine transformation to a composite image corresponding to the individual preceding frames, which is held in the image memory 170, using the elements relating to enlargement/reduction in a direction opposite to that of the affine transformation parameters, and, applies an affine transformation to the image corresponding to the current frame, which is output from the moving-image obtaining unit 140, using the elements relating to movement or rotation. These transformations are performed in accordance with operation inputs from the operation accepting unit 195, which relate to playback instructions. Note that these image transformations will be described in detail with reference to FIG. 5 to FIG. 16 and the like.

The image memory 170 is a work buffer that holds a composite image generated by the combining performed by the image combining unit 180. The image memory 170 is configured to supply a held composite image to the image transforming unit 160 or the image combining unit 180. That is, the image memory 170 is an image memory that holds a history image.

The image combining unit 180 is configured to combine an image output from the image transforming unit 160, a composite image held in the image memory 170, or an image output from the moving-image obtaining unit 140, and to output a composite image generated by the combining to the image memory 170 and the display unit 191. Specifically, when a moving image is to be played and displayed while fixing a composite image generated by combining images corresponding to individual frames preceding the current frame, the image combining unit 180 writes an affine-transformed image generated by the image transforming unit 160 over the composite image corresponding to the individual preceding frames, which is held in the image memory 170, thereby combining the images. In contrast, when a moving image is to be played and displayed while fixing an image corresponding to the current frame, the image combining unit 180 writes the image corresponding to the current frame, which is output from the moving-image obtaining unit 140, over an image generated by performing, with the image transforming unit 160, an affine transformation of a composite image corresponding to the individual preceding frames, which is held in the image memory 170, thereby combining the images. Alternatively, when a moving image is to be played and displayed while fixing the display magnification of an image corresponding to the current frame, the image combining unit 180 writes an affine-transformed image corresponding to the current frame, which is generated by the image transforming unit 160, over an affine-transformed composite image corresponding to individual preceding frames, which is generated by the image transforming unit 160, thereby combining the images. These combing operations are performed in accordance with operation inputs from the operation accepting unit 195, which relate to playback instructions. Note that these image combining operations will be described in detail with reference to FIG. 5 to FIG. 16 and the like.

The display control unit 190 is configured to sequentially display, on the display unit 191, a composite image generated by the combining performed by the image combining unit 180, on a frame-by-frame basis.

The display unit 191 is configured to display, under control of the display control unit 190, a composite image generated by the combining performed by the image combining unit 180. For example, the display unit 191 can be implemented by a display of a personal computer or a television. Note that display examples of a composite image will be described in detail with reference to FIG. 17 to FIG. 24, FIG. 28 to FIG. 31, and the like.

The operation accepting unit 195 includes various operation keys and the like and is configured to output, upon accepting an operation input entered using these keys, the details of the accepted operation input to the moving-image obtaining unit 140, the image transforming unit 160, or the image combining unit 180. The operation accepting unit 195 includes, for example, a setting key for setting a display mode in the case where a moving image is played. As display modes thereof, for example, there is a display mode in which an affine transformation is applied to an image corresponding to the current frame, and a composite image is generated by combining the affine-transformed image with a composite image corresponding to individual preceding frames and is displayed, or a display mode in which an affine transformation is applied to a composite image corresponding to individual preceding frames in a direction opposite to that of affine transformation parameters, and a composite image is generated by combining the affine-transformed composite image with an image corresponding to the current frame and is displayed. That is, according to the embodiment of the present invention, displaying can be performed by arbitrarily switching between an image combining/displaying method in which history images in the past are transformed while fixing a current image display border, and an image combining/displaying method in which the current image display border is moved on the basis of camerawork.

Next, a detection method of detecting affine transformation parameters used in image transformation will be described in detail with reference to the drawings.

Parts (a) to (c) of FIG. 2 are diagrams showing an example of an image corresponding to a frame included in a moving image. Part (a) of FIG. 3 is a diagram showing a simplified image obtained by omitting the background and the like of an image corresponding to a frame that is one frame before a frame corresponding to an image 300 shown in FIG. 2. Also, parts (b) and (c) of FIG. 3 are diagrams showing simplified images obtained by omitting the background and the like of the image 300 shown in FIG. 2.

The images 300, 320, and 330 shown in FIG. 2 and FIG. 3 include images 301, 321, and 331 of a horse, on which a person is mounting, and images 302, 322, and 332 of a snake positioned just before the horse's images 301, 321, and 331. Also, as shown in FIG. 2, flags, chairs, and the like exist in the background of these images, and the flags are fluttering in the wind.

The image 320 shown in part (a) of FIG. 3 is a simplified image of an image corresponding to a frame that is one frame before a frame corresponding to the images 300 and 330 shown in parts (a) to (c) of FIG. 2 and parts (b) and (c) of FIG. 3. Also, the images 320 and 330 corresponding to two consecutive frames are images that show transition in the case where a subject in the screen becomes gradually larger. That is, at the time this image was shot, a zoom-in operation, which is an operation for gradually increasing the size of a subject in the screen, is performed.

In the embodiment of the present invention, a method of detecting feature points in each of images constituting a moving image and calculating affine transformation parameters using optical flows corresponding to the feature points will be described by way of example. Also, in this example, the case where corner points are used as feature points will be described.

Here, in parts (a) to (c) of FIG. 3, a method of calculating affine transformation parameters using optical flows corresponding to three corner points detected in the images 320 and 330 will be described by way of example.

For example, it is assumed that, in the image 320 shown in part (a) of FIG. 3, a corner point 323 near the mouth of the horse's image 321, a corner point 324 near the hip of the person in the horse's image 321, and a corner point 325 near the mouth of the snake's image 322 are detected as feature points. In this case, in the image 330 shown in part (b) of FIG. 3, optical flows 337, 338, and 339 corresponding to the corner points 323, 324, and 325 in the image 320 are detected using a gradient method, a block matching method, or the like. On the basis of the detected optical flows 337, 338, and 339, corner points 333, 334, and 335 corresponding to the corner points 323, 324, and 325 in the image 320 are detected.

Here, for example, the horse's images 321 and 331 and the snake's images 322 and 332 included in the images 320 and 330 shown in parts (a) and (b) of FIG. 3 are positioned on the ground, and accordingly, do not move independently of the camera movement. Therefore, the camera movement can be accurately estimated on the basis of the optical flows obtained for the corner points detected in the horse's images 321 and 331 and the snake's images 322 and 332. For example, as shown in part (c) of FIG. 3, on the basis of the three optical flows 337 to 339 detected in the image 330, it can be estimated that the image 330 is obtained by enlarging the image 320, with a point 336 serving as the center. Accordingly, the camera movement at the time of shooting the image 330 can be determined as a zoom-in operation performed with the point 336 serving as the center. As above, corner points in an object that does not move independently of the camera movement are detected, and, on the basis of optical flows obtained for these corner points, the camera movement with certain regularity can be accurately detected. Therefore, affine transformation parameters can be calculated and obtained using optical flows obtained for these corner points.

However, the case where, as in a flag fluttering in the wind or the like, an object that moves independently of the camera movement is included in an image is conceivable. For example, the image 300 shown in FIG. 2 includes flags fluttering in the wind. In the case where corner points in such an object that moves independently of the camera movement are detected, and the camera movement is estimated using optical flows obtained for these corner points, the camera movement cannot be accurately estimated.

For example, optical flows detected in the image 300 shown in part (b) of FIG. 2 are denoted by arrows, and additionally, corner points detected from the optical flows are denoted by empty circles at the tip of the arrows. Here, corner points 303 to 305 are corner points corresponding to the corner points 333 to 335 shown in parts (b) and (c) of FIG. 3. Also, corner points 306 to 311 are corner points detected in flags existing in the background of the horse's image 301. Since these flags are fluttering in the wind, the flag movement due to the effect of the wind is detected as optical flows. That is, optical flows individually corresponding to the corner points 306 to 311 are detected in the flags which move independently of the camera movement. Therefore, when three optical flows used in the case of calculating affine transformation parameters include an optical flow corresponding to at least one corner point among the corner points 306 to 311, the accurate camera movement cannot be detected. In this case, accurate affine transformation parameters cannot be calculated.

As shown above, for example, there are instances where optical flows corresponding to objects that move independently of the camera movement (optical flows individually corresponding to the corner points 306 to 311 shown in part (b) of FIG. 2) and optical flows with certain regularity with respect to the camera movement (optical flows other than the individual optical flows corresponding to the corner points 306 to 311 shown in part (b) of FIG. 2) are detected in a shot image.

Therefore, in the embodiment of the present invention, an example in which an affine-transformation-parameter calculating process of calculating affine transformation parameters is performed a plurality of times on the basis of three optical flows, thus obtaining a plurality of affine transformation parameters, and, from among these affine transformation parameters, an optimal affine transformation parameter is selected, will be described. Note that, in this example, the size of a moving object included in each of images constituting a moving image is relatively small, with respect to the area of the image.

Here, an affine transformation will be briefly described. In two dimensions, when the position of a movement source is (x, y) and the position of a movement destination subsequent to an affine transformation is (x', y'), the matrix of the affine transformation can be expressed by equation 1.

[Eq. 1]

$$(x' \quad y' \quad 1) = (x \quad y \quad 1) \begin{pmatrix} a & d & 0 \\ b & e & 0 \\ c & f & 1 \end{pmatrix} \quad \text{(Eq. 1)}$$

Here, a to f are affine transformation parameters. Also, an affine matrix AM including these affine transformation parameters can be expressed by the following equation. In this case, a zoom component XZ in the X direction, a zoom component YZ in the Y direction, a translation component XT in the X direction, a translation component YT in the Y direction, and a rotation component R can be individually obtained by the following equations. Note that, in the case of an identity matrix, a=e=1 and b=c=d=f=0.

$$AM = \begin{pmatrix} a & b & c \\ d & e & f \end{pmatrix} \quad [\text{Eq. 2}]$$
$$XZ = \sqrt{a^2 + d^2}$$
$$YZ = \sqrt{b^2 + e^2}$$
$$XT = c$$
$$YT = f$$
$$R = \tan^{-1}\left(\frac{d}{a}\right)$$

Next, an affine-transformation-parameter calculating method will be described.

At first, in an image corresponding to the current frame, which is one frame among frames constituting a moving image, three feature points are selected from among feature points based on which optical flows are detected. For example, three corner points are randomly selected from among corner points (denoted by empty circles) detected in the image 300 shown in part (b) of FIG. 2. Note that four feature points are selected at random when projective transformation parameters are used as camerawork parameters.

Then, using three optical flows corresponding to the selected three feature points, affine transformation parameters are calculated. For example, affine transformation parameters are calculated using optical flows (denoted by arrows connected to empty circles) corresponding to three corner points selected from among the corner points (denoted by empty circles) in the image 300 shown in part (b) of FIG. 2. The affine transformation parameters can be obtained using equation 1.

Then, on the basis of the obtained affine transformation parameters, the score for the affine transformation parameters is calculated. Specifically, using the obtained affine transformation parameters, the positions of the movement destinations of all feature points in an image corresponding to a frame immediately preceding the current frame are obtained. A difference value between the positions of two corresponding feature points is calculated, on a feature-point-by-feature-point basis, by comparing the position of one feature obtained using the affine transformation parameters with the position of the other feature point detected in the current frame. As the difference value, for example, the absolute distance between the positions of the two corresponding feature points is calculated. Then, the calculated difference value is compared with a preset threshold on a feature-point-by-feature-point basis, and the number of feature points whose difference values are smaller than the threshold is obtained as the score for the affine transformation parameters. As above, three feature points are randomly selected from among feature points based on which optical flows are detected. On the basis of optical flows corresponding to these feature points, a process of calculating the score for the affine transformation parameters is repeated a predetermined number of times, whereby a plurality of scores for affine transformation parameters are calculated. This predetermined number of times may be set, as needed, in accordance with the type of image to be compared, the processing capability of the image processing apparatus 100, or the like. Alternatively, a fixed value may be used as the predetermined number of times. As the predetermined number of times, for example, about 20 times can be set by taking into consideration the processing capability of the image processing apparatus 100.

For example, the case where three corner points other than the corner points 306 to 311 are selected from among corner points detected in the image 300 shown in part (b) of FIG. 2 is considered. When affine transformation parameters are calculated using three optical flows corresponding to the above-selected three corner points, as has been described above, since the three optical flows have certain regularity, affine transformation parameters that transform an image corresponding to the immediately preceding frame in accordance with the certain regularity are obtained. Therefore, regarding the positions of corner points obtained using the affine transformation parameters and the positions of corner points detected in the current frame, difference values obtained for corner points other than the corner points 306 to 311 are calculated as relatively small values. Thus, the score for the affine transformation parameters becomes a large value.

In contrast, the case where three corner points at least including one of the corner points 306 to 311 are selected from among corner points detected in the image 300 shown in part (b) of FIG. 2 is considered. When affine transformation parameters are calculated using three optical flows corresponding to the above-selected three corner points, as has been described above, since the three optical flows include an optical flow that does not have certain regularity, affine transformation parameters that do not transform an image corresponding to the immediately preceding frame in accordance with the certain regularity are obtained. Therefore, difference values obtained for the positions of corner points obtained using the affine transformation parameters and the positions of corner points detected in the current frame are calculated as relatively large values at arbitrary corner points. Thus, the score for the affine transformation parameters becomes a small value.

Then, among the obtained plurality of scores for affine transformation parameters, affine transformation parameters whose score has the greatest value are selected as representative affine transformation parameters. The selected representative affine translation parameters are recorded in association with the current frame in the moving-image storage unit 200. In this way, in the case where affine transformations of images constituting a moving image are to be performed, affine transformations can be performed using optimal affine transformation parameters.

As shown above, even when each of images constituting a moving image includes an object that moves (moving object), such as a person or a car, if the size of the moving object is relatively small with respect to the area of the image, the camera movement can be extracted without being affected by the moving object.

Also, a movement that is regarded to be intentionally caused by a photographer, such as zooming-in, zooming-out, panning, tilting, and rotation, can be estimated by extracting the camera movement.

Next, the operation of the image processing apparatus 100 in the embodiment of the present invention will be described with reference to the drawings.

Figure 4:
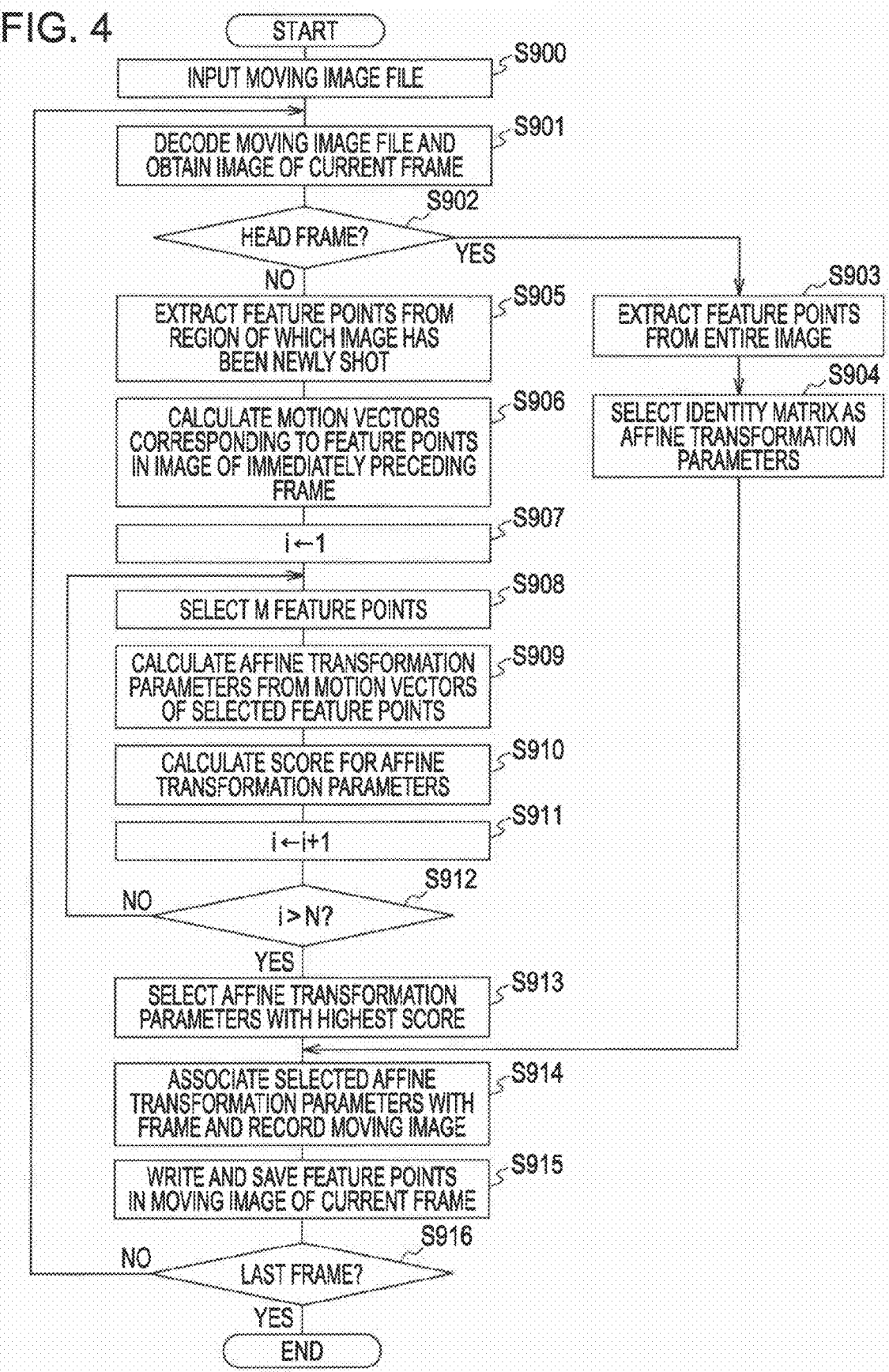
FIG. 4 is a flowchart showing a processing procedure of an affine-transformation-parameter detecting process performed by the image processing apparatus 100 in the embodiment of the present invention.

FIG. 4 is a flowchart showing a processing procedure of an affine-transformation-parameter detecting process performed by the image processing apparatus 100 in the embodiment of the present invention.

At first, a moving image file is input to the moving-image input unit 110 (step S900). Then, the moving image file input to the moving-image input unit 110 is decoded, and an image of one frame is obtained in the order of time series (step S901). Then, it is determined whether or not the obtained one frame is the head frame of the moving image file input to the moving-image input unit 110 (step S902). When the obtained one frame is the head frame (step S902), feature points are extracted from the entire image corresponding to the head frame (step S903). For example, as shown in part (b) of FIG. 2, a plurality of corner points are extracted in the image. Then, affine transformation parameters in an identity matrix are selected as affine transformation parameters (step S904), and the flow proceeds to step S914.

In contrast, when the obtained one frame is not the head frame (step S902), feature points are extracted from a region whose image was newly shot, with reference to an image corresponding to the immediately preceding frame (step S905). That is, since feature points that have already been extracted in the image corresponding to the immediately preceding frame can be obtained by optical flows corresponding to these feature points, these feature points are not extracted in the image corresponding to the current frame.

Then, optical flows corresponding to the individual feature points extracted from the image corresponding to the immediately preceding frame are calculated (step S906). That is, as shown in part (b) of FIG. 2, optical flows corresponding to the individual corner points are calculated.

Then, a variable i is initialized to "1" (step S907). Then, M feature points are selected from among the feature points based on which the optical flows have been detected (step S908). For example, three feature points are selected at random when affine transformation parameters are used as camerawork parameters. Also, four feature points are selected at random when projective transformation parameters are used as camerawork parameters. Then, affine transformation parameters are calculated on the basis of the M optical flows calculated in correspondence with the selected M feature points (step S909).

Then, on the basis of the affine transformation parameters obtained by calculation, the score for the affine transformation parameters is calculated (step S910). Specifically, using the affine transformation parameters obtained by calculation, the positions of the movement destinations of all feature points in the image corresponding to the immediately preceding frame are obtained. A difference value between the positions of two corresponding feature points is calculated, on a feature-point-by-feature-point basis, by comparing the position of one feature point obtained using the affine transformation parameters with the position of the other feature point in the image corresponding to the current frame, which has been obtained at the time of calculating the optical flows in step S906. As the difference value, for example, the absolute distance between the two corresponding positions is calculated. Then, the calculated difference value is compared with a preset threshold on a feature-point-by-feature-point basis, and the number of feature points whose difference values are smaller than the threshold is obtained as the score for the affine transformation parameters.

Then, "1" is added to the variable i (step S911), and it is determined whether or not the variable i is greater than a constant N (step S912). When the variable i is less than or equal to the constant N (step S912), the flow returns to step S908, and the affine-transformation-parameter-score calculating process is repeated (steps S908 to S910). For example, 20 can be used as the constant N.

In contrast, when the variable i is greater than the constant N (step S912), among the obtained scores for the affine transformation parameters, the affine transformation parameters whose score has the greatest value are selected as representative affine transformation parameters (step S913). Then, affine transformation parameters of an inverse matrix corresponding to the matrix of the selected representative affine transformation parameters are recorded in association with the current frame in the moving-image storage unit 200 (step S914). Note that, when the current frame is the head frame, the selected affine transformation parameters of an identity matrix are recorded in association with the head frame in the moving-image storage unit 200. Then, the image corresponding to the current frame and the feature points in this image are written over and saved (step S915).

Then, it is determined whether or not the current frame is the last frame of the moving image file input to the moving-image input unit 110 (step S916). When the current frame is not the last frame (step S916), the flow returns to step S901, and the affine-transformation-parameter detecting process is repeated (steps S901 to S915). In contrast, when the current frame is the last frame (step S916), the affine-transformation-parameter detecting process is terminated.

In the embodiment of the present invention, the example in which, as detection of camerawork parameters, affine transformation parameters are detected on the basis of optical flows detected in images constituting a moving image has been described. However, a sensor such as an acceleration sensor or a gyro sensor or a zoom button used at the time of performing a zoom operation may be provided on the camera. The amount of the camera movement at the time of shooting an image may be detected using the sensor or the zoom button, and, on the basis of the amount of the camera movement, camerawork parameters may be obtained. Note that the detected amount of the camera movement at the time of shooting an image can be used at the time of determining whether or not camerawork parameters obtained by the camerawork-parameter calculating unit 123 are correct. Also, a plurality of camerawork parameters may be detected by the camerawork-parameter calculating unit 123, and, on the basis of the detected amount of the camera movement at the time of shooting an image, one camerawork parameter may be selected from among the plurality of camerawork parameters.

Next, the case in which a moving image is played and displayed using the above-described affine transformation parameters will be described in detail with reference to the drawings. Note that individual images shown in FIG. 5 to FIG. 16 are simplified, for the sake of the description, and additionally, the amount of movement between two consecutive frames is enlarged and shown.

At first, the case in which, at the time of shooting an image using a camera, although the magnification remains unchanged, the lens of the camera is moved in any of upward, downward, leftward, and rightward directions, with the camera position serving as the center, will be described.

FIG. 5 includes diagrams showing an example of transition in a moving image shot by a camera. In FIG. 5, the diagrams show images 401 to 403 corresponding to consecutive frames included in the moving image in the case where the image of a person 400 with a mountain in the background has been shot. In this example, the case where a photographer is shooting the image while moving the lens of the camera in the rightward and upward directions is illustrated. In this case, the person 400 included in the moving image shot by the camera moves from the right side to the left side, and additionally moves downward in images constituting the moving image.

FIG. 6 includes diagrams in which, in the individual images shown in FIG. 5, an image corresponding to the immediately preceding frame is indicated by broken lines, and additionally, exemplary detected optical flows are shown.

The image 401 shown in part (a) of FIG. 6 is the same as the image 401 shown in part (a) of FIG. 5. Also, portions indicated by solid lines in the image 402 shown in part (b) of FIG. 6 are the same as the image 402 shown in part (b) of FIG. 5, and portions indicated by broken lines in the image 402 shown in part (b) of FIG. 6 are the same as portions indicated by solid lines in the image 401 shown in part (a) of FIG. 6. Also, arrows 404 to 406 in the image 402 shown in part (b) of FIG. 6 illustrate exemplary optical flows detected in the image 402. Similarly, portions indicated by solid lines in the image 403 shown in part (c) of FIG. 6 are the same as the image 403 shown in part (c) of FIG. 5, and portions indicated by broken lines in the image 403 shown in part (c) of FIG. 6 are the same as the portions indicated by the solid lines in the image 402 shown in part (b) of FIG. 6. Also, arrows 407 to 409 in the image 403 shown in part (c) of FIG. 6 illustrate exemplary optical flows detected in the image 403.

As shown in parts (b) and (c) of FIG. 6, the person 400 and the mountain in the background, which are included in the image, move in accordance with the camera movement. On the basis of optical flows detected from this movement, affine transformation parameters can be obtained on a frame-by-frame basis.

Figure 7:
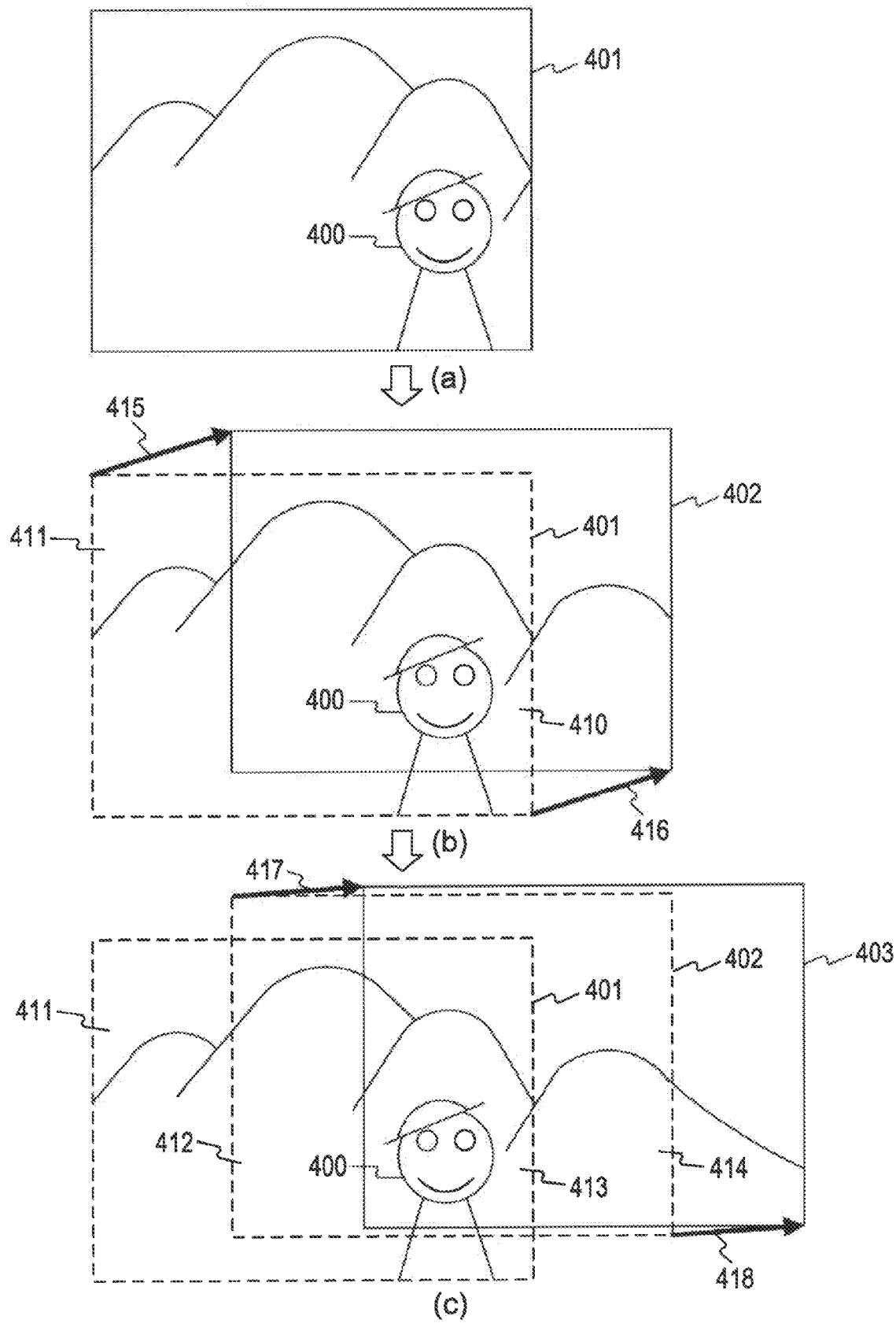
FIG. 7 includes diagrams showing a display example in the case where a moving image including images 401 to 403 shown in FIG. 5 is played.

FIG. 7 includes diagrams showing a display example in the case where a moving image including the images 401 to 403 shown in FIG. 5 is played. Note that, in the embodiment of the present invention, since individual images constituting a moving image are combined, as the playback time elapses, an image displayed on the display unit 191 becomes larger than a normal image. Therefore, an image that is displayed first is displayed as a relatively small image, compared with the size of a display region of the display unit 191. Note that the size, position, and the like of an image displayed first may be specified by the user.

As shown in part (a) of FIG. 7, at first, only the image 401 corresponding to the head frame is displayed. Here, when the matrix of affine transformation parameters (3×3 matrix) corresponding to the image 401 is A1, the value of A1 is obtained, and, with reference to the position and size of the image 401 of the head frame, the image 401 is affine-transformed using the obtained A1 matrix. Here, since A is an identity matrix, the position and size of the image 401 are not transformed. Then, when the image 402 corresponding to the next frame is to be displayed, the image 402 is affine-transformed using affine transformation parameters associated with this frame. Specifically, when the matrix of affine transformation parameters corresponding to the image 402 is A2 and the matrix of affine transformation parameters corresponding to the image 401 is A1, the value of A1×A2 is obtained, and, with reference to the position and size of the image 401 of the head frame, the image 402 is affine-transformed using the obtained A1×A2 matrix. In the image shown in part (b) of FIG. 7, only the position of the image 402 is transformed. The image 402, which has been affine-transformed using the affine transformation parameters, is written over so as to overlap the image 401 corresponding to the immediately preceding frame. That is, within the region of the image 401, an image of the image 402 is written over a region 410 overlapping the image 402. Also, within the region of the image 401, an image of the image 401 is combined in a region 411 that that does not overlap the image 402. That is, when the image 402 corresponding to the second frame is to be displayed, as shown in part (b) of FIG. 7, a composite image generated by combining the entire portion of the image 402 and a portion of the image 401 corresponding to the region 411 is displayed. Also, an image border indicating that this is the latest image among displayed images can be displayed around the image corresponding to the current frame. In part (b) of FIG. 7, an image border is displayed around the image 402. Also, the affine transformation parameters used to affine-transform the image 402 are held in the image transforming unit 160.

Then, when the image 403 corresponding to the next frame is to be displayed, the image 403 is affine-transformed using affine transformation parameters associated with this frame. That is, the image 403 is affine-transformed using affine transformation parameters obtained using a matrix of affine transformation parameters corresponding to the image 403 and the matrix of the affine transformation parameters corresponding to the image 402, which are used in the immediately preceding affine transformation. Specifically, when the matrix of affine transformation parameters corresponding to the image 403 is A3, the matrix of affine transformation parameters corresponding to the image 402 is A2, and the matrix of affine transformation parameters corresponding to the image 401 is A1, the value of A1×A2×A3 is obtained, and, with reference to the position and size of the image 401 of the head frame, the image 403 is affine-transformed using the obtained A1×A2×A3 matrix. In the image shown in part (c) of FIG. 7, only the position of the image 403 is transformed. The image 403, which has been affine-transformed using the affine transformation parameters, is written over so as to overlap a composite image of the images 401 and 402 corresponding to the preceding frames. That is, within the region of the composite image of the images 401 and 402, an image of the image 403 is written over regions 413 and 414 overlapping the image 403. Also, within the region of the composite image of the images 401 and 402, the composite image of the images 401 and 402 is combined in regions 411 and 412 that do not overlap the image 403. That is, when the image 403 corresponding to the third frame is to be displayed, as shown in part (c) of FIG. 7, a composite image generated by combining the entire portion of the image 403, the portion of the image 401 corresponding to the region 411, and a portion of the image 402 corresponding to the region 412 is displayed. Also, when an image border indicating that this is the latest image among displayed images is to be displayed around the image corresponding to the current frame, the image border is displayed around the image 403 shown in part (c) of FIG. 7. Also, the affine transformation parameters used to affine-transform the image 403 are held in the image transforming unit 160. That is, the affine transformation parameters obtained by multiplying the matrices of the affine transformation parameters corresponding to the images 402 and 403, respectively, are held in the image transforming unit 160. As above, when an image corresponding to the current frame is to be affine-transformed, the image corresponding to the current frame is affine-transformed using affine transformation parameters obtained using a matrix of affine transformation parameters corresponding to the current frame and a matrix of affine transformation parameters corresponding to each of frames preceding the current frame. The affine transformation parameters obtained at the time of the affine transformation are held in the image transforming unit 160, and used in the next affine transformation. Also, the same applies to the cases in FIG. 11 and FIG. 15.

FIG. 8 includes diagrams showing a display example in the case where a moving image including the images 401 to 403 shown in FIG. 5 is played. In the display example shown in FIG. 7, a composite image corresponding to individual frames preceding the current frame (one image at the beginning) is fixed, the affine-transformed image corresponding to the current frame is written over and combined with the composite image, and an image generated by the combining is displayed. In contrast, in the display example shown in FIG.

8, the position of the image corresponding to the current frame is fixed, a composite image corresponding to individual frames preceding the current frame is affine-transformed in a direction opposite to that of affine transformation parameters, the image corresponding to the current frame is written over and combined with the affine-transformed composite image, and an image generated by the combining is displayed. That is, in the display examples shown in FIG. 7 and FIG. 8, although an image displayed at a fixed position and an image to be affine-transformed are different, other portions are common. Therefore, the portions common to those in FIG. 7 are given common reference numerals and described.

As shown in part (a) of FIG. 8, at first, only the image 401 corresponding to the head frame is displayed. Here, since the image 401 is the head frame, no previous frame exists. Then, when the image 402 corresponding to the next frame is to be displayed, the image 401, which is the immediately preceding image, is affine-transformed using affine transformation parameters associated with this frame. Specifically, when the matrix of affine transformation parameters corresponding to the image 402 is A2 and the matrix of affine transformation parameters corresponding to the image 401 is A1, the value of Inv (A1×A2) is obtained, and the image 401 is affine-transformed using the obtained Inv (A1×A2) matrix. Here, Inv A (A is a matrix) indicates an inverse matrix of A. In the image shown in part (b) of FIG. 8, only the position of the image 401 is transformed. The image 402 corresponding to the current frame is written over so as to overlap the affine-transformed image 401. Note that a composite image generated by writing the image 402 over the image 401 is the same as the composite image shown in part (b) of FIG. 7, and accordingly, a description thereof is omitted here.

Then, when the image 403 corresponding to the next frame is to be displayed, using affine transformation parameters associated with this frame, a composite image of the image 401 and the image 402 corresponding to the preceding frames is affine-transformed in a direction opposite to that of the affine transformation parameters. Specifically, when the matrix of affine transformation parameters corresponding to the image 403 is A3, the matrix of affine transformation parameters corresponding to the image 402 is A2, and the matrix of affine transformation parameters corresponding to the image 401 is A1, the value of Inv (A1×A2×A3) is obtained, and the composite image of the images 401 and 402 is affine-transformed using the Inv (A1×A2×A3) matrix. In the image shown in part (c) of FIG. 8, only the position of the composite image of the image 401 and the image 402 is transformed. The image 403 corresponding to the current frame is written over so as to overlap the affine-transformed composite image of the images 401 and 402. Note that a composite image generated by writing the image 403 over the images 401 and 402 is the same as the composite image shown in part (c) of FIG. 7, and accordingly, a description thereof is omitted here.

Next, the case in which, at the time of shooting an image using a camera, although the lens direction of the camera remains unchanged, the magnification is changed will be described.

FIG. 9 includes diagrams showing an example of transition in a moving image shot by a camera. In FIG. 9, the diagrams show images 421 to 423 corresponding to consecutive frames included in the moving image in the case where the image of a person 420 with a mountain in the background has been shot. In this example, the case where a photographer is shooting the image while increasing the magnification of the lens of the camera is illustrated. In this case, the person 420 included in the moving image shot by the camera gradually becomes larger in images constituting the moving image. Note that a description of this example does not take into consideration the movement of the camera position, though the camera position may move slightly at the time of increasing the magnification.

FIG. 10 includes diagrams in which, in the individual images shown in FIG. 9, an image corresponding to the immediately preceding frame is indicated by broken lines, and additionally, exemplary detected optical flows are shown. The image 421 shown in part (a) of FIG. 10 is the same as the image 421 shown in part (a) of FIG. 9. Also, portions indicated by solid lines in the image 422 shown in part (b) of FIG. 10 are the same as the image 422 shown in part (b) of FIG. 9, and portions indicated by broken lines in the image 422 shown in part (b) of FIG. 10 are the same as portions indicated by solid lines in the image 421 shown in part (a) of FIG. 9. Also, arrows 424 to 426 in the image 422 shown in part (b) of FIG. 10 illustrate exemplary optical flows detected in the image 422. Similarly, portions indicated by solid lines in the image 423 shown in part (c) of FIG. 10 are the same as the image 423 shown in part (c) of FIG. 9, and portions indicated by broken lines in the image 423 shown in part (c) of FIG. 10 are the same as the portions indicated by the solid lines in the image 422 shown in part (b) of FIG. 9. Also, arrows 427 to 429 in the image 423 shown in part (c) of FIG. 10 illustrate exemplary optical flows detected in the image 423.

As shown in parts (b) and (c) of FIG. 10, the sizes of the person 420 and the mountain in the background, which are included in the image, change as the magnification changes. On the basis of optical flows detected from this change, affine transformation parameters can be obtained on a frame-by-frame basis.

Figure 11:
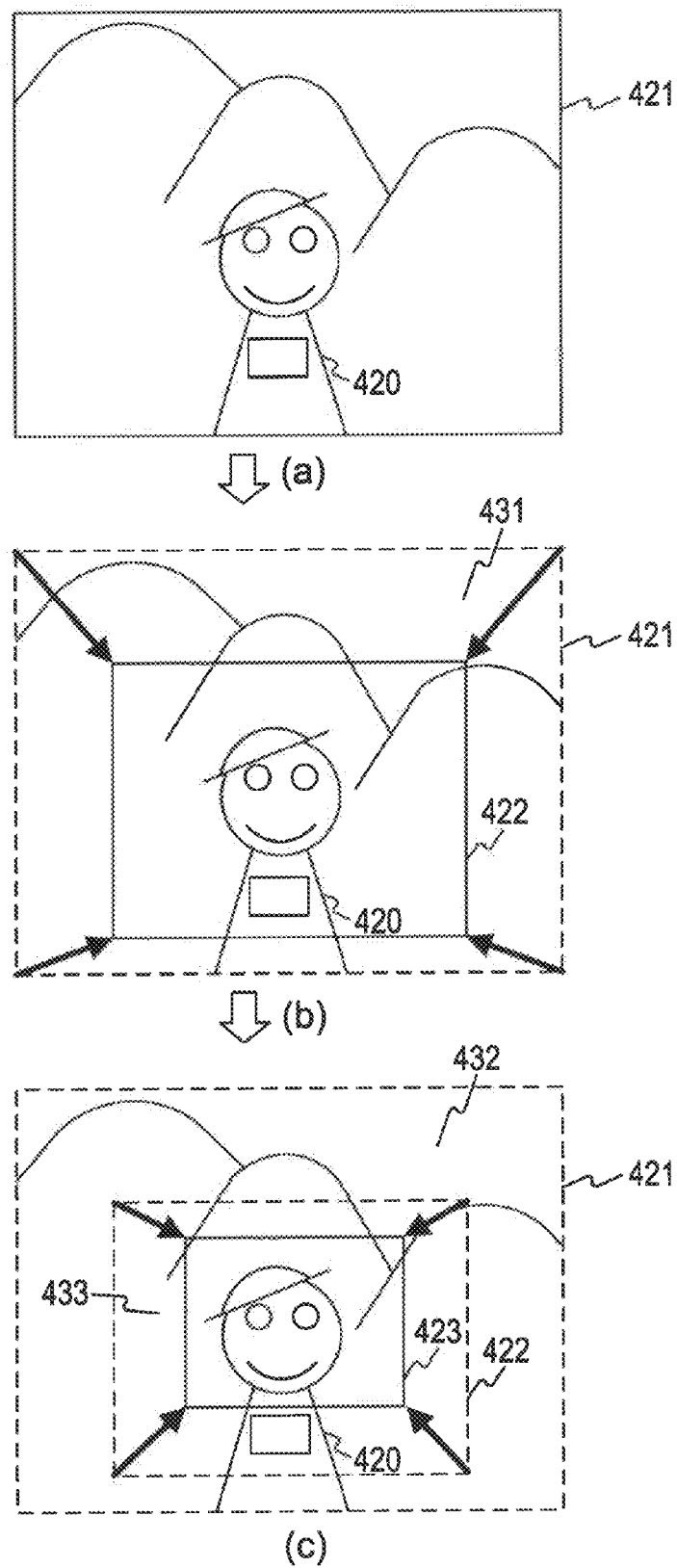
FIG. 11 includes diagrams showing a display example in the case where a moving image including images 421 to 423 shown in FIG. 9 is played.

FIG. 11 includes diagrams showing a display example in the case where a moving image including the images 421 to 423 shown in FIG. 9 is played.

As shown in part (a) of FIG. 11, at first, only the image 421 corresponding to the head frame is displayed. Then, when the image 422 corresponding to the next frame is to be displayed, the image 422 is affine-transformed using affine transformation parameters associated with this frame. In the image shown in part (b) of FIG. 11, only the size of the image 422 is transformed. The image 422, which has been affine-transformed using the affine transformation parameters, is written over so as to overlap the image 421 corresponding to the immediately preceding frame. That is, within the region of the image 421, an image of the image 422 is written over a region overlapping the image 422. In this case, since the image 421 overlaps the entire region of the image 422, the entire image of the image 422 is written over the image 421. Also, within the region of the image 421, an image of the image 421 is combined in a region 431 that that does not overlap the image 422. That is, when the image 422 corresponding to the second frame is to be displayed, as shown in part (b) of FIG. 11, a composite image generated by combining the entire portion of the image 422 and a portion of the image 421 corresponding to the region 431 is displayed. Also, an image border indicating that this is the latest image among displayed images can be displayed around the image corresponding to the current frame. In part (b) of FIG. 11, an image border is displayed around the image 422. Also, the affine transformation parameters used to affine-transform the image 422 are held in the image transforming unit 160.

Then, when the image 423 corresponding to the next frame is to be displayed, the image 423 is affine-transformed using affine transformation parameters associated with this frame. That is, the image 423 is affine-transformed using affine transformation parameters obtained using a matrix of affine transformation parameters corresponding to the image 423 and the matrix of the affine transformation parameters corresponding to the image 422, which are used in the immediately preceding affine transformation. In the image shown in part (c) of FIG. 11, only the size of the image 423 is transformed. The affine-transformed image 423 is written over so as to overlap a composite image of the images 421 and 422 corresponding to the preceding frames. That is, within the region of the composite image of the images 421 and 422, an image of the image 423 is written over a region overlapping the image 423. In this case, since the image 423 overlaps the entire regions of the images 421 and 422, the entire image of the image 423 is written over the composite image of the images 421 and 422. Also, within the region of the composite image of the images 421 and 422, the composite image of the images 421 and 422 is combined in regions 432 and 433 that do not overlap the image 423. That is, when the image 423 corresponding to the third frame is to be displayed, as shown in part (c) of FIG. 11, a composite image generated by combining the entire portion of the image 423, the portion of the image 421 corresponding to the region 432, and a portion of the image 422 corresponding to the region 433 is displayed. Also, when an image border indicating that this is the latest image among displayed images is to be displayed around the image corresponding to the current frame, the image border is displayed around the image 423 shown in part (c) of FIG. 11. Also, the affine transformation parameters used to affine-transform the image 423 are held in the image transforming unit 160. That is, the affine transformation parameters obtained by using the affine transformation parameters corresponding to the images 422 and 423, respectively, are held in the image transforming unit 160.

Figure 12:
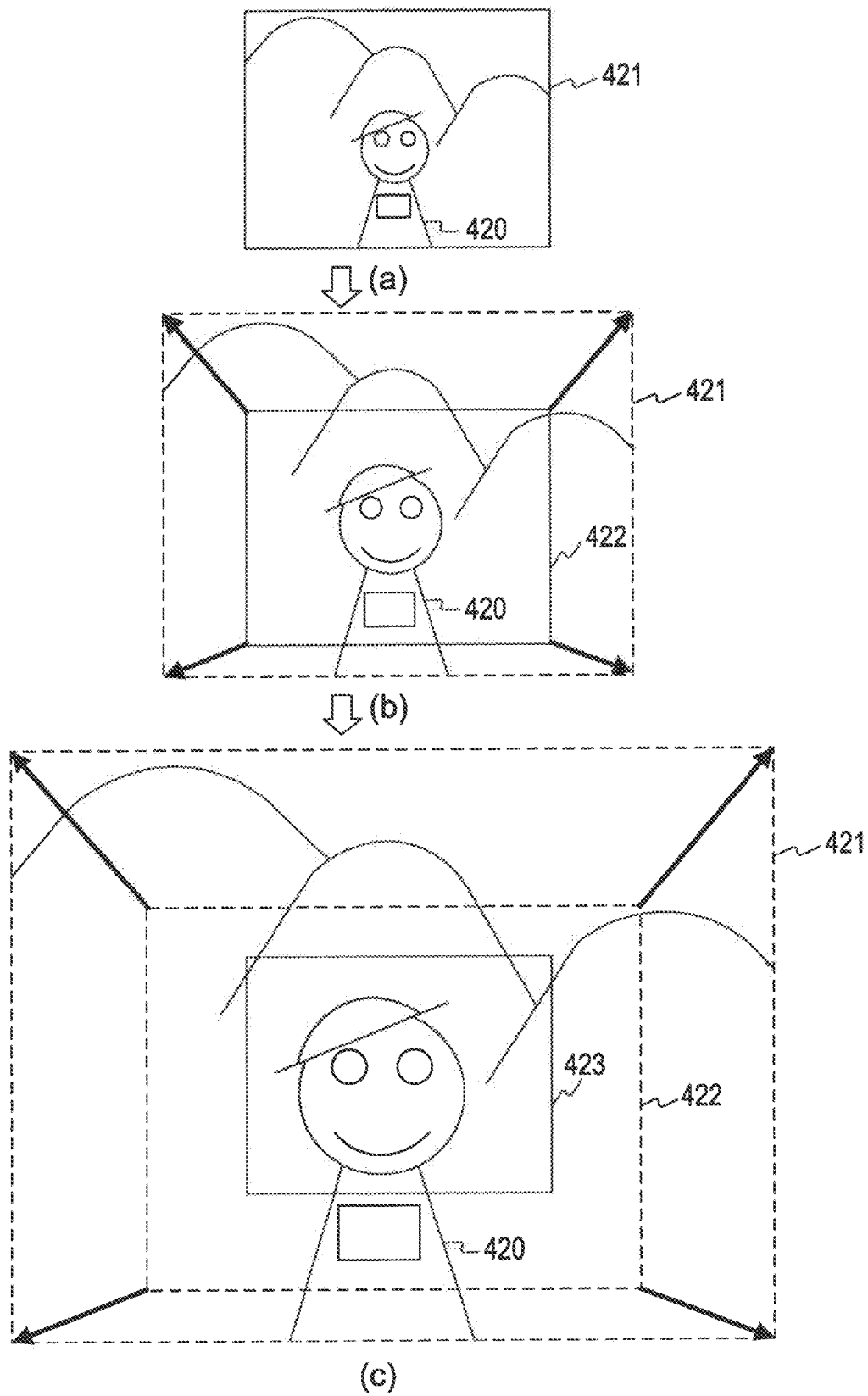
FIG. 12 includes diagrams showing a display example in the case where the moving image including the images 421 to 423 shown in FIG. 9 is played.

FIG. 12 includes diagrams showing a display example in the case where a moving image including the images 421 to 423 shown in FIG. 9 is played. The difference between the display examples shown in FIG. 11 and FIG. 12 is similar to the difference between the display examples shown in FIG. 7 and FIG. 8. Although an image displayed at a fixed position and an image to be affine-transformed are different, other portions are common. Therefore, the portions common to those in FIG. 11 are given common reference numerals and described.

As shown in part (a) of FIG. 12, at first, only the image 421 corresponding to the head frame is displayed. Then, when the image 422 corresponding to the next frame is to be displayed, the image 421, which is the immediately preceding image, is affine-transformed using affine transformation parameters associated with this frame, in a direction opposite to that of the affine transformation parameters. In the image shown in part (b) of FIG. 12, only the size of the image 421 is transformed. The image 422 corresponding to the current frame is written over so as to overlap the affine-transformed image 421. Note that, although a composite image generated by writing the image 422 over the image 421 has a size different from the composite image shown in part (b) of FIG. 11, other points are the same as those of the composite image shown in part (b) of FIG. 11, and accordingly, a description thereof is omitted here.

Then, when the image 423 corresponding to the next frame is to be displayed, using affine transformation parameters associated with this frame, a composite image of the image 421 and the image 422 corresponding to the preceding frames is affine-transformed in a direction opposite to that of the affine transformation parameters. In the image shown in part (c) of FIG. 12, only the size of the composite image of the image 421 and the image 422 is transformed. The image 423 corresponding to the current frame is written over so as to overlap the affine-transformed composite image of the images 421 and 422. Note that, although a composite image generated by writing the image 423 over the composite image of the images 421 and 422 has a size different from the composite image shown in part (c) of FIG. 11, other points are the same as those of the composite image shown in part (c) of FIG. 11, and accordingly, a description thereof is omitted here.

Next, the case in which, at the time of shooting an image using a camera, although the lens direction and the magnification of the camera remain unchanged, the camera is rotated around the image shooting direction serving as the center of rotation will be described.

FIG. 13 includes diagrams showing an example of transition in a moving image shot by a camera. In FIG. 13, the diagrams show images 441 to 443 corresponding to consecutive frames included in the moving image in the case where the image of a person 440 with a mountain in the background has been shot. In this example, the case where a photographer is shooting the image while rotating the camera around the image shooting direction serving as the center of rotation is illustrated. In this case, the person 440 included in the moving image shot by the camera rotates in images constituting the moving image. Note that a description of this example does not take into consideration the movement of the camera position, though the camera position may move slightly due to the rotation of the camera.

FIG. 14 includes diagrams in which, in the individual images shown in FIG. 13, an image corresponding to the immediately preceding frame is indicated by broken lines, and additionally, exemplary detected optical flows are shown. The image 441 shown in part (a) of FIG. 14 is the same as the image 441 shown in part (a) of FIG. 13. Also, portions indicated by solid lines in the image 442 shown in part (b) of FIG. 14 are the same as the image 442 shown in part (b) of FIG. 13, and portions indicated by broken lines in the image 442 shown in part (b) of FIG. 14 are the same as portions indicated by solid lines in the image 441 shown in part (a) of FIG. 13. Also, arrows 444 to 446 in the image 442 shown in part (b) of FIG. 14 illustrate exemplary optical flows detected in the image 442. Similarly, portions indicated by solid lines in the image 443 shown in part (c) of FIG. 14 are the same as the image 443 shown in part (c) of FIG. 13, and portions indicated by broken lines in the image 443 shown in part (c) of FIG. 14 are the same as the portions indicated by the solid lines in the image 442 shown in part (b) of FIG. 13. Also, arrows 447 to 449 in the image 443 shown in part (c) of FIG. 14 illustrate exemplary optical flows detected in the image 443.

As shown in parts (b) and (c) of FIG. 14, the person 440 and the mountain in the background, which are included in the image, rotate in accordance with the rotation of the camera. On the basis of optical flows detected from this rotation movement, affine transformation parameters can be obtained on a frame-by-frame basis.

Figure 15:
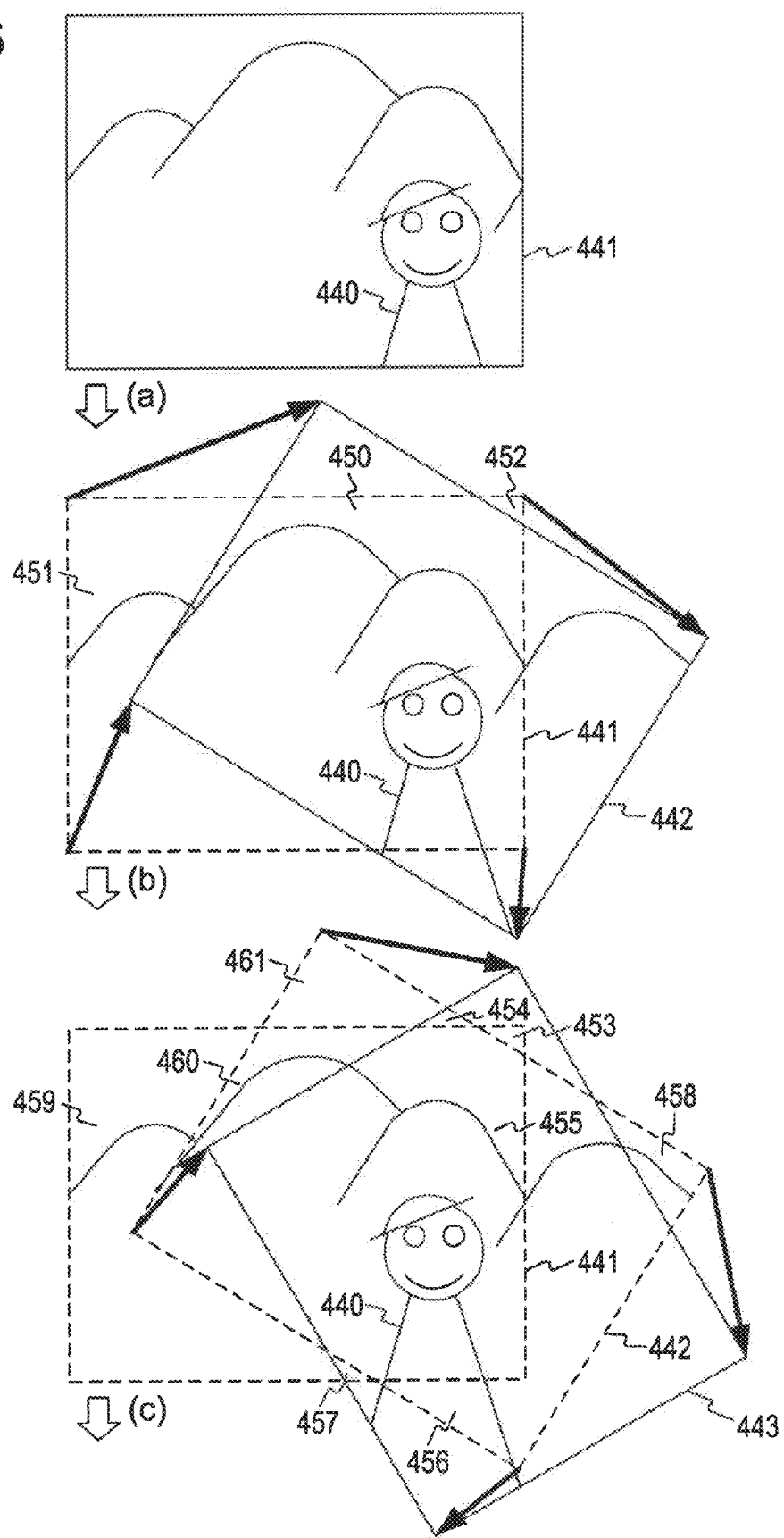
FIG. 15 includes diagrams showing a display example in the case where a moving image including images 441 to 443 shown in FIG. 13 is played.

FIG. 15 includes diagrams showing a display example in the case where a moving image including the images 441 to 443 shown in FIG. 13 is played.

As shown in part (a) of FIG. 15, at first, only the image 441 corresponding to the head frame is displayed. Then, when the image 442 corresponding to the next frame is to be displayed, the image 442 is affine-transformed using affine transformation parameters associated with this frame. In the image shown in part (b) of FIG. 15, only the angle of the image 442 is transformed. The affine-transformed image 442 is written over so as to overlap the image 441 corresponding to the immediately preceding frame. That is, within the region of the image 441, an image of the image 442 is written over a region 450 overlapping the image 442. Also, within the region of the image 441, an image of the image 441 is combined in regions 451 and 452 that that do not overlap the image 442. That is, when the image 442 corresponding to the second frame is to be displayed, as shown in part (b) of FIG. 15, a composite image generated by combining the entire portion of the image 442 and a portion of the image 441 corresponding to the regions 451 and 452 is displayed. Also, an image border indicating that this is the latest image among displayed images can be displayed around the image corresponding to the current frame. In part (b) of FIG. 15, an image border is displayed around the image 442. Also, the affine transformation parameters used to affine-transform the image 442 are held in the image transforming unit 160.

Then, when the image 443 corresponding to the next frame is to be displayed, the image 443 is affine-transformed using affine transformation parameters associated with this frame. That is, the image 443 is affine-transformed using affine transformation parameters obtained using a matrix of affine transformation parameters corresponding to the image 443 and the matrix of the affine transformation parameters corresponding to the image 442, which are used in the immediately preceding affine transformation. In the image shown in part (c) of FIG. 15, only the angle of the image 443 is transformed. The affine-transformed image 443 is written over so as to overlap a composite image of the images 441 and 442 corresponding to the preceding frames. That is, within the region of the composite image of the images 441 and 442, an image of the image 443 is written over regions 453 to 457 overlapping the image 443. Also, within the region of the composite image of the images 441 and 442, the composite image of the images 441 and 442 is further combined in regions 458 to 461 that do not overlap the image 443. That is, when the image 443 corresponding to the third frame is to be displayed, as shown in part (c) of FIG. 15, a composite image generated by combining the entire portion of the image 443, the portion of the image 441 corresponding to the region 459, and a portion of the image 442 corresponding to the regions 458 and 460 is displayed. Also, when an image border indicating that this is the latest image among displayed images is to be displayed around the image corresponding to the current frame, the image border is displayed around the image 443 shown in part (c) of FIG. 15. Also, the affine transformation parameters used to affine-transform the image 443 are held in the image transforming unit 160. That is, the affine transformation parameters obtained by using the affine transformation parameters corresponding to the images 442 and 443, respectively, are held in the image transforming unit 160.

Figure 16:
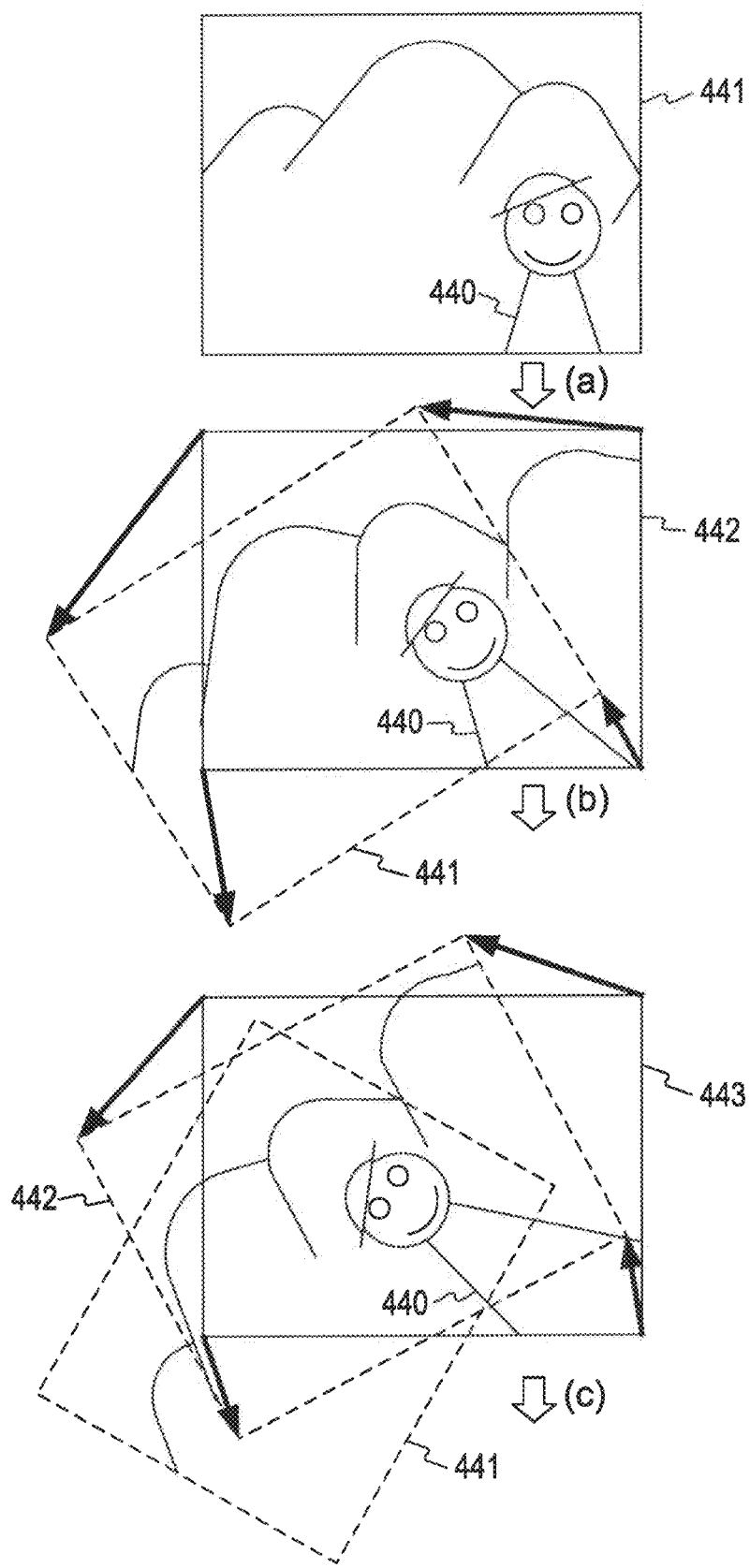
FIG. 16 includes diagrams showing a display example in the case where the moving image including the images 441 to 443 shown in FIG. 13 is played.

FIG. 16 includes diagrams showing a display example in the case where a moving image including the images 441 to 443 shown in FIG. 13 is played. The difference between the display examples shown in FIG. 15 and FIG. 16 is similar to the difference between the display examples shown in FIG. 7 and FIG. 8. Although an image displayed at a fixed position and an image to be affine-transformed are different, other portions are common. Therefore, the portions common to those in FIG. 15 are given common reference numerals and described.

As shown in part (a) of FIG. 16, at first, only the image 441 corresponding to the head frame is displayed. Then, when the image 442 corresponding to the next frame is to be displayed, the image 441, which is the immediately preceding image, is affine-transformed using affine transformation parameters associated with this frame, in a direction opposite to that of the affine transformation parameters. In the image shown in part (b) of FIG. 16, only the angle of the image 441 is transformed. The image 442 corresponding to the current frame is written over so as to overlap the affine-transformed image 441. Note that, although a composite image generated by writing the image 442 over the image 441 has an angle different from the composite image shown in part (b) of FIG. 15, other points are the same as those of the composite image shown in part (b) of FIG. 15, and accordingly, a description thereof is omitted here.

Then, when the image 443 corresponding to the next frame is to be displayed, using affine transformation parameters associated with this frame, a composite image of the image 441 and the image 442 corresponding to the preceding frames is affine-transformed in a direction opposite to that of the affine transformation parameters. In the image shown in part (c) of FIG. 16, only the angle of the composite image of the image 441 and the image 442 is transformed. The image 443 corresponding to the current frame is written over so as to overlap the affine-transformed composite image of the images 441 and 442. Note that, although a composite image generated by writing the image 443 over the images 441 and 442 has an angle different from the composite image shown in part (c) of FIG. 15, other points are the same as those of the composite image shown in part (c) of FIG. 15, and accordingly, a description thereof is omitted here.

The cases where the position, magnification, and angle of each of images constituting the moving image are sequentially changed have been described above. However, the embodiment is similarly applicable to the case where these changes are combined.

Next, a display example in the case where a moving image actually shot by a camera is played will be illustrated. In a display example illustrated below, within a display region of the display unit 191, a composite image is displayed only in a region where images corresponding to the current frame and the preceding frames are displayed, and the other region is shown in black. Also, a border is displayed around the image corresponding to the current frame. Furthermore, in the display example illustrated below, a display example in which a moving image is played from the middle will be illustrated.

Figure 17:
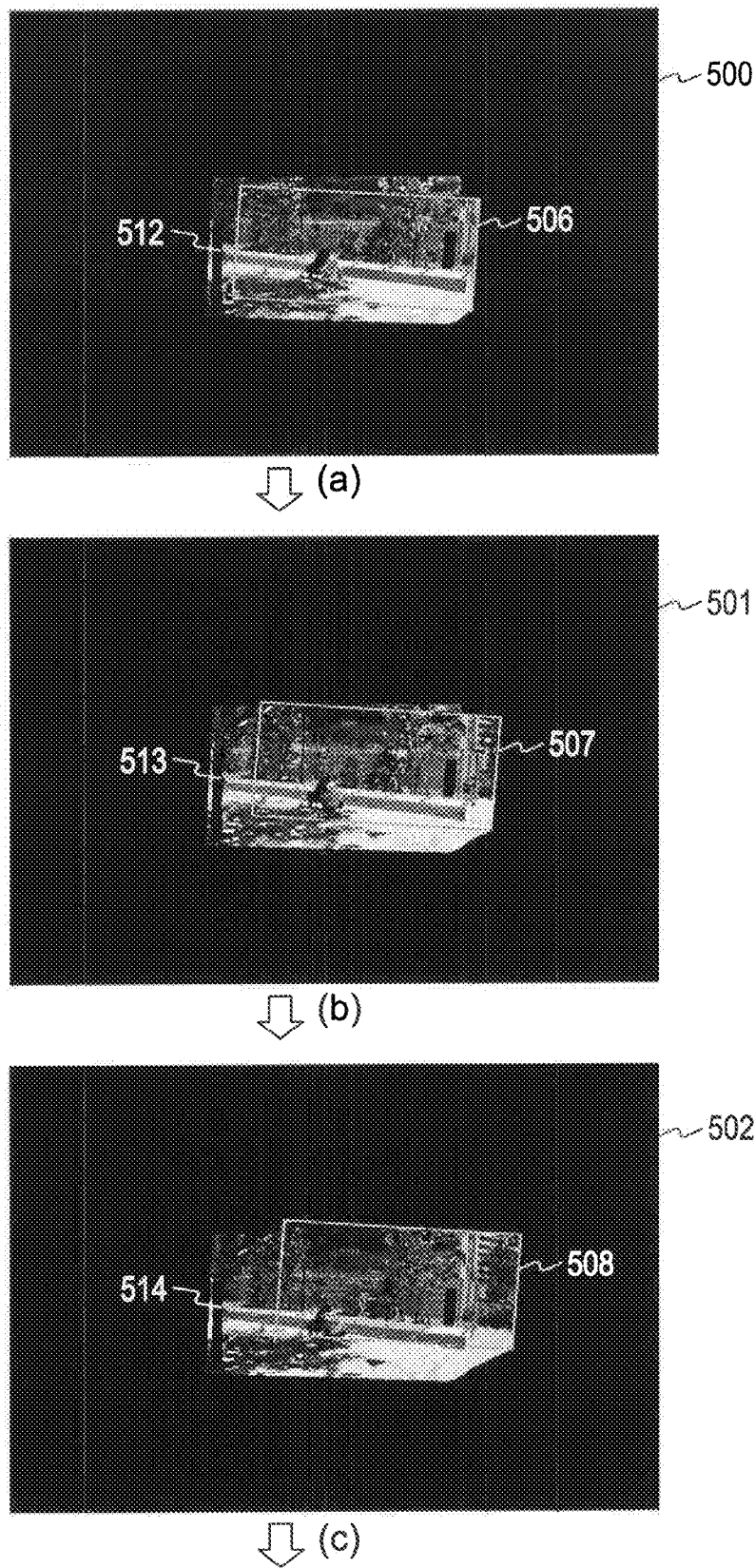
FIG. 17 includes diagrams showing an example of transition in a moving image shot by a camera.

FIG. 17 to FIG. 24 include diagrams showing an example of transition in a moving image shot by a camera. FIG. 17 and FIG. 18 are diagrams showing images 500 to 505 constituting a moving image in the case where the image of a parent and a child playing in a playground within an apartment has been shot while moving the camera. In this example, the case where an image corresponding to the current frame is affine-transformed, and the affine-transformed image is written over a composite image corresponding to individual preceding frames will be illustrated.

In the images 500 to 505 shown in FIG. 17 and FIG. 18, images corresponding to the current frame are images 506 to 511. Also, composite images that are images generated by the combining in correspondence with the preceding individual frames are images 512 to 517. As shown in FIG. 17 and FIG. 18, a target being shot (the playground within the apartment or the like) included in the shot image is fixed on the screen, and the images 506 to 511 corresponding to the current frame move on the screen in accordance with the camera movement. By displaying the images in such a manner, the images can be shown to a viewer in a manner as if the image corresponding to the current frame were advancing, in a display region displayed in black on the display unit 191, in accordance with the camera movement.

FIG. 19 and FIG. 20 are diagrams showing images 520 to 525 corresponding to frames constituting a moving image in the case where the image of a parent and a child playing in a playground within an apartment has been shot while performing a zoom-in operation. In this example, the case where an image corresponding to the current frame is affine-transformed, and the affine-transformed image is written over a composite image corresponding to individual preceding frames will be illustrated.

In the images 520 to 525 shown in FIG. 19 and FIG. 20, images corresponding to the current frame are images 526 to 531. Also, composite images that are images generated by the combining in correspondence with the preceding individual frames are images 532 to 537. As shown in FIG. 19 and FIG. 20, a target being shot (the playground within the apartment or the like) included in the shot image is fixed on the screen, and the images 526 to 531 corresponding to the current frame move on the screen in accordance with the camera movement. By displaying the images in such a manner, the viewer can easily recognize a person serving as a zoom target in the entire space.

As above, in the display examples shown in FIG. 17 to FIG. 20, images corresponding to the current frame move on a display while involving size enlargement/reduction, whereby a wide image is generated. Also, in sequentially-generated composite images, only an object included in an image corresponding to the current frame moves, and, in portions outside the image corresponding to the current frame, objects that were displayed in the past are displayed in a still state.

FIG. 21 and FIG. 22 are diagrams showing images 540 to 545 corresponding to frames constituting a moving image in the case where the image of a parent and a child playing in a playground within an apartment has been shot while moving the camera. In this example, the case where a composite image corresponding to individual preceding frames is affine-transformed in a direction opposite to that of affine transformation parameters, and the image corresponding to the current frame is written over the affine-transformed composite image will be illustrated.

In the images 540 to 545 shown in FIG. 21 and FIG. 22, images corresponding to the current frame are images 546 to 551. Also, composite images that are images generated by the combining in correspondence with the preceding individual frames are images 552 to 557. As shown in FIG. 21 and FIG. 22, the images 546 to 551 corresponding to the current frame are fixed on the screen, and, among targets being shot (the playground within the apartment or the like), which are included in the shot image, images other than those corresponding to the current frame move on the screen in accordance with the camera movement. By displaying the images in such a manner, the images can be shown to a viewer in a manner as if the composite image corresponding to the preceding frames were advancing, in a display region displayed in black on the display unit 191, in accordance with the camera movement. That is, the composite image corresponding to the preceding frames can be displayed in a manner as if the composite image were advancing in a direction opposite to that shown in FIG. 17 and FIG. 18.

Figure 23:
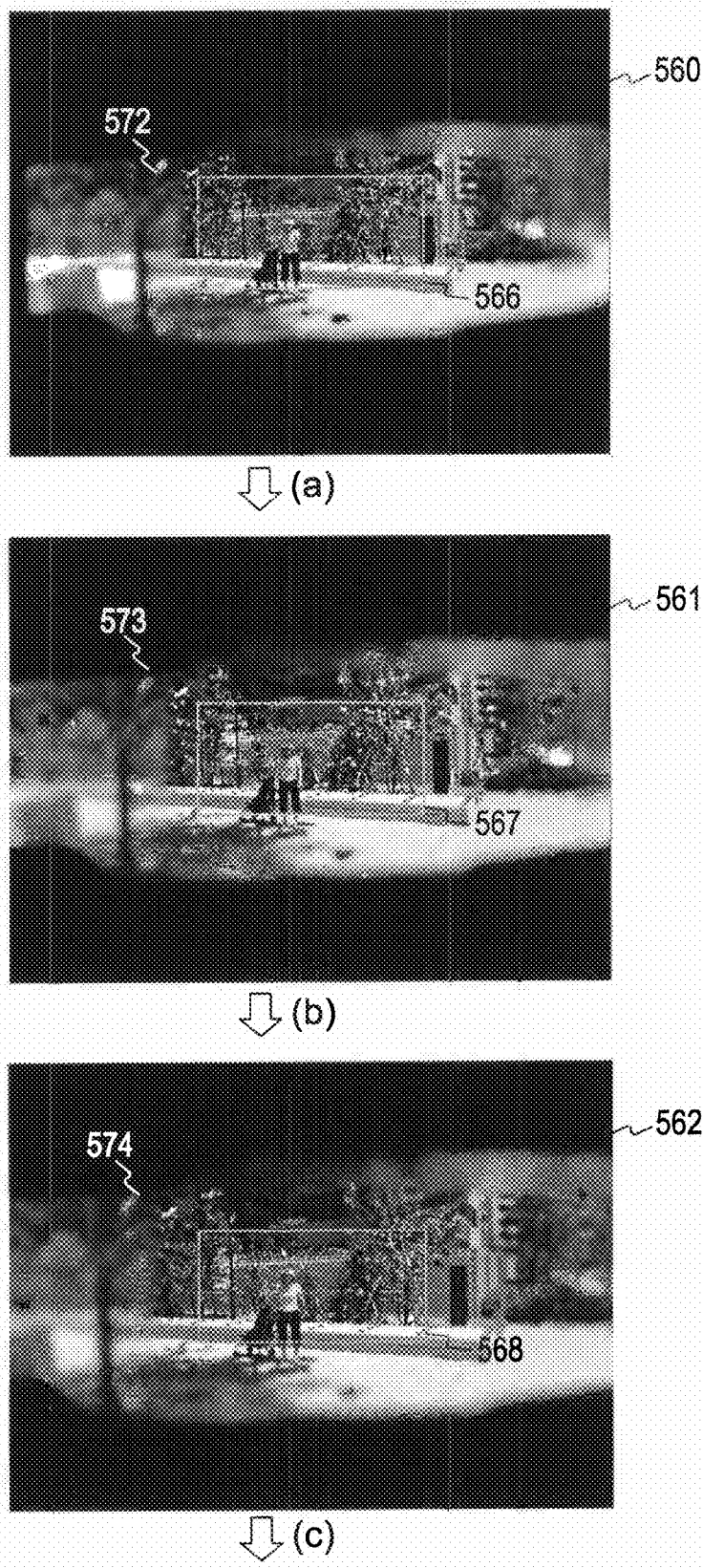
FIG. 23 includes diagrams showing an example of transition in a moving image shot by a camera.

FIG. 23 and FIG. 24 are diagrams showing images 560 to 565 corresponding to frames constituting a moving image in the case where the image of a parent and a child playing in a playground within an apartment has been shot while performing a zoom-in operation. In this example, the case where a composite image corresponding to individual preceding frames is affine-transformed in a direction opposite to that of affine transformation parameters, and the image corresponding to the current frame is written over the affine-transformed composite image will be illustrated.

In the images 560 to 565 shown in FIG. 23 and FIG. 24, images corresponding to the current frame are images 566 to 571. Also, composite images that are images generated by the combining in correspondence with the preceding individual frames are images 572 to 577. As shown in FIG. 23 and FIG. 24, the images 566 to 571 corresponding to the current frame are fixed on the screen, and, among targets being shot (the playground within the apartment or the like), which are included in the shot image, images other than those corresponding to the current frame move on the screen in accordance with the camera movement. By displaying the images in such a manner, a person serving as a zoom target can be gradually increased in size in accordance with zooming, and accordingly, the viewer can easily recognize the person in the entire space.

As above, in the display examples shown in FIG. 21 to FIG. 24, the image corresponding to the current frame is fixed at a fixed position, and, peripheral images around the image corresponding to the current frame move on a display while involving size enlargement/reduction, whereby a wide image is generated. Also, in sequentially-generated composite images, only an object included in the image corresponding to the current frame moves, and, in portions outside the image corresponding to the current frame, objects that were displayed in the past are displayed in a still state where the objects move as a whole.

Next, the operation of the image processing apparatus 100 in the embodiment of the present invention will be described with reference to the drawings.

Figure 25:
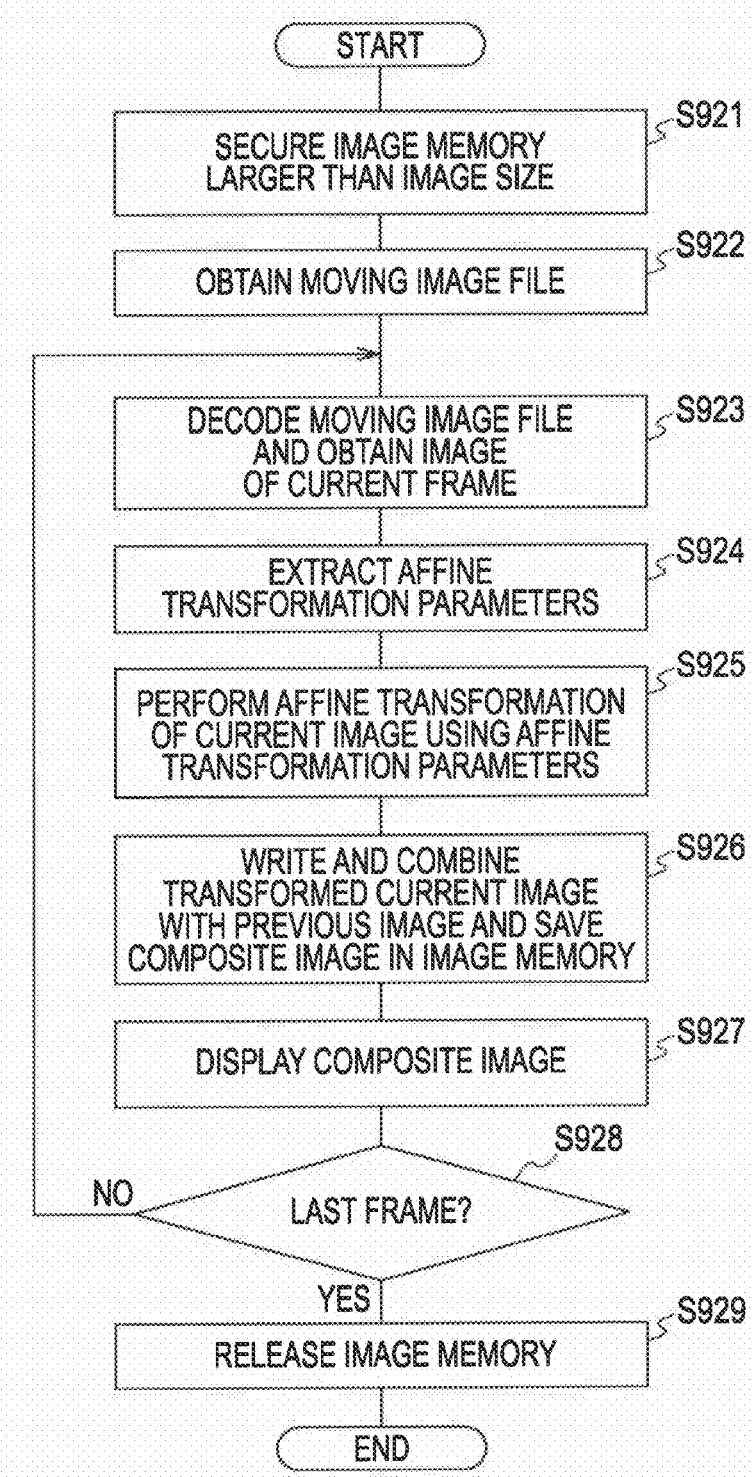
FIG. 25 is a flowchart showing a processing procedure of a moving-image playing process performed by the image processing apparatus 100 in the embodiment of the present invention.

FIG. 25 is a flowchart showing a processing procedure of a moving-image playing process performed by the image processing apparatus 100 in the embodiment of the present invention. In this processing procedure, an example in which an image corresponding to the current frame is affine-transformed, and the affine-transformed image is written over a composite image corresponding to individual preceding frames will be illustrated.

At first, a work buffer larger than the size of images constituting a moving image is secured in the image memory 170 (step S921). Then, a moving image file is obtained from the moving-image storage unit 200 (step S922). Then, the obtained moving image file is decoded, and the current frame, which is one frame, is obtained (step S923).

Then, affine transformation parameters corresponding to the obtained current frame are extracted from the moving image file (step S924). Here, when the current frame is the head frame, affine transformation parameters of an identity matrix are extracted. Then, the image corresponding to the current frame is affine-transformed using the obtained affine transformation parameters (step S925). Here, when the current frame is the head frame, an affine transformation is performed using the affine transformation parameters of the identity matrix. Therefore, the actual image is not transformed. Then, the affine-transformed image corresponding to the current frame is written over and combined with a composite image of individual images corresponding to frames preceding the current frame, and a composite image combined with the image corresponding to the current frame is saved in the image memory 170 (step S926). Here, when the current frame is the head frame, the image corresponding to the head frame is saved in the image memory 170. Then, a composite image combined in step S926 with the image corresponding to the current frame is displayed on the display unit 191 (step S927). Here, when the current frame is the head frame, the image corresponding to the head frame is displayed on the display unit 191.

Then, it is determined whether or not, among frames constituting the input moving image file, the current frame is the last frame (step S928). When the current frame is not the last frame (step S928), the flow returns to step S923, and the composite-image displaying process is repeated (steps S923 to S927).

In contrast, when the current frame is the last frame (step S928), the secured work buffer is released (step S929), and the moving-image playing process is terminated.

Figure 26:
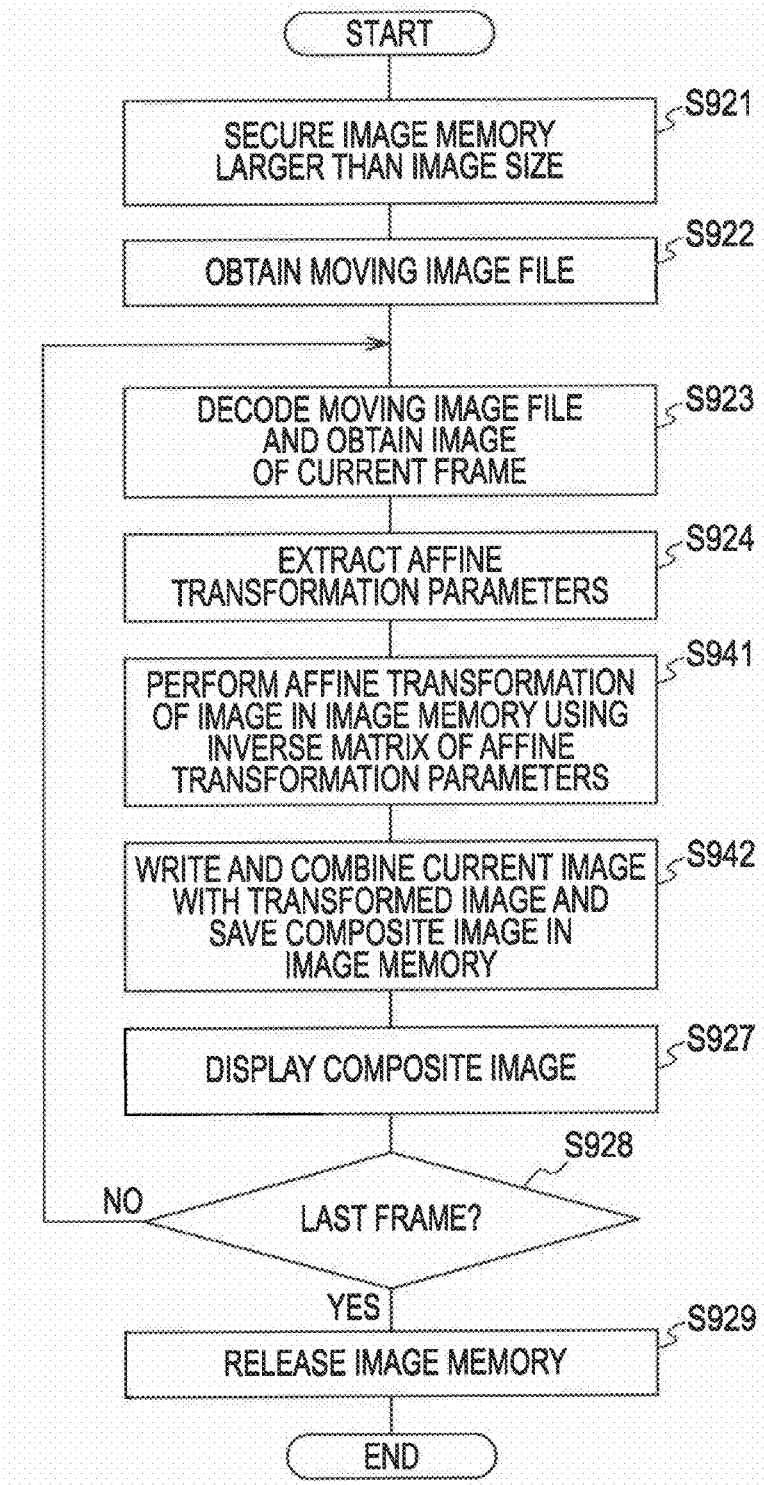
FIG. 26 is a flowchart showing a processing procedure of a moving-image playing process performed by the image processing apparatus 100 in the embodiment of the present invention.

FIG. 26 is a flowchart showing a processing procedure of a moving-image playing process performed by the image processing apparatus 100 in the embodiment of the present invention. In this processing procedure, an example in which a composite image corresponding to individual frames preceding the current frame is affine-transformed in a direction opposite to that of affine transformation parameters, and the image corresponding to the current frame is written over the affine-transformed composite image will be illustrated. Note that, in the processing procedure shown in FIG. 26, since steps S921 to S924 and steps S927 to S929 are similar to the processing procedure shown in FIG. 25, descriptions thereof are omitted here.

Affine transformation parameters corresponding to the current frame obtained in step S923 are extracted from the moving image file (step S924). Then, using the obtained affine transformation parameters, a composite image corresponding to individual frames preceding the current frame, which is saved in the image memory 170, is affine-transformed in a direction opposite to that of the affine transformation parameters (step S941). Here, when the current frame is the head frame, since there is no composite image saved in the image memory 170, the image is not transformed. Then, the image corresponding to the current frame is written over and combined with the affine-transformed composite image, and a composite image combined with the image corresponding to the current frame is saved in the image memory 170 (step S942). Here, when the current frame is the head frame, the image corresponding to the head frame is saved in the image memory 170. Then, the composite image combined with the image corresponding to the current frame in step S942 is displayed on the display unit 191 (step S927).

The case where a composite image is generated by applying an affine transformation to an image corresponding to the current frame or the case where a composite image is generated by applying an affine transformation to a composite image corresponding to individual preceding frames in a direction opposite to that of affine transformation parameters has been described. However, a composite image may be generated by applying an affine transformation to the image corresponding to the current frame, and additionally applying an affine transformation to the composite image corresponding to the individual preceding frames in a direction opposite to that of the affine transformation parameters. Here, an example in which affine transformation parameters are separated into elements relating to enlargement/reduction (zoom components) and elements other than enlargement/reduction (elements relating to movement or rotation); and an affine transformation is applied, using the elements relating to enlargement/reduction, to a composite image corresponding to individual preceding frames in a direction opposite to that of the affine transformation parameters, and an affine transformation is applied, using the elements relating to movement or rotation, to an image corresponding to the current frame, whereby a composite image is generated will be described in detail with reference to the drawings.

Figure 27:
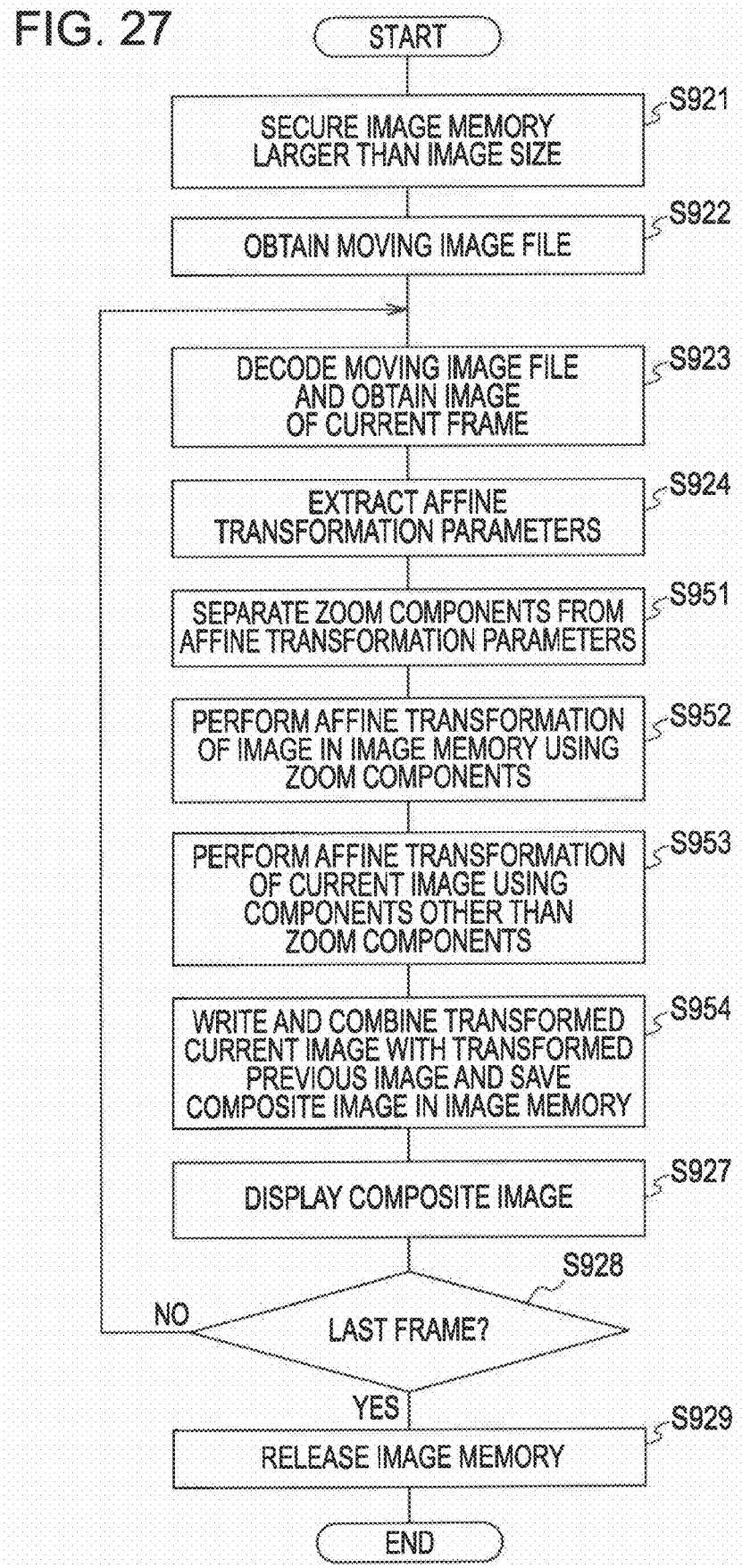
FIG. 27 is a flowchart showing a processing procedure of a moving-image playing process performed by the image processing apparatus 100 in the embodiment of the present invention.

FIG. 27 is a flowchart showing a processing procedure of a moving-image playing process performed by the image processing apparatus 100 in the embodiment of the present invention. In this processing procedure, an example in which an image corresponding to the current frame is affine-transformed using elements relating to movement or rotation, and additionally, a composite image corresponding to individual preceding frames is affine-transformed in a direction opposite to that of the affine transformation parameters using elements relating to enlargement/reduction, whereby the affine-transformed image corresponding to the current frame is written over the affine-transformed composite image will be illustrated. Note that, in the processing procedure shown in FIG. 27, since steps S921 to S924 and steps S927 to S929 are similar to the processing procedure shown in FIG. 25, descriptions thereof are omitted here.

Affine transformation parameters corresponding to the current frame obtained in step S923 are extracted from the moving image file (step S924). Then, from individual elements of the obtained affine transformation parameters, elements relating to enlargement/reduction are separated (step S951). Then, using the separated elements relating to enlargement/reduction, a composite image corresponding to individual frames preceding the current frame, which is saved in the image memory 170, is affine-transformed in a direction opposite to that of the affine transformation parameters (step S952). Here, when the current frame is the head frame, since there is no composite image saved in the image memory 170, the image is not transformed. Then, using the separated elements relating to movement or rotation, the image corresponding to the current frame is affine-transformed (step S953). Here, when the current frame is the head frame, an affine transformation is performed using the affine transformation parameters of the identity matrix. Therefore, the actual image is not transformed.

Then, the affine-transformed image corresponding to the current frame is written over and combined with the affine-transformed composite image, and a composite image combined with the image corresponding to the current frame is saved in the image memory 170 (step S954). Here, when the current frame is the head frame, the image corresponding to the head frame is saved in the image memory 170. Then, the composite image combined with the image corresponding to the current frame in step S954 is displayed on the display unit 191 (step S927).

Next, a display example in the case where, with the processing procedure of the moving-image playing process shown in FIG. 27, a moving image actually shot by a camera is played will be illustrated.

Figure 28:
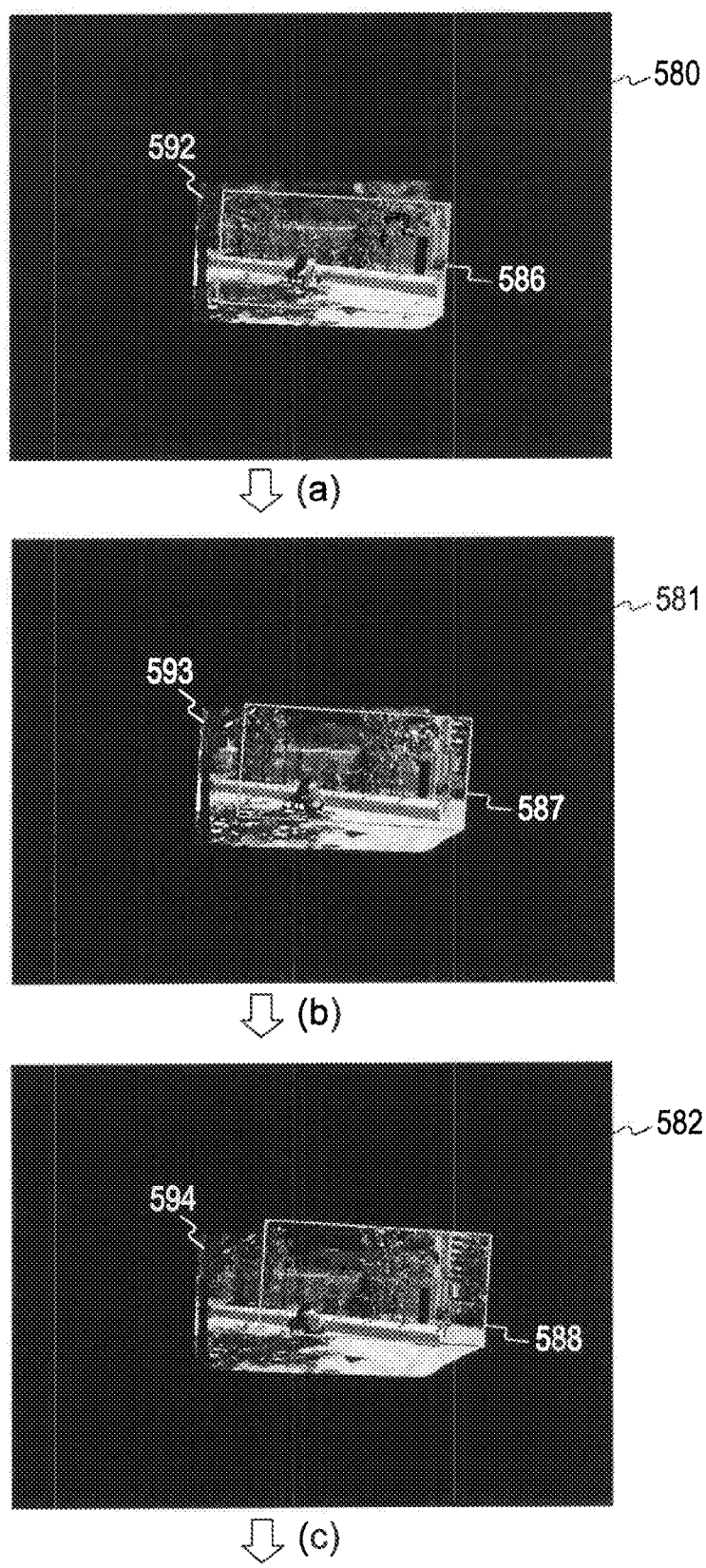
FIG. 28 includes diagrams showing an example of transition in a moving image shot by a camera.

FIG. 28 to FIG. 31 include diagrams showing an example of transition in a moving image shot by a camera. FIG. 28 and FIG. 29 are diagrams showing images 580 to 585 constituting a moving image in the case where the image of a parent and a child playing in a playground within an apartment has been shot while moving the camera. Note that the case where no zoom operation is performed is shown in FIG. 28 and FIG. 29.

In the images 580 to 585 shown in FIG. 28 and FIG. 29, images corresponding to the current frame are images 586 to 591. Also, composite images that are images generated by the combining in correspondence with the preceding individual frames are images 592 to 597. As shown in FIG. 28 and FIG. 29, a target being shot (the playground within the apartment or the like) included in the shot image is fixed on the screen, and the images 586 to 591 corresponding to the current frame move on the screen in accordance with the camera movement. Here, since the images 580 to 585 shown in FIG. 28 and FIG. 29 are captured images in which no zoom operation has been performed, affine transformation parameters hardly contain elements relating to enlargement/reduction. Therefore, display examples in FIG. 28 and FIG. 29 are substantially the same as those shown in FIGS. 17 and 18.

Figure 30:
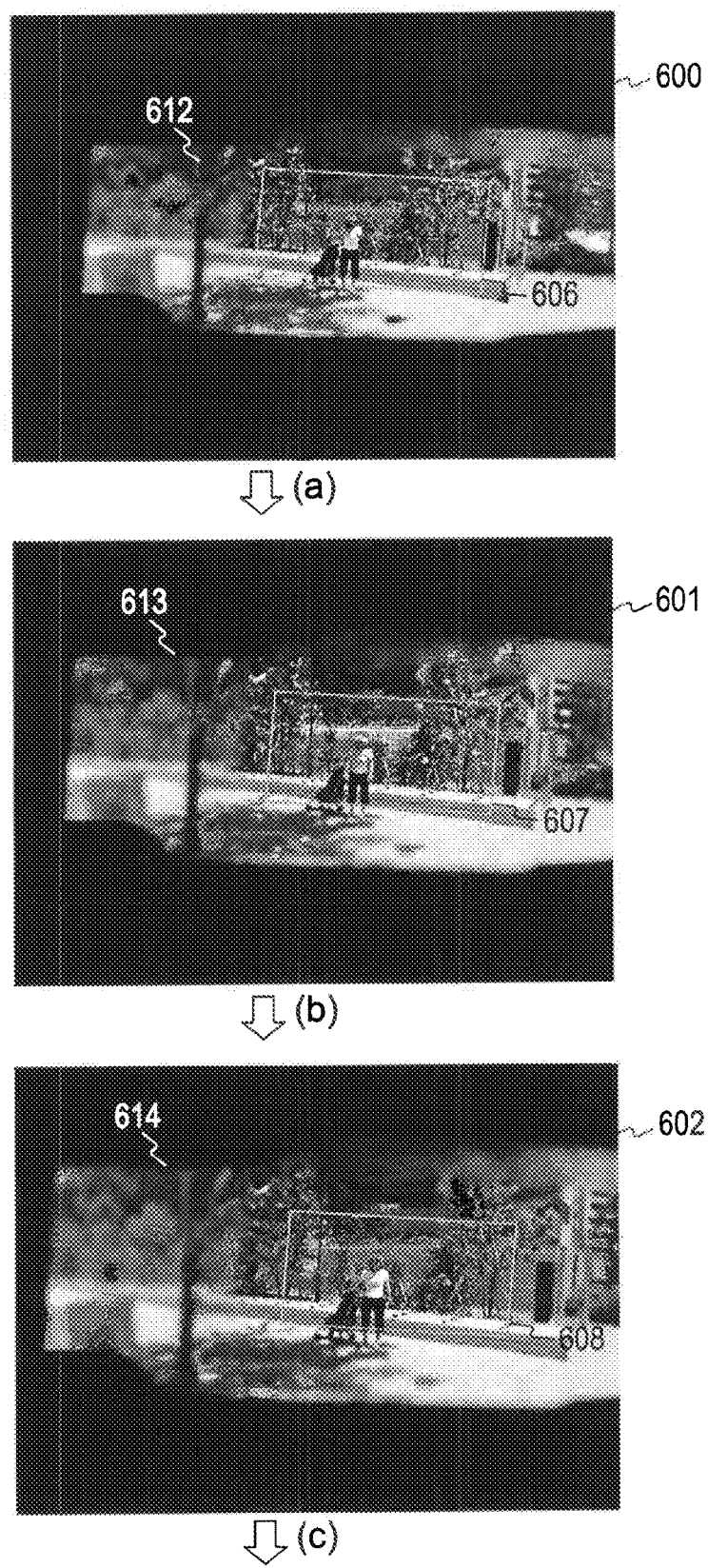
FIG. 30 includes diagrams showing an example of transition in a moving image shot by a camera.
Figure 31:
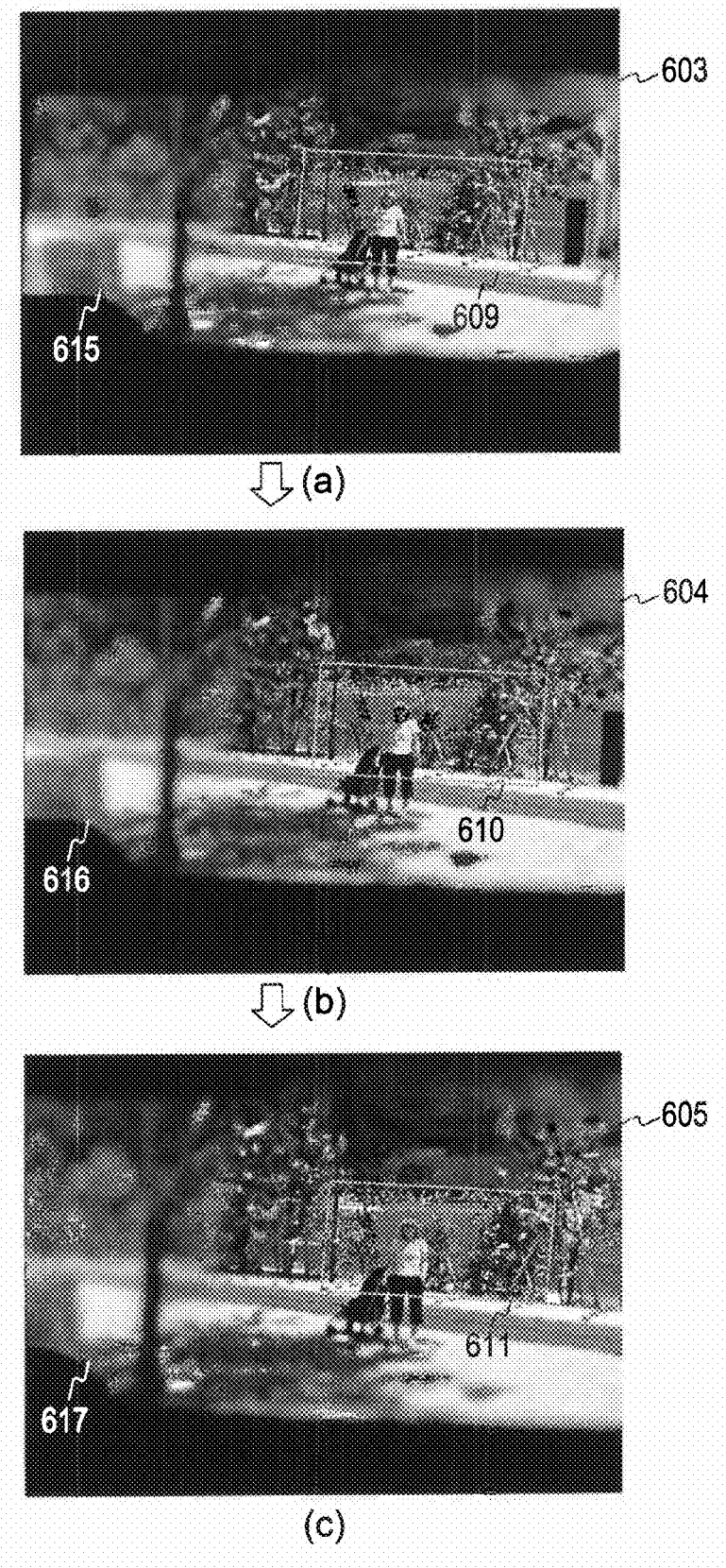
FIG. 31 includes diagrams showing an example of transition in a moving image shot by a camera.

FIG. 30 and FIG. 31 are diagrams showing images 600 to 605 corresponding to frames constituting a moving image in the case where the image of a parent and a child playing in a playground within an apartment has been shot while performing a zoom-in operation.

In the images 600 to 605 shown in FIG. 30 and FIG. 31, images corresponding to the current frame are images 606 to 611. Also, composite images that are images generated by the combining in correspondence with the preceding individual frames are images 612 to 617. As shown in FIG. 30 and FIG. 31, the images 612 to 617 of a target being shot (the playground within the apartment or the like) included in the shot image are enlarged in accordance with a zoom movement of the camera, and the images 606 to 611 corresponding to the current frame remain the same size and move on the screen in accordance with the camera movement. That is, as peripheral images are gradually enlarged, the images 606 to 611 corresponding to the current frame move. By displaying the images in such a manner, various display styles can be provided to a viewer.

The example where affine transformation parameters are recorded in a moving image file has been described above. However, affine transformation parameters may be recorded as accompanying information (e.g., meta-data) in a format different from that of a moving image file for each of frames constituting a moving image. Hereinafter, an example where affine transformation parameters are recorded in a meta-data file as accompanying information in a format different from that of a moving image file will be described in detail below with reference to the drawings.

Figure 32:
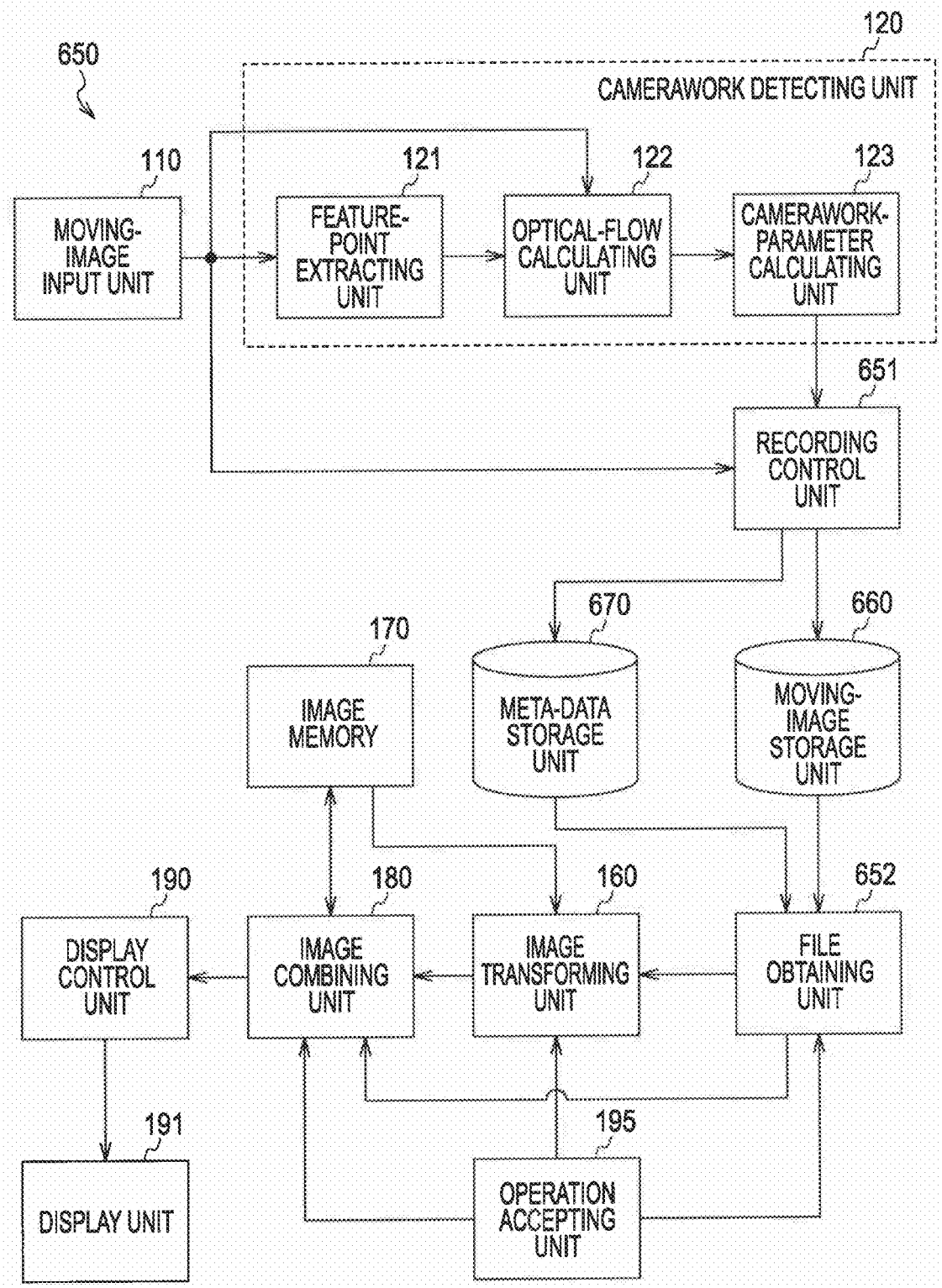
FIG. 32 is a block diagram showing a functional structure example of an image processing apparatus 650 in an embodiment of the present invention.

FIG. 32 is a block diagram showing a functional structure example of an image processing apparatus 650 in an embodiment of the present invention. Here, the image processing apparatus 650 is an apparatus obtained by modifying part of the image processing apparatus 100 shown in FIG. 1. The image processing apparatus 650 is an image processing apparatus in which, instead of the recording control unit 130, the moving-image storage unit 200, the moving-image obtaining unit 140, and the camerawork-parameter extracting unit 150 of the image processing apparatus 100, a recording control unit 651, a moving-image storage unit 660, a meta-data storage unit 670, and a file obtaining unit 652 are provided. Note that structures other than the recording control unit 651, the moving-image storage unit 660, the meta-data storage unit 670, and the file obtaining unit 652 are similar to those of the image processing apparatus 100 shown in FIG. 1, and accordingly descriptions of these other structures are omitted.

The recording control unit 651 is configured to record a moving image output from the moving-image input unit 110 as a moving image file in the moving-image storage unit 660, and additionally to record affine transformation parameters output from the camerawork-parameter calculating unit 123, in association with a corresponding moving image and a frame, as a meta-data file in the meta-data storage unit 670.

The moving-image storage unit 660 is configured to store a moving image output from the moving-image input unit 110 as a moving image file. Also, the moving-image storage unit 660 supplies a moving image file to the file obtaining unit 652 in response to a request from the file obtaining unit 652. Note that a moving image file stored in the moving-image storage unit 660 will be described in detail with reference to FIG. 33.

The meta-data storage unit 670 is configured to store affine transformation parameters output from the camerawork-parameter calculating unit 123 as a meta-data file. Also, the meta-data storage unit 670 supplies a meta-data file to the file obtaining unit 652 in response to a request from the file obtaining unit 652. Note that a meta-data file stored in the meta-data storage unit 670 will be described in detail with reference to FIG. 33.

In response to an operation input from the operation accepting unit 195, which relates to playback of a moving image, the file obtaining unit 652 is configured to obtain a moving image file stored in the moving-image storage unit 660 and a meta-data file stored, in association with the moving image file, in the meta-data storage unit 670. The file obtaining unit 652 outputs a moving image in the obtained moving image file and affine transformation parameters in the meta-data file to the image transforming unit 160, and outputs the moving image in the obtained moving image file to the image combining unit 180.

FIG. 33 includes diagrams schematically showing individual files recorded in the moving-image storage unit 660 and in the meta-data storage unit 670 in the embodiment of the present invention. In part (a) of FIG. 33, moving image files 661 to 663 stored in the moving-image storage unit 660, and meta-data files 671 to 673 stored, in association with the moving image files 661 to 663, in the meta-data storage unit 670 are shown. Here, it is assumed that a moving image ID which is identification information for identifying each moving image file stored in the moving-image storage unit 660 is given to each moving image file. For example, "#1" is given to the moving image file 661; "#2" is given to the moving image file 662; and "#n" is given to the moving image file 663.

In part (b) of FIG. 33, the moving image file 661 stored in the moving-image storage unit 661, and the meta-data file 671 stored, in association with the moving image file 661, in the meta-data storage unit 670 are schematically shown. Here, the moving image file 661 is a file containing a moving image constituted by n frames, and these n frames are indicated as frames 1 (664) to n (667).

Also, a moving image ID 674, a frame number 675, and affine transformation parameters 676 are stored in association with one another in the meta-data file 671.

The moving image ID 674 is a moving image ID given to a corresponding moving image file. For example, "#1" given to the moving image file 661 is stored.

The frame number 675 is a serial number of each of frames constituting a moving image in a corresponding moving image file. For example, "1" to "n" corresponding to the frames 1 (664) to n (667) constituting the moving image in the moving image file 661 are stored.

The affine transformation parameters 676 are affine transformation parameters calculated for each of frames of a moving image, which correspond to the frame number 675. Note that the affine transformation parameters 676 "a1, b1, c1, d1, e1, and f1" corresponding to the frame number 675 "1" are affine transformation parameters of an identity matrix. Also, the affine transformation parameters 676 "am, bm, cm, dm, em, and fm" corresponding to the frame number 675 "m (m is an integer greater than or equal to 2)" are affine transformation parameters corresponding to the frame "m−1" that immediately precedes the frame "m".

The case in which, in accordance with whether or not to play a moving image, with the current image corresponding to the current frame being fixed to a central part or the like of the display unit 191, an affine transformation is applied to the image corresponding to the current frame and a composite image is generated, and the case in which an affine transformation is applied to a composite image corresponding to individual preceding frames in a direction opposite to that of the affine transformation parameters and a composite image is generated have been described. However, affine transformations can be sequentially applied to the current image corresponding to the current frame, and a composite image can be generated and sequentially saved in the image memory. Additionally, from the composite image in the image memory, a display region that is a region to be displayed can be extracted and displayed. Accordingly, a display mode of the display unit can be switched during playback of a moving image. These moving-image playing methods will be described in detail below with reference to the drawings.

Figure 34:
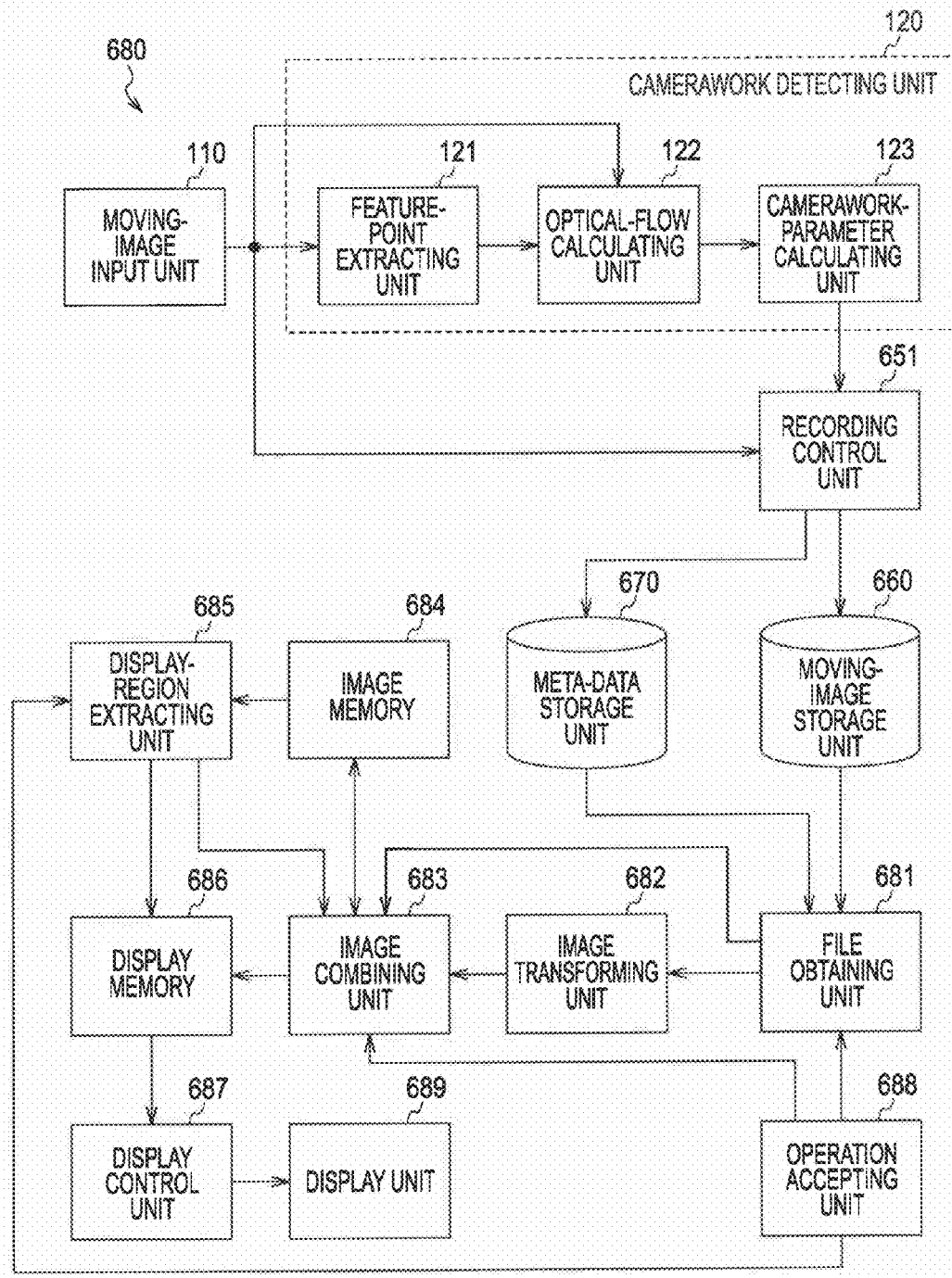
FIG. 34 is a block diagram showing a functional structure example of an image processing apparatus 680 in an embodiment of the present invention.

FIG. 34 is a block diagram showing a functional structure example of an image processing apparatus 680 in an embodiment of the present invention. Here, the image processing apparatus 680 is an apparatus obtained by modifying part of the image processing apparatus 650 shown in FIG. 32. The image processing apparatus 680 includes the moving-image input unit 110, the camerawork detecting unit 120, the recording control unit 651, the moving-image storage unit 660, the meta-data storage unit 670, a file obtaining unit 681, an image transforming unit 682, an image combining unit 683, an image memory 684, a display-region extracting unit 685, a display memory 686, a display control unit 687, an operation accepting unit 688, and a display unit 689. Note that structures of the moving-image input unit 110, the camerawork detecting unit 120, the recording control unit 651, the moving-image storage unit 660, and the meta-data storage unit 670 are similar to those of the image processing apparatus 650 shown in FIG. 32, and accordingly descriptions of these other structures are omitted. Also, in this example, an example in which part of the image processing apparatus 650 shown in FIG. 32 is modified will be described. However, this embodiment is also applicable to the image processing apparatus 100 shown in FIG. 1.

In response to an operation input from the operation accepting unit 688, which relates to playback of a moving image, the file obtaining unit 681 is configured to obtain a moving image file stored in the moving-image storage unit 660 and a meta-data file stored, in association with the moving image file, in the meta-data storage unit 670. The file obtaining unit 681 outputs a moving image in the obtained moving image file and affine transformation parameters in the meta-data file to the image transforming unit 682, and outputs the moving image in the obtained moving image file to the image combining unit 683.

The image transforming unit 682 is configured to apply, on a frame-by-frame basis, affine transformations to images constituting a moving image in a moving image file output from the moving-image obtaining unit 681, using affine transformation parameters corresponding to the moving image, and to output the affine-transformed images to the image combining unit 683.

The image combining unit 683 is configured to combine an affine-transformed image generated by the image transforming unit 682 with a composite image corresponding to individual preceding frames, which is held in the image memory 684, by writing the affine-transformed image over the composite image, and to save a new composite image generated by the combining in the image memory 684. Also, the image combining unit 683 combines the current image with a composite image held in the display memory 686 by writing the current image over the composite image on the basis of the position of the current image in a display region output from the display-region extracting unit 685. Specifically, when a display mode for fixing the current image has been specified, the image combining unit 683 combines the current image output from the file obtaining unit 681 with the composite image held in the display memory 686 by writing the current image over a central portion of the composite image. In contrast, when a display mode for fixing a composite image of images preceding the current image has been specified, the image combining unit 683 combines the affine-transformed current image generated by the image transforming unit 682 with the composite image held in the display memory 686 by writing the affine-transformed current image over the composite image on the basis of the position of the current image in a display region output from the display-region extracting unit 685. Also, the image combining unit 683 compresses the affine-transformed image generated by the image transforming unit 682, writes the compressed, affine-transformed image over the composite image held in the image memory 684, whereby the current image written over the composite image held in the display memory 686 becomes a non-compressed image or a captured image with a higher resolution than a compressed history image. Accordingly, a history image at the time of outputting a composite image becomes a compressed image, and the current image becomes a non-compressed image or a captured image with a higher resolution than the compressed history image. Here, the size of the current image to be combined in the display memory 686 is determined in accordance with the value of display magnification. Note that the combining of the current image in the display memory 686 will be described in detail with reference to FIG. 40 and FIG. 41.

The image memory 684 is a work buffer that holds a composite image generated by the combining performed by the image combining unit 683. The image memory 684 is configured to supply a held composite image to the image combining unit 683 or the display-region extracting unit 685. That is, the image memory 684 is an image memory that holds a history image.

The display-region extracting unit 685 is configured to extract an image existing within the range of a display region, which is a region to be displayed, from a composite image held in the image memory 684, and causes the display memory 686 to hold the extracted image. Also, when at least a portion of the current image corresponding to the current frame in the composite image held in the image memory 684 protrudes from the range of the display region, the display-region extracting unit 685 moves the display region so that the entire current image will be included in the range of the display region, and thereafter, extracts an image existing within the range of the display region from the composite image held in the image memory 684. Furthermore, when a display mode for fixing a composite image of images preceding the current image has been specified, the display-region extracting unit 685 calculates the position of the current image in the display region, and outputs the position of the current image in the display region to the image combining unit 683. Note that the extraction of an image included in the range of the display region will be described in detail with reference to FIG. 35 to FIG. 41 and the like, and the movement of the display region will be described in detail with reference to FIG. 36, FIG. 37, and the like. Also, the calculation of the position of the current image in the display region will be described in detail with reference to FIG. 40.

The display memory 686 is a display buffer that holds an image extracted by the display-region extracting unit 685 from the image memory 684, and the held image is displayed on the display unit 689. Note that the image held in the display memory 686 will be described in detail with reference to FIG. 35, FIG. 36, and the like.

The display control unit 687 is configured to sequentially display, on a frame-by-frame basis, a composite image held in the display memory 686.

The display unit 689 is configured to display, under control of the display control unit 687, a composite image held in the display memory 686. For example, the display unit 689 can be implemented by a display of a personal computer or a television. Note that display examples of a composite image will be described in detail with reference to FIG. 42 and the like.

The operation accepting unit 688 includes various operation keys and the like and is configured to output, upon accepting an operation input entered using these keys, the details of the accepted operation input to the file obtaining unit 681 or the display-region extracting unit 685. In the operation accepting unit 688, for example, a playback instructing key that gives an instruction to play a moving image, a display-magnification specifying key that specifies display magnification of a moving image, and a setting key that sets a display mode in the case where a moving image is played are provided. As display modes thereof, for example, there is a display mode in which the current image corresponding to the current frame is affine-transformed and displayed in a state in which a composite image corresponding to individual frames preceding the current frame is fixed, or a display mode in which a composite image corresponding to individual preceding frames is affine-transformed in a direction opposite to that of affine transformation parameters and is displayed in a state in which the current image corresponding to the current frame is fixed. Switching can be performed between these display modes even during playback of a moving image. That is, according to the embodiment of the present invention, displaying can be performed by arbitrarily switching between an image combining/displaying method in which history images in the past are transformed while fixing a current image display border, and an image combining/displaying method in which the current image display border is moved on the basis of camerawork.

Figure 35:
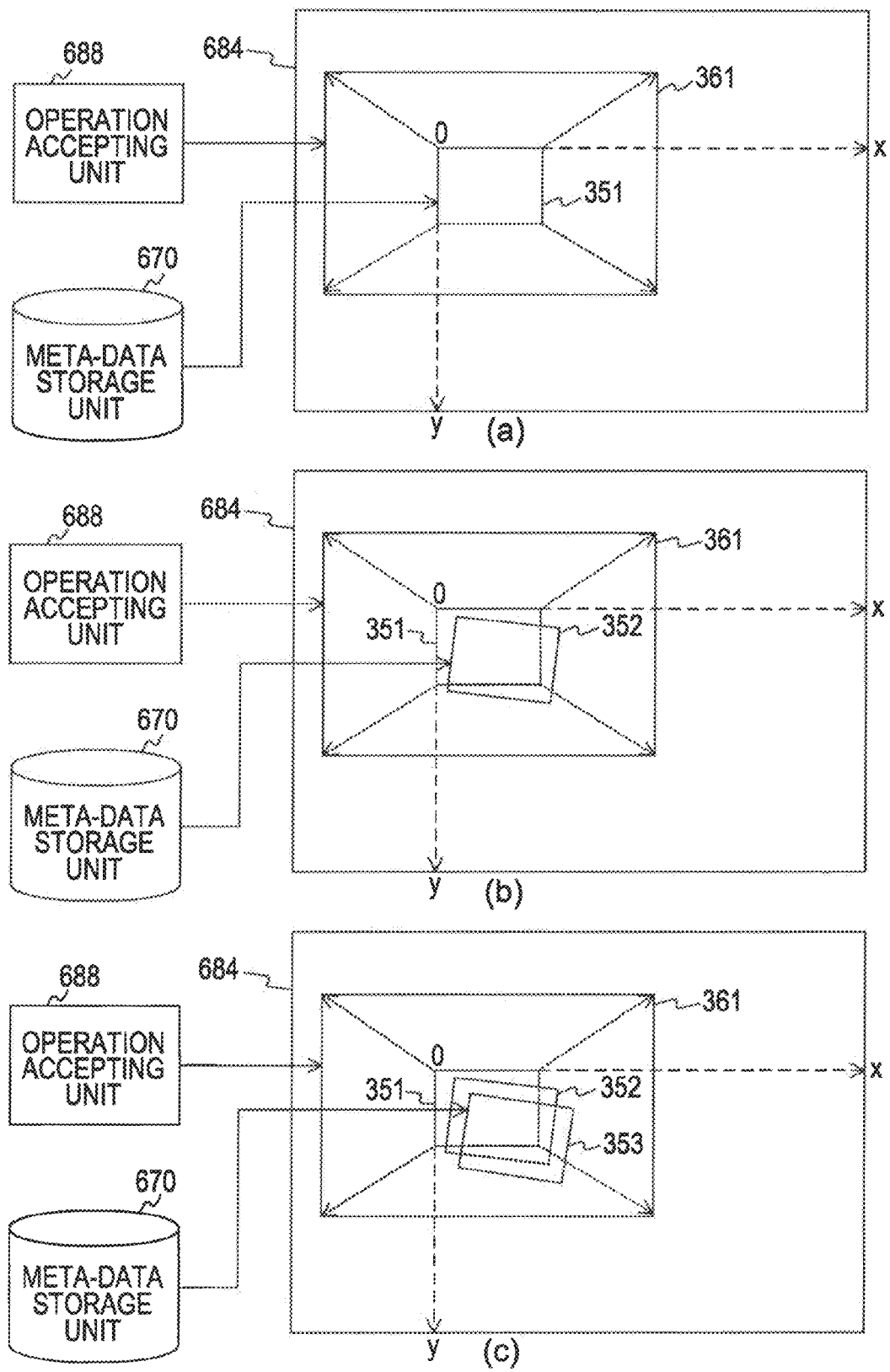
FIG. 35 includes diagrams schematically showing the relationship between individual frames of a moving image file stored in the moving-image storage unit 660 in the embodiment of the present invention, and a display region.

FIG. 35 includes diagrams schematically showing the relationship between individual frames of a moving image file stored in the moving-image storage unit 660 in the embodiment of the present invention, and the display region. Here, only the image memory 684, the meta-data storage unit 670, and the operation accepting unit 688 are illustrated, and structures other than these parts are omitted in the drawings. Also, the case in which, from frames "1" to "3" included in the moving image file 661 shown in part (b) of FIG. 33, a composite image is generated in the image memory 684 using the affine transformation parameters 676 stored in the meta-data file 671 will be described by way of example. Note that, in FIG. 35, the case in which a composite image corresponding to individual frames preceding the current frame is fixed on the display unit 689 is shown.

In part (a) of FIG. 35, the case in which a frame 1 (664), which is the first frame among frames constituting the moving-image file 661 shown in part (b) of FIG. 33, is saved in the image memory 684 is shown. For example, when an operation input of a playback instruction that gives an instruction to fix a composite image corresponding to individual frames preceding the current frame and to play the moving image file 661 stored in the moving-image storage unit 660 is accepted by the operation accepting unit 688, as shown in part (a) of FIG. 35, an image 351 corresponding to the frame 1 (664) of the moving-image file 661 is saved in the image memory 684. Here, regarding the position at which the image 351 corresponding to the first frame is saved in the image memory 684, the image 351 may be saved at a pre-specified position, or at a position specified by a user using the operation accepting unit 688. Also, for example, the size of a composite image of frames "1" to "n" may be calculated using the affine transformation parameters 676 which are stored in the meta-data file 671 and which relate to the moving image file 661, and, on the basis of the calculation, the position at which the image 351 is saved may be determined. Note that, in this example, a description will be given in which the upper left-hand position of the image 351 placed on the image memory 684 serves as the origin, the horizontal direction (abscissa) serves as the x-axis, and the vertical direction (ordinate) serves as the y-axis.

As shown in part (a) of FIG. 35, it is assumed that a display region in the case where the image 351 is placed on the image memory 684 is a display region 361. The display region 361 is determined, on the basis of the position at which the image 351 is saved and a size thereof, in accordance with the value of display magnification accepted by the operation accepting unit 688. For example, when a display magnification of "0.5 times" at which the current image is zoomed out has been specified, the display region 361 becomes twice the size of the image 351, with the image 351 serving as the center. Note that the position of the display region 361 relative to the image 351 can be determined from affine transformation parameters. That is, when a display magnification of "0.5 times" at which the current image is zoomed out has been specified, the display region is set using affine transformation parameters with which zoom components in the x-direction and the y-direction are doubled. Also, when the display region is to be translated or rotated relative to the current image, the position and range of the display region can be determined using affine transformation parameters.

In part (b) of FIG. 35, the case in which a frame 2 (665) among the frames constituting the moving-image file 661 shown in part (b) of FIG. 33 is saved in the image memory 684 is shown. In this case, as has been described above, an image 352 corresponding to the frame 2 (665) is transformed using the affine transformation parameters 676 stored in association with the frame numbers 675 "1" and "2" in the meta-data file 671, and the transformed image 352 is written over and combined with the image 351. In this case, for example, when the image 352 corresponding to the current frame does not protrude from the range of the display region 361, the position and size of the display region 361 remain unchanged. Here, the case in which the current image protrudes from the range of the current display region will be described in detail with reference to FIG. 36 and FIG. 37. Note that the display region 361 may be translated in accordance with movement of the image 352 relative to the image 351.

In part (c) of FIG. 35, the case in which a frame 3 among the frames constituting the moving-image file 661 shown in part (b) of FIG. 33 is saved in the image memory 684 is shown. Also in this case, as has been described above, an image 353 corresponding to the frame 3 is transformed using the affine transformation parameters 676 stored in association with the frame numbers 675 "1" to "3" in the meta-data file 671, and the transformed image 353 is written over and combined with the images 351 and 352.

Next, a process in the case where the display region is moved in accordance with movement of the current image will be described in detail with reference to the drawings.

FIG. 36 includes diagrams schematically showing a display-region moving method in the case where the current image protrudes from the display region. Part (a) of FIG. 36 is a diagram showing the relationship between a plurality of images including a current image 760, which are held in the image memory 684, and a display region 759. As shown in part (a) of FIG. 36, since the entire current image 760 is included in the range of the display region 759, the entire current image 760, together with other images, is displayed on the display unit 689.

Part (b) of FIG. 36 is a diagram showing the relationship between a plurality of images including a current image 762, which are held in the image memory 684, and the display region 759. Here, the current image 762 is an image corresponding to the next frame of the current image 760 shown in part (a) of FIG. 36. As shown in part (b) of FIG. 36, when a portion of the current image 762 protrudes from the range of the display region 759, a portion of the current image 760 is not displayed on the display unit 689. Therefore, in such a case, as shown in part (b) of FIG. 36, a difference value 763 between one side of the display region 759 and the current image 762 protruding from the range of the display region 759 is calculated by the display-region extracting unit 685, and the display region 759 is moved by a value obtained by adding an additional value 764 to the difference value 763. Here, the additional value 764 can be, for example, five pixels. Alternatively, the display region 759 may be moved by the difference value only, instead of adding the additional value. Note that, in part (b) of FIG. 36, the case in which the current image 762 protrudes from the right-side portion of a display region 761 will be described by way of example. However, when the current image protrudes from the upper portion, the lower portion, or the left-side portion, the display region can be moved using a similar method. Also, when the current image protrudes from at least two portions among the upper, lower, left, and right portions, a difference value with each of the sides is calculated, and, on the basis of the calculated individual difference values, the display region can be moved in directions of the respective sides.

In part (c) of FIG. 36, a display region 765 moved on the basis of the difference value 763 calculated in a state shown in part (b) of FIG. 36 is shown.

Figure 37:
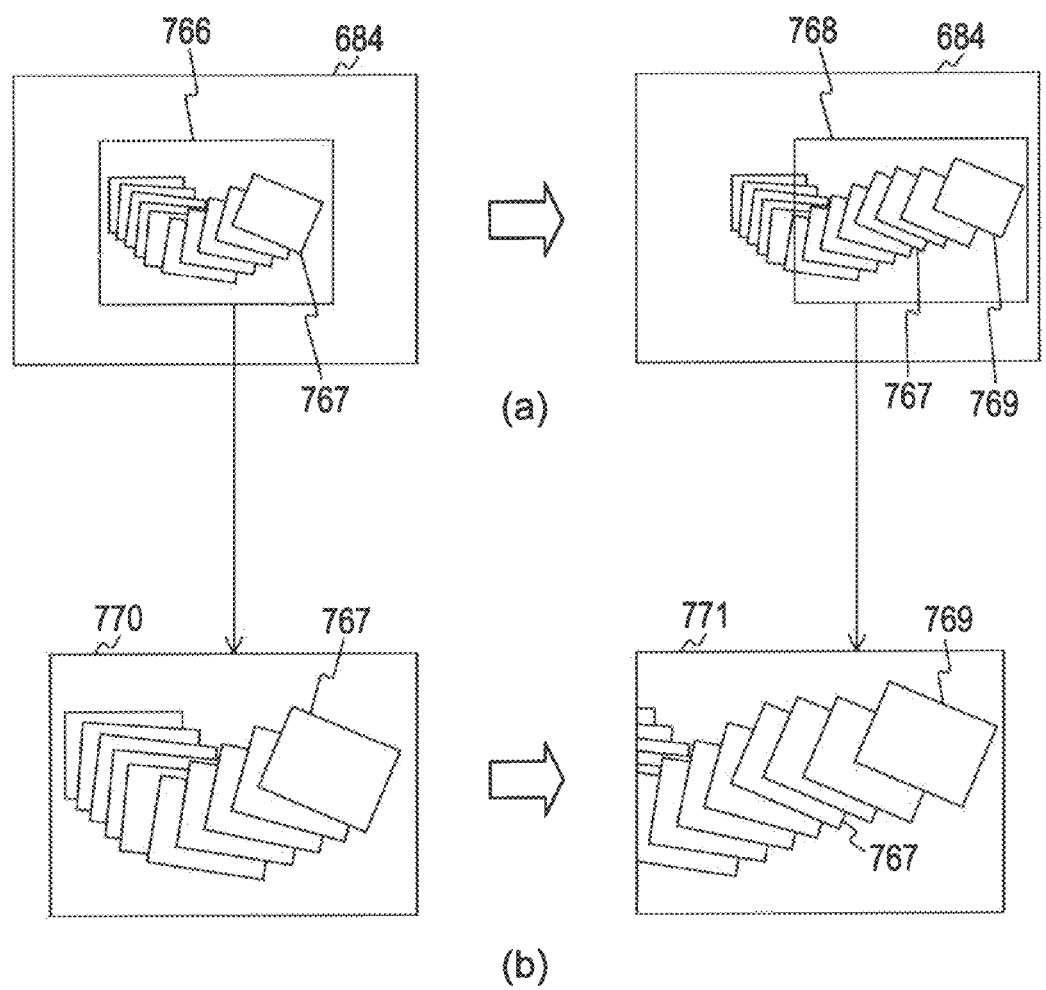
FIG. 37 includes diagrams showing an example of transition in the case where the display region is moved with the moving method shown in FIG. 36.

FIG. 37 includes diagrams showing an example of transition in the case where the display region is moved with the moving method shown in FIG. 36. Part (a) of FIG. 37 is a diagram showing an example of transition of the display region on the image memory 684 in the case where the display region is moved, and part (b) of FIG. 37 is a diagram showing an example of transition of images displayed on the display unit 689 in the case where the display region is moved. As shown in the diagrams, even when images subsequent to the current image 767 protrude from a display region 766, the display region 766 can be sequentially moved in accordance with the position of the current image. For example, when the current image advances from the current image 767 to a current image 769 on the image memory 684, in accordance with this movement, the display region 766 moves to the position of a display region 768. In this case, an image displayed on the display unit 689 changes from an image 770 to an image 771. Accordingly, even when an image displayed on the display unit 689 is to be enlarged/reduced, the entire current image can be constantly displayed on the display unit 689.

Next, the case in which the current image corresponding to the current frame is fixed on the display unit 689 will be described in detail with reference to the drawings.

Figure 38:
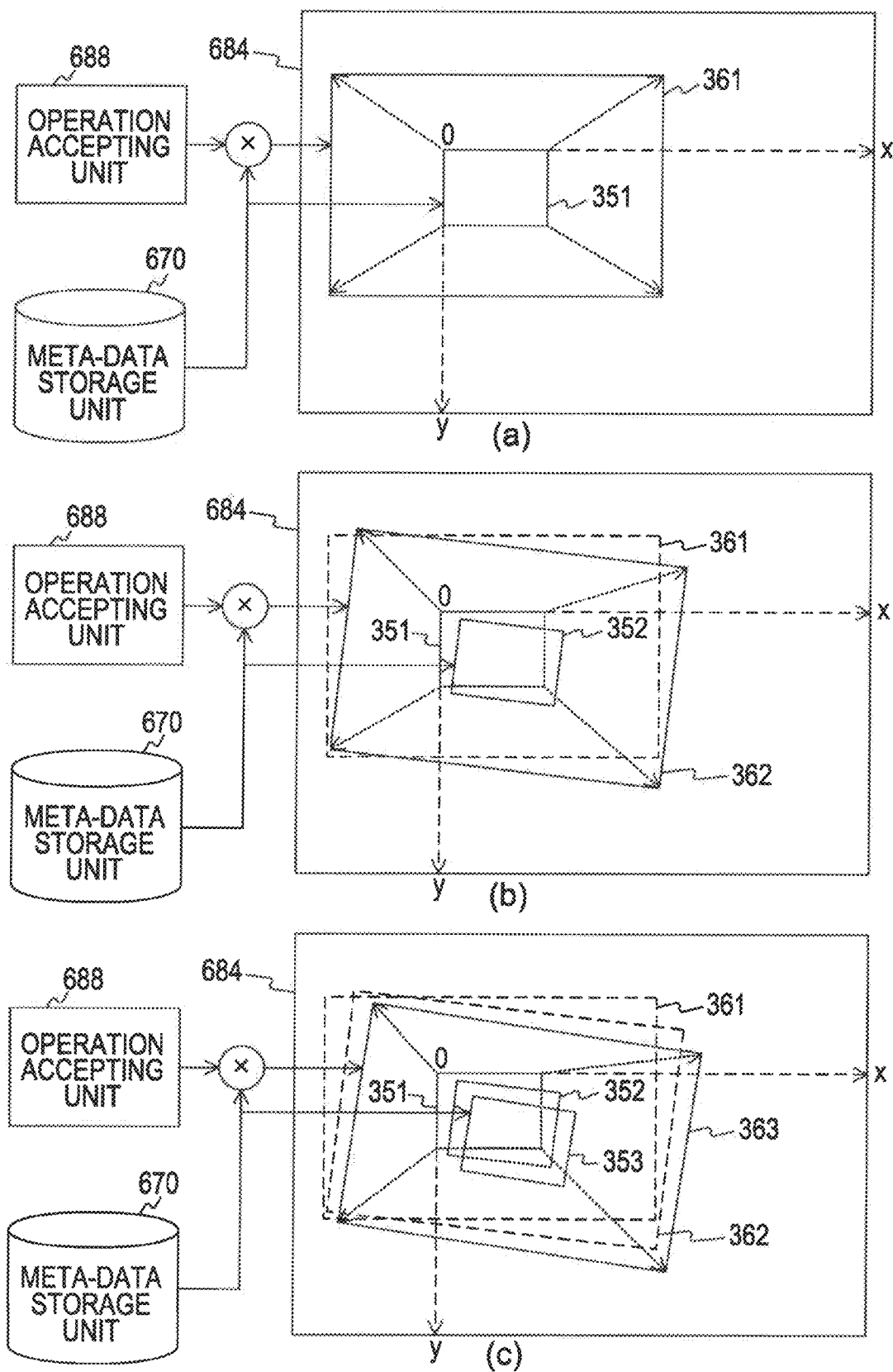
FIG. 38 includes diagrams schematically showing the relationship between individual frames of a moving image file stored in the moving-image storage unit 660 in the embodiment of the present invention, and the display region.

FIG. 38 includes diagrams schematically showing the relationship between individual frames of a moving image file stored in the moving-image storage unit 660 in the embodiment of the present invention, and the display region. Here, as in FIG. 35, only the image memory 684, the meta-data storage unit 670, and the operation accepting unit 688 are illustrated, and structures other than these parts are omitted in the drawings. Also, the case in which, from frames "1" to "3" included in the moving image file 661 shown in part (b) of FIG. 33, a composite image is generated in the image memory 684 using the affine transformation parameters 676 stored in the meta-data file 671 will be described by way of example.

In part (a) of FIG. 38, as in part (a) of FIG. 35, the case in which the frame 1 (664) is saved in the image memory 684 is shown. Note that, since the positions and sizes of the image 351 and the display region 361 shown in part (a) of FIG. 38 are the same as those shown in part (a) of FIG. 35, detailed descriptions thereof are omitted here. Note that, in this example, together with transformation of the current image, the display region is transformed. However, since affine transformation parameters corresponding to the frame 1 (664) are parameters of an identity matrix, the display region 361 corresponding to the frame 1 (664) is determined by taking into consideration only the specification of display magnification from the operation accepting unit 688.

In part (b) of FIG. 38, as in part (a) of FIG. 35, the case in which the frame 2 (665) is saved in the image memory 684 is shown. In this case, as in part (a) of FIG. 35, the image 352 corresponding to the frame 2 (665) is transformed, and the transformed image 352 is written over and combined with the image 351. Additionally, an affine transformation is also applied to the display region. That is, with reference to the position and size of the image 351, the image 352 corresponding to the frame 2 (665) is transformed using the affine transformation parameters 676 stored in association with the frame numbers 675 "1" and "2" in the meta-data file 671. The position and size of the image 352 are transformed using affine transformation parameters determined in accordance with the value of display magnification accepted by the operation accepting unit 688, and a region determined in accordance with the transformed position and size becomes a display region 362. Specifically, when matrices of affine transformation parameters corresponding to the frame numbers 675 "1" and "2" are A1 and A2, and a matrix of affine transformation parameters determined in accordance with the value of display magnification accepted by the operation accepting unit 688 is B (for example, a matrix with reference to the current image), the value of A1×A2×B is obtained, and, with reference to the position and size of the image 351, the display region 362 is determined using the obtained matrix A1×A2×B.

In part (c) of FIG. 38, as in part (a) of FIG. 35, the case in which the frame 3 is saved in the image memory 684 is shown. Also in this case, as has been described above, the image 353 corresponding to the current frame 3 is transformed, and the transformed image 353 is written over and combined with the images 351 and 352. Additionally, an affine transformation is applied to the display region, and a display region 363 relative to the image 353 is determined. Specifically, when matrices of affine transformation parameters corresponding to the frame numbers 675 "1" to "3" are A1 to A3, and a matrix of affine transformation parameters determined in accordance with the value of display magnification accepted by the operation accepting unit 688 is B, the value of A1×A2×A3×B is obtained, and, with reference to the position and size of the image 351, the display region 363 is determined using the obtained matrix A1×A2×A3×B.

Figure 39:
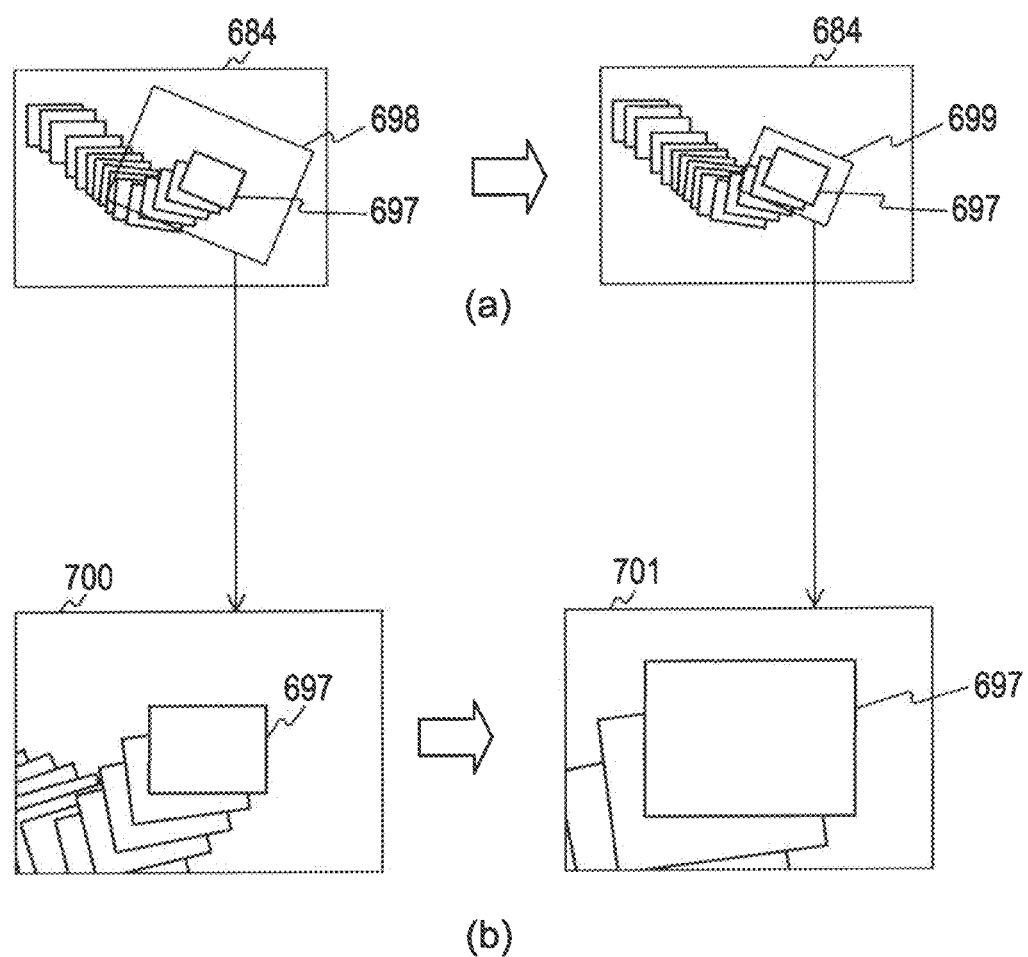
FIG. 39 includes diagrams showing the outline of an enlarging method in the case where, when a display mode for fixing the current image on a display unit 689 has been specified, a moving image displayed on the display unit 689 is enlarged and displayed.

FIG. 39 includes diagrams showing the outline of an enlarging method in the case where, when a display mode for fixing the current image on the display unit 689 has been specified, a moving image displayed on the display unit 689 is enlarged and displayed. Part (a) of FIG. 39 is a diagram schematically showing transition of the display region in the case where a moving image displayed on the display unit 689 is enlarged and displayed. Part (b) of FIG. 39 is a diagram showing a display example in the case where images within display regions 698 and 699 shown in part (a) of FIG. 39 are displayed on the display unit 689.

In part (b) of FIG. 39, because of the display region 698 shown in part (a) of FIG. 39, an image 700 extracted from the image memory 684 and displayed on the display unit 689 is shown. Here, when an enlargement/displaying instructing operation is accepted by the operation accepting unit 688 in a state where the image 700 shown in part (b) of FIG. 39 is displayed, the size of the display region 698 is reduced by the display-region extracting unit 685 in accordance with the enlargement/displaying instructing operation. Note that this size-reducing process is performed with a current image 697 serving as the center. That is, as has been described above, the position and size of the image 679 are transformed using affine transformation parameters determined in accordance with the value of display magnification accepted by the operation accepting unit 688, and the display region 698 is determined in accordance with the transformed position and size. In this example, since an operation input of enlarging display magnification has been given, zoom components of affine transformation parameters are determined in accordance with the enlargement of display magnification.

For example, as shown in part (a) of FIG. 39, the size of the display region 698 is reduced, and the display region 698 becomes the display region 699. In part (b) of FIG. 39, because of the display region 699 shown in part (a) of FIG. 39, an image 701 extracted from the image memory 684 and displayed on the display unit 689 is shown. As above, by changing only the size of the display region, an image including the current image can be enlarged or reduced, and can be displayed.

As has been illustrated above, by displaying images within the range of a display region placed on the image memory 684, a composite image being played can be sequentially displayed. Here, when the current image is to be affine-transformed and combined in the image memory 684, image quality transformation, such as a resolution transforming process of transforming an image to have a lower resolution, and a compressing process, may be applied to the current image. Therefore, it is considered that, when the current image is to be enlarged/displayed with a higher display magnification, a composite image including the current image may be blurred. Therefore, in this example, regarding the current image currently being played, a composite image is displayed using an image that existed before the combining performed in the image memory 684. This displaying method will be described in detail below with reference to the drawings.

Figure 40:
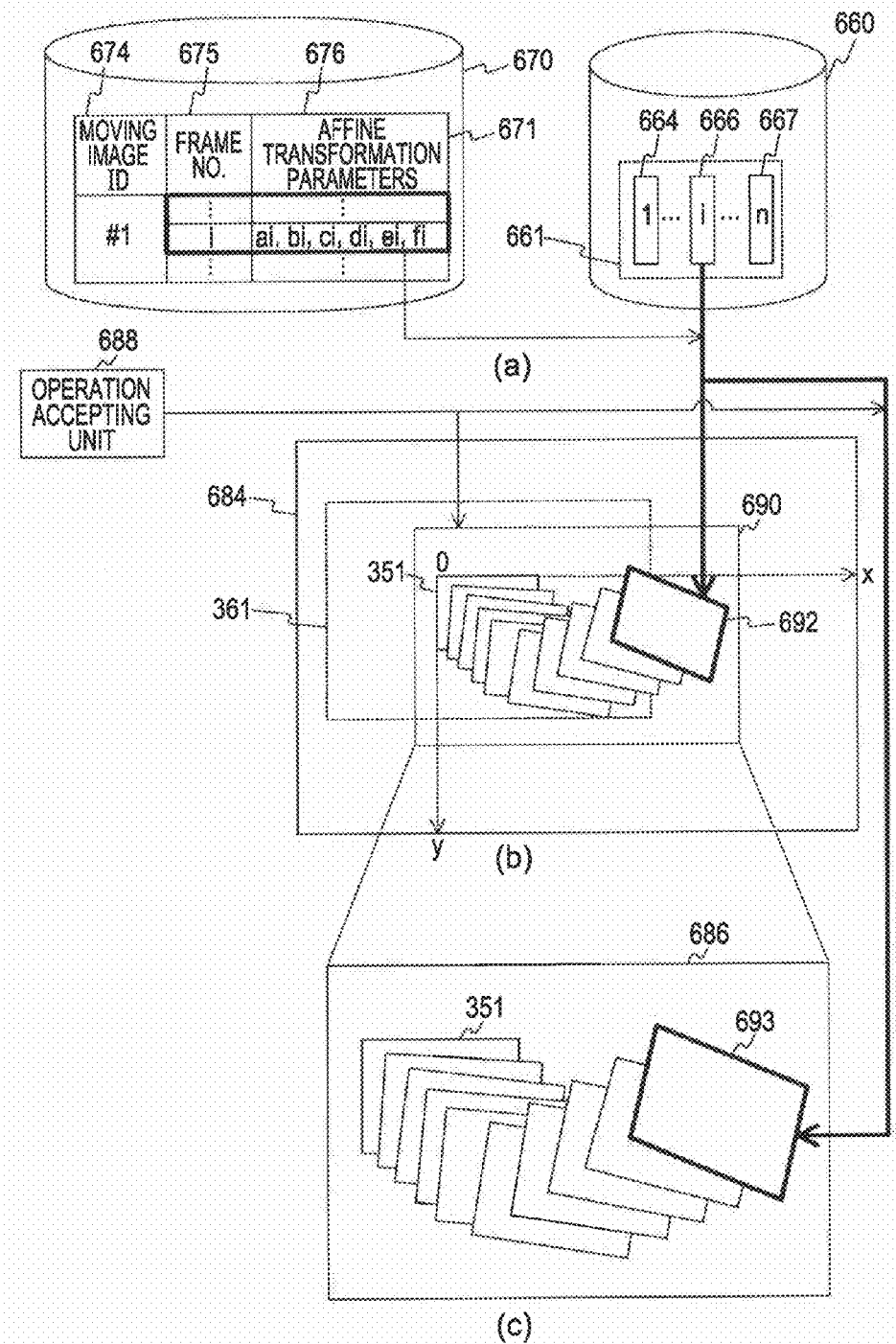
FIG. 40 includes diagrams schematically showing the flow of individual frames of a moving image file stored in the moving-image storage unit 660 in the embodiment of the present invention.
Figure 41:
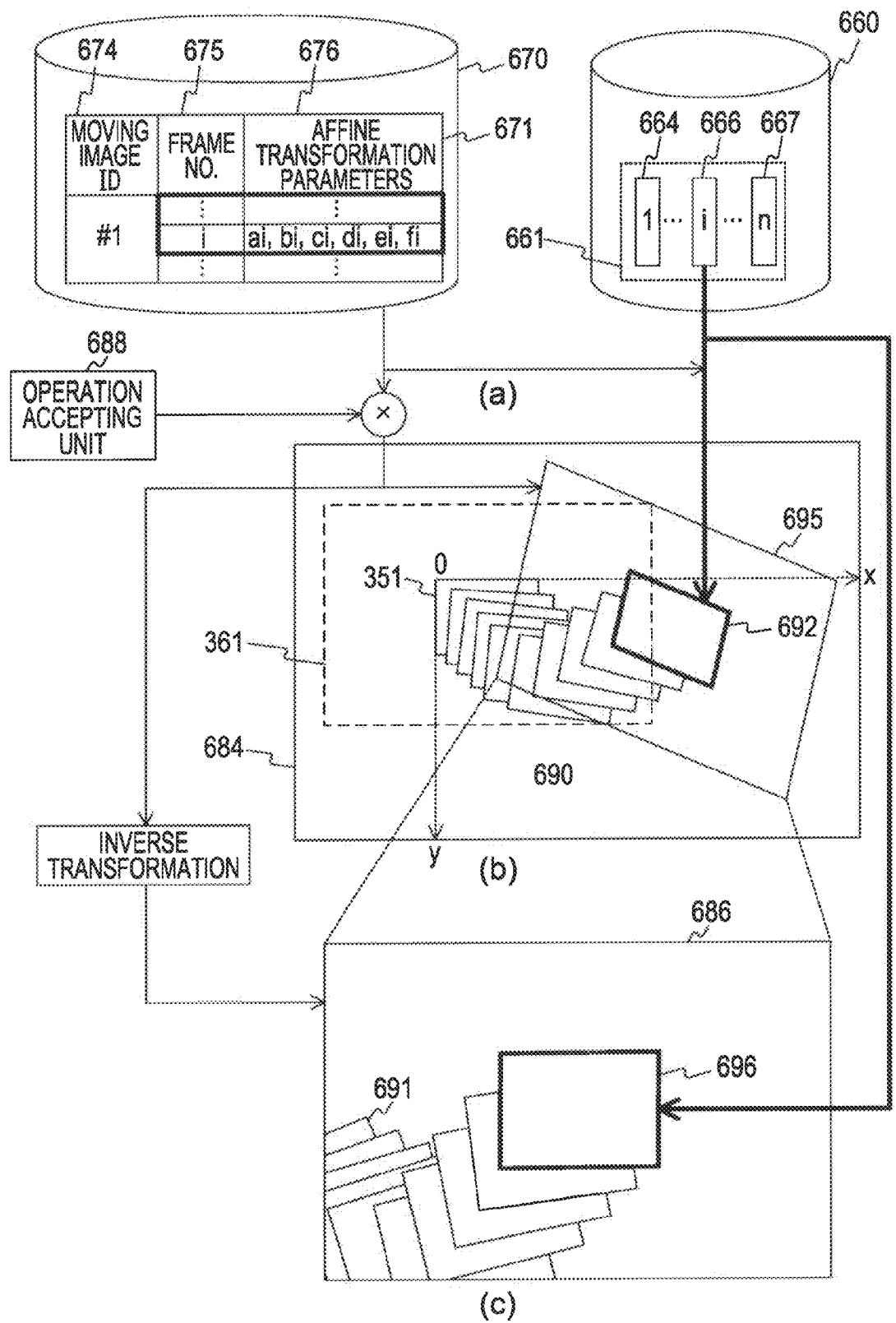
FIG. 41 includes diagrams schematically showing the flow of the individual frames of the moving image file stored in the moving-image storage unit 660 in the embodiment of the present invention.

FIG. 40 and FIG. 41 include diagrams schematically showing the flow of individual frames of a moving image file stored in the moving-image storage unit 660 in the embodiment of the present invention. Here, only the relationship among the moving-image storage unit 660, the meta-data storage unit 670, the image memory 684, and the display memory 686 is illustrated, and structures other than these parts are omitted in the drawings. Also, in FIG. 40, the case in which a composite image corresponding to individual frames preceding the current frame is fixed on the display unit 689 is shown. In FIG. 41, the case in which the current image corresponding to the current frame is fixed on the display unit 689 is shown.

In part (a) of FIG. 40, the moving image file 661 and the meta-data file 671, which are shown in part (b) of FIG. 33, are simplified and shown. Hereinafter, an example in which an image corresponding to a frame i (666) included in the moving image file 661 is displayed will be described. That is, it is assumed that a composite image has been generated from images corresponding to frames 1 to "i–1" constituting the moving image file 661. Also, it is assumed that, in accordance with movement of the current image, the display region 361 shown in FIG. 35 is moved to the right side.

In part (b) of FIG. 40, the image memory 684 in which a composite image generated by combining images corresponding to individual frames constituting the moving image file 661 is held is schematically shown. As shown in part (b) of FIG. 35, the image 351 corresponding to the frame 1 (664) included in the moving image file 661 is held at first in the image memory 684. After the image 351 has been held in the image memory 684, individual images corresponding to frames 2 to "i–1" constituting the moving image file 661 are sequentially affine-transformed using values of the affine transformation parameters 676 stored in association with the frames 2 to "i–1", respectively, in the meta-data file 671, and the affine-transformed images are sequentially written over and held in the image memory 684. From a composite image held in the image memory 684, images existing within a display region determined in accordance with an operation input from the operation accepting unit 688, which relates to the specification of display magnification, are extracted, on a frame-by-frame basis, by the display-region extracting unit 685.

In a state in which a composite image of individual images corresponding to the frames 1 to "i–1" is held in the image memory 684, an image corresponding to the frame i (666) included in the moving image file 661 is affine-transformed using the affine transformation parameters 676 stored in association with the frames 1 to i in the meta-data file 671, and an affine-transformed current image 692 is written over and held in the image memory 684. From a composite image held in the image memory 684, images existing within a display region 690 determined in accordance with an operation input from the operation accepting unit 688, which relates to the specification of display magnification, are extracted by the display-region extracting unit 685, and the display memory 686 is caused to hold the extracted images, as shown in part (c) of FIG. 40.

In part (c) of FIG. 40, the display memory 686 in which images extracted by the display-region extracting unit 685 are held is schematically shown. Here, among images extracted by the display-region extracting unit 685, a current image 693 corresponding to the current frame is not the current image 692 extracted by the display-region extracting unit 685 from the image memory 684, but an image obtained from the moving-image storage unit 660 and affine-transformed by the image transforming unit 682 is used. Here, the saving position of the current image 693 in the display memory 686 can be determined on the basis of the position and size of the current image 692 in the image memory 684, and the position and size of the display region 690 in the image memory 684. For example, when matrices of affine transformation parameters stored in association with the frame numbers 675 "1" to "i" in the meta-data file 671 are A1 ... Ai, and a matrix of affine transformation parameters for determining the display region 690 (for example, a matrix with reference to the image memory 684) is C, with reference to the position of the image 351, the saving position of the current image 693 in the display memory 686 can be determined using Inv(C)×A1×...×Ai.

As shown in part (c) of FIG. 40, images extracted by the display-region extracting unit 685 are held in the display memory 686. Additionally, an image obtained from the moving-image storage unit 660 and affine-transformed by the image transforming unit 682 is written over the images extracted by the display-region extracting unit 685, and a composite image is held in the display memory 686. The image held in the display memory 686 is displayed on the display unit 689. As above, regarding a current image, a relatively clean current image can be displayed by using an image in a state prior to applying a process such as size-reduction to the affine-transformed image and holding the image in the image memory 684. Also, even when enlargement or the like is performed in response to a user operation, the current image can be displayed in a clean state.

In part (a) of FIG. 41, the moving image file 661 and the meta-data file 671, which are shown in part (b) of FIG. 33, are simplified and shown. Note that the moving-image storage unit 660 and the meta-data storage unit 670 shown in part (a) of FIG. 41 and a composite image held in the image memory 684 shown in part (b) of FIG. 41 are the same as those in parts (a) and (b) of FIG. 40, and accordingly, descriptions thereof are omitted here.

In part (b) of FIG. 41, the image memory 684 in which a composite image from the image 351 to the current image 692 shown in part (b) of FIG. 40 is held is schematically shown, and the display region 361 shown in part (b) of FIG. 38 is indicated by broken lines. In this example, as shown in FIG. 38, in order to fix the position of the current image corresponding to the current frame on the display unit 689, a display region is calculated by an affine transformation in accordance with the current image 692. That is, with reference to the image 351 which is the current image, the image corresponding to the frame i (666) is transformed to the current image 692 using the affine transformation parameters 676 stored in association with the frame numbers 675 "1" to "i" in the meta-data file 671, and the current image 692 is saved in the image memory 684. Regarding a display region 695 corresponding to the current frame i (666), the position and size of the current image 692 are transformed using affine transformation parameters determined in accordance with the value of display magnification accepted by the operation accepting unit 688, and the display region 695 is determined in accordance with the transformed position and size. The determination of the display region is performed by the display-region extracting unit 685.

In part (c) of FIG. 41, the display memory 686 in which images extracted by the display-region extracting unit 685 are held is schematically shown. Here, images held in the display memory 686 (images other than a current image 696) are images obtained by transforming, using an inverse matrix of a matrix relating to affine transformation parameters used to transform the display region 695, images extracted by the display-region extracting unit 685 (images existing within the range of the display region 695). That is, the shape of a display region placed on the image memory 684 may be a parallelogram or the like due to an affine transformation. In order to display, on the display unit 689, a composite image within a display region that has been affine-transformed in the foregoing manner, the composite image within the display region is transformed using an inverse matrix of a matrix relating to affine transformation parameters used to affine-transform the current image at present. For example, when matrices of affine transformation parameters stored in association with the frame numbers 675 "1" to "i" in the meta-data file 671 are A1 . . . Ai, and a matrix of affine transformation parameters for determining the display region 695 (for example, a matrix with reference to the current image) is B, Inv (A1× . . . Ai×Ai) is used as a matrix for transforming a composite image within the display region. Accordingly, for example, as shown in part (c) of FIG. 41, an image transformed to a parallelogram can be transformed to a rectangle, and displayed on the display unit 689. Also, among images extracted by the display-region extracting unit 685, as the current image 696 corresponding to the current frame, instead of an image extracted by the display-region extracting unit 685 from the image memory 684, an image that has been obtained from the moving-image storage unit 660 and that has not been affine-transformed is used. Here, the saving position and size of the current image 696 in the display memory 686 are determined in accordance with display magnification from the operation accepting unit 688.

As shown in part (c) of FIG. 41, images extracted by the display-region extracting unit 685 are held in the display memory 686. Additionally, an image obtained from the moving-image storage unit 660 is written over the images extracted by the display-region extracting unit 685, and a composite image is held in the display memory 686. Accordingly, when a display mode for displaying the current image at a fixed position has been specified, an affine-transformed composite image can be brought back, with an inverse matrix, to a state in which the composite image has not been affine-transformed, and the composite image that has not been affine-transformed can be displayed. Also, regarding a current image, as in FIG. 40, a relatively clean image can be displayed.

As has been illustrated, since generation is performed using the same method as a generating method of a composite image held in the image memory 684, and playback of a moving image in two display modes can be realized, switching between the two display modes can be performed during playback of a moving image. Accordingly, a viewer of a moving image being played can switch the display mode to a desired display mode even during playback. For example, in the case where a moving image is being played in a display mode shown in FIG. 40, if a person of the viewer's type appears in the center of the current image and the viewer wishes to place that person in a central portion of the display unit 689 and view that person, the display mode can be switched to playback of a moving image in a display mode shown in FIG. 41 by performing a display-mode switching operation from the operation accepting unit 688. Also, as the current image, instead of a composite image held in the image memory 684, an image obtained from the moving-image storage unit 660 can be used. Therefore, a relatively clean image can be viewed. This display example will be described in detail with reference to FIG. 42 and FIG. 43.

Part (a) of FIG. 42 is a diagram showing a display example in the case where a moving image shot by a camera is played. In this example, an image 750 during playback of a moving image of a parent and a child playing in a grass playground in front of a large building, which has been shot while moving the camera in a horizontal direction, is shown. Here, in the image 750, an image 751 is formed as a panorama by combining images corresponding to individual frames constituting the moving image. Also, an image corresponding to the current frame in the image 750 is a current image 752.

Here, the case in which an image region surrounded by a border 753 is enlarged and displayed will be described. When an image displayed on the display unit 689 is to be enlarged/reduced and displayed, a user operates the display-magnification specifying key in the operation accepting unit 688, whereby the user can specify a desired display magnification. For example, as shown in part (a) of FIG. 42, in the case where the image 750 is displayed on the display unit 689, if an image region enclosed by the border 753 is to be enlarged and displayed, the user specifies display magnification by operating the display-magnification specifying key in the operation accepting unit 688, and additionally, the user specifies the position, whereby the image region enclosed by the border 753 can be enlarged and displayed.

Part (b) of FIG. 42 is a diagram showing an image 754 in a state prior to performing an affine transformation of the current image 752 in the image 750.

Part (a) of FIG. 43 is a diagram showing an image 755 in the case where the image region enclosed by the border 753 shown in part (a) of FIG. 42 is enlarged and displayed. The image 755 shown in part (a) of FIG. 43 is an image generated by the combining performed in the display memory 686 in a state prior to saving the affine-transformed current image in the image memory 684. As above, in the region of a current image 756, a relatively fine image in a state prior to being saved in the image memory 684 is displayed. Therefore, when the current image 756 is compared with regions other than this region, the current image 756 which is relatively cleaner than the other regions can be viewed. In contrast, an image 757 shown in part (b) of FIG. 43 is an image saved in the display memory 686 in a state in which the affine-transformed current image is saved in the image memory 684. When images are displayed in such a manner, even in the region of a current image 758, an image at a level equivalent to images in other regions is displayed. That is, according to the embodiment of the present invention, at the time of combining images and displaying a composite image, a history image held in the display memory 686 may be compressed. However, as the current image, a non-compressed image or an image with a higher resolution than the history image can be used. Therefore, high-quality image combining and displaying can be realized.

Figure 44:
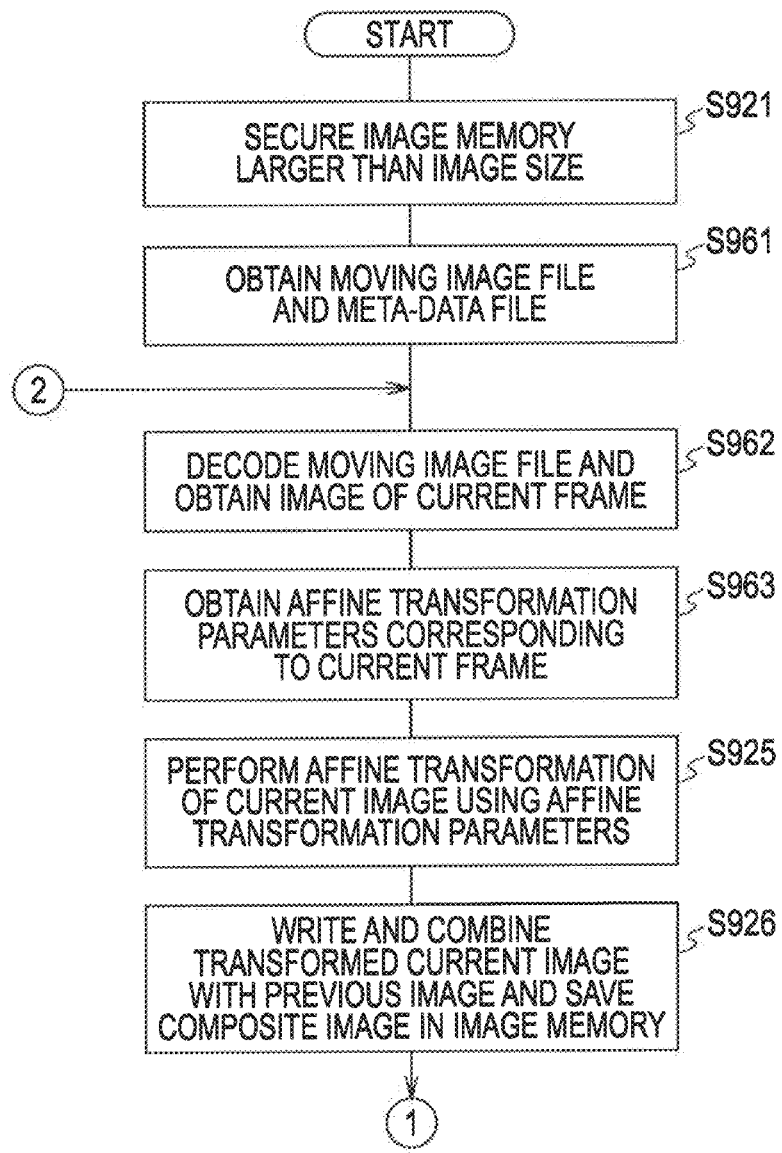
FIG. 44 is a flowchart showing a processing procedure of a moving-image playing process performed by the image processing apparatus 680 in the embodiment of the present invention.
Figure 45:
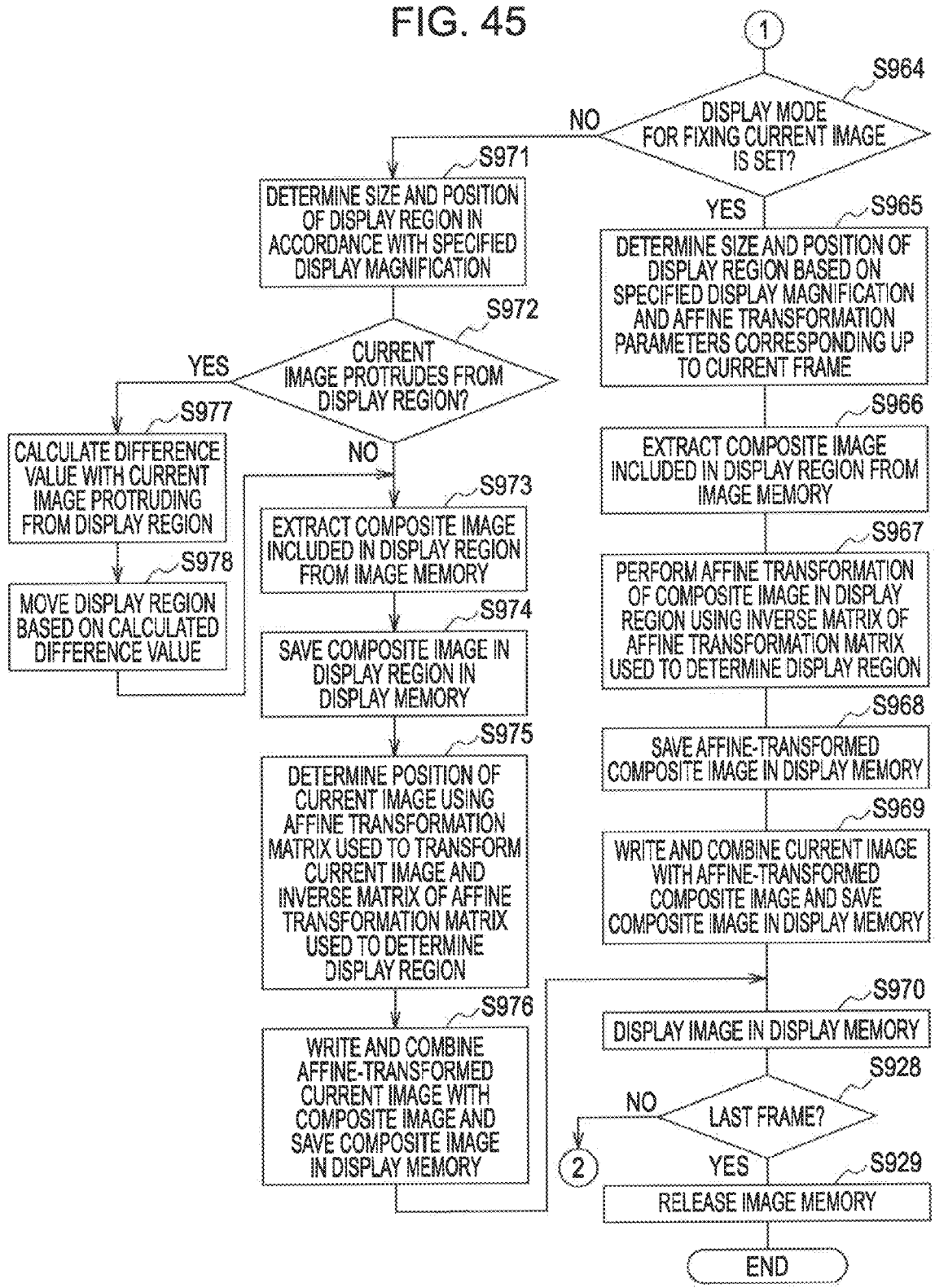
FIG. 45 is a flowchart showing a processing procedure of a moving-image playing process performed by the image processing apparatus 680 in the embodiment of the present invention.

FIG. 44 and FIG. 45 are flowcharts showing a processing procedure of a moving-image playing process performed by the image processing apparatus 680 in the embodiment of the present invention. Note that, in the processing procedure shown in FIG. 44 and FIG. 45, since steps S921, S925, S926, S928, and S929 are similar to the processing procedure shown in FIG. 25, the same reference numerals are given thereto, and descriptions thereof are omitted here.

In response to an operation input from the operation accepting unit 688, the file obtaining unit 681 obtains a moving image file stored in the moving-image storage unit 660, and additionally obtains a meta-data file stored in association with the moving image file in the meta-data storage unit 670 (step S961). Then, the file obtaining unit 681 decodes the moving image file and obtains the current frame, which is one frame included in the moving image file (step S962). Then, the file obtaining unit 681 obtains affine transformation parameters corresponding to the obtained current frame from the meta-data file (step S963).

Then, after the affine-transformed current image corresponding to the current frame is written over a composite image and saved in the image memory 170 (step S926), the display-region extracting unit 685 determines whether or not a display mode for fixing the current image has been specified (step S964). When the display mode for fixing the current image has been specified (step S964), the display-region extracting unit 685 determines the position and size of the display region using affine transformation parameters of from the first frame to the current frame and affine transformation parameters corresponding to display magnification (step S965). Then, the display-region extracting unit 685 extracts a composite image included in the display region from the image memory 684 (step S966). Then, the display-region extracting unit 685 performs an affine transformation of the composite image extracted from the image memory 684, using an inverse matrix of a matrix of affine transformation parameters used to determine the display region (step S967).

Then, the display-region extracting unit 685 saves the composite image, which has been extracted from the image memory 684 and affine-transformed, in the display memory 686 (step S968). Then, the image combining unit 683 writes and combines the current image with the composite image held in the display memory 686 (step S969). Then, the composite image held in the display memory 686 is displayed by the display unit 689 (step S970).

Also, when the display mode for fixing the current image has not been specified (step S964), the display-region extracting unit 685 determines the position and size of the display region using the affine transformation parameters corresponding to display magnification (S971). Note that, when the display region moves in accordance with transformation of the current image, the position of the display region which was just moved may be used.

Then, the display-region extracting unit 685 determines whether or not the current image held in the image memory 684 protrudes from the display region (step S972). When the current image held in the image memory 684 does not protrude from the display region (that is, when the entire current image is included in the range of the display region) (step S972), the display-region extracting unit 685 extracts the composite image included in the display region from the image memory 684 (step S973). Then, the display-region extracting unit 685 saves the composite image, which has been extracted from the image memory 684, in the display memory 686 (step S974).

Then, the display-region extracting unit 685 determines the position of the current image in the display memory 686 using a matrix of affine transformation parameters used to transform the current image and an inverse matrix of a matrix of affine transformation parameters used to determine the display region (step S975). Then, the image combining unit 683 writes and combines the affine-transformed current image with the composite image held in the display memory 686 (step S976). Then, the flow proceeds to step S970.

Alternatively, when the current image held in the image memory 684 protrudes from the display region (that is, when at least a portion of the current image is not included in the range of the display region) (step S972), the display-region extracting unit 685 calculates a difference value between one side of the display region and the portion of the current image protruding from the display region (step S977). Then, the display-region extracting unit 685 moves the display region on the basis of the calculated difference value (step S978). Then, the flow proceeds to step S973.

Next, the case where a feature-point extracting process and an optical-flow calculating process in the embodiment of the present invention are performed with a multi-core processor will be described in detail with reference to the drawings.

Figure 46:
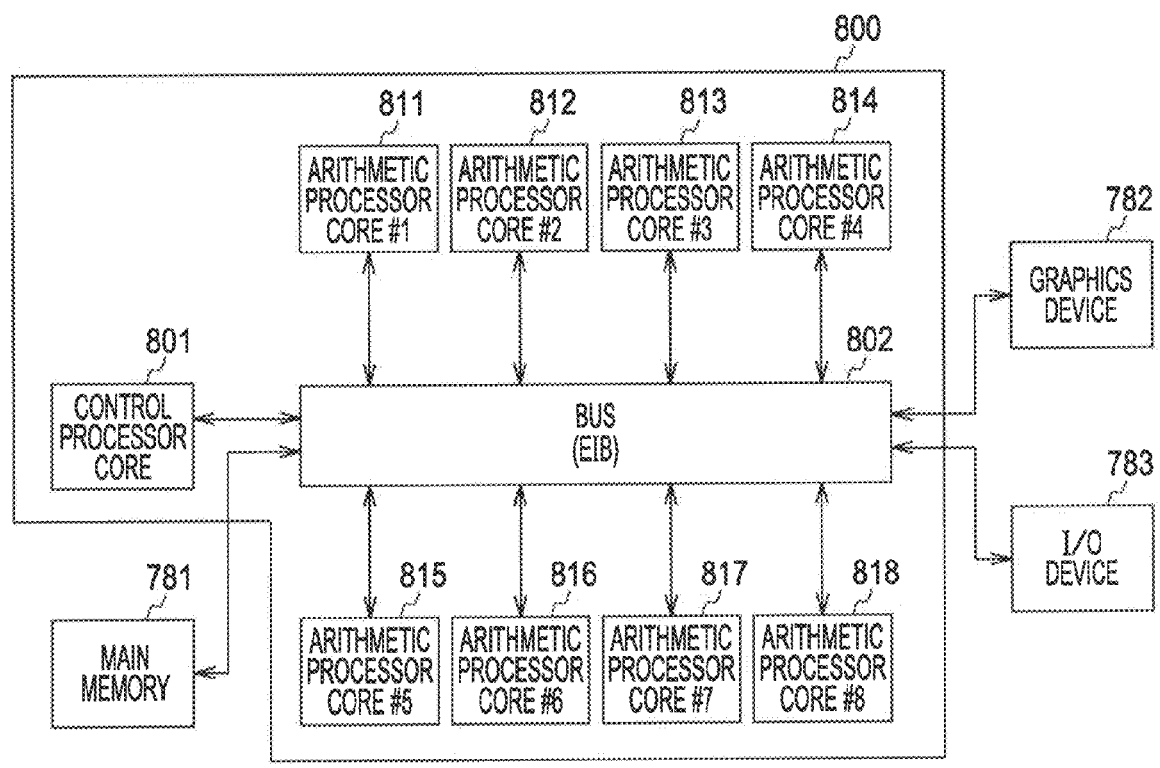
FIG. 46 is a diagram showing a structure example of a multi-core processor 800 in an embodiment of the present invention.

FIG. 46 is a diagram showing a structure example of a multi-core processor 800 in an embodiment of the present invention. The multi-core processor 800 is a processor in which a plurality of different types of processor cores are mounted on a single CPU (Central Processing Unit) package. That is, in order to maintain the processing capability of each processor core unit and additionally to make the configuration simple, a plurality of processor cores including two types, one type corresponding to all applications and the other type optimized, to a certain degree, for a predetermined application, are mounted in the multi-core processor 800.

The multi-core processor 800 includes a control processor core 801, arithmetic processor cores (#1) 811 to (#8) 818, and a bus 802, and is connected to a main memory 781. Also, the multi-core processor 800 is connected to other devices, such as a graphics device 782 and an I/O device 783. As the multi-core processor 800, for example, "Cell (Cell Broadband Engine)", which is a microprocessor developed by the applicant of the present application, and the like can be adopted.

The control processor core 801 is a control processor core that mainly performs frequent thread switching, as in an operating system. Note that the control processor core 801 will be described in detail with reference to FIG. 47.

The arithmetic processor cores (#1) 811 to (#8) 818 are simple and compact arithmetic processor cores that are good at multimedia processing. Note that the arithmetic processor cores (#1) 811 to (#8) 818 will be described in detail with reference to FIG. 48.

The bus 802 is a high-speed bus called an EIB (Element Interconnect Bus). Each of the control processor core 801 and the arithmetic processor cores (#1) 811 to (#8) 818 is connected to the bus 802. Each processor core accesses data via the bus 802.

The main memory 781 is a main memory connected to the bus 802. The main memory 781 stores various programs to be loaded to each processor core, and data needed for processing performed by each processor core. Additionally, the main memory 781 stores data processed by each processor core.

The graphics device 782 is a graphics device connected to the bus 802. The I/O device 783 is an external input/output device connected to the bus 802.

Figure 47:
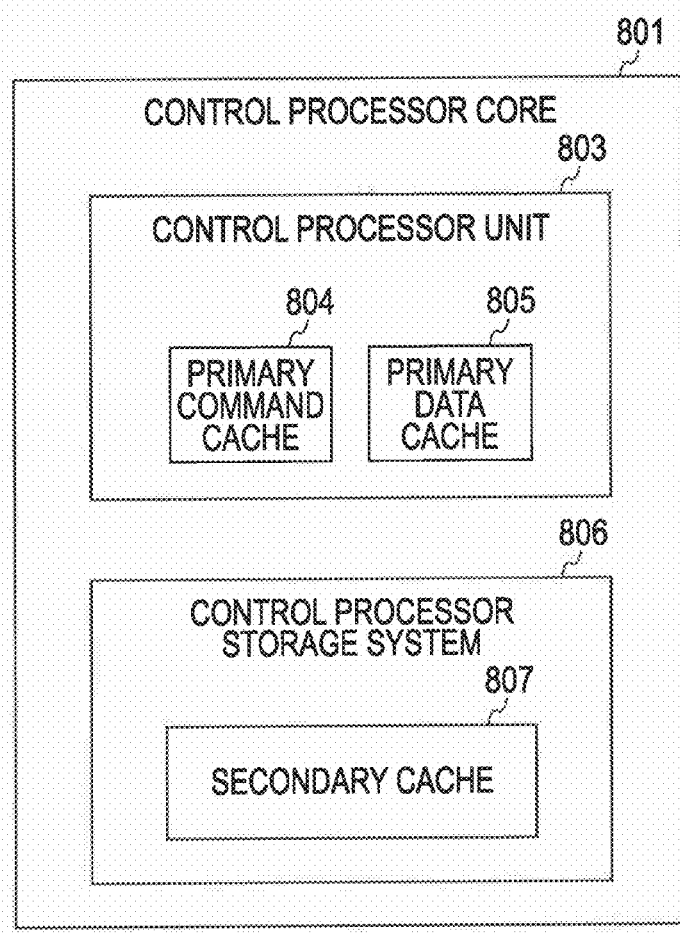
FIG. 47 is a diagram showing a structure example of a control processor core 801 in the embodiment of the present invention.

FIG. 47 is a diagram showing a structure example of the control processor core 801 in the embodiment of the present invention. The control processor core 801 includes a control processor unit 803 and a control processor storage system 806.

The control processor unit 803 is a unit that serves as a core that performs arithmetic processing performed by the control processor core 801 and includes a command set based on the architecture of a microprocessor. As primary caches, a command cache 804 and a data cache 805 are mounted. The command cache 804 is, for example, a 32-KB command cache. The data cache 805 is, for example, a 32-KB data cache.

The control processor storage system 806 is a unit that controls data access from the control processor unit 803 to the main memory 781. In order to increase the speed of memory access from the control processor unit 803, a 512-KB secondary cache 807 is mounted.

Figure 48:
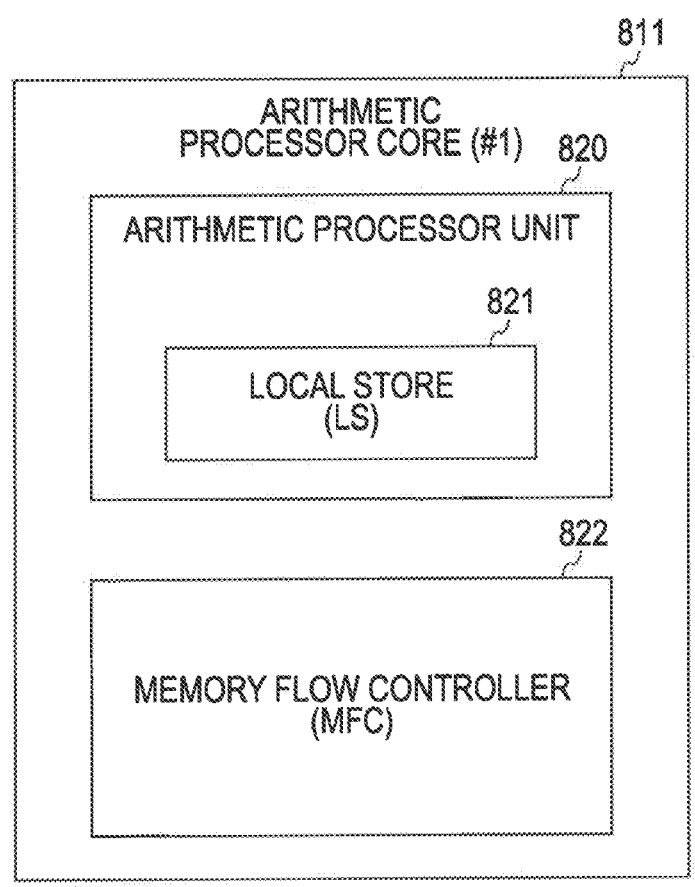
FIG. 48 is a diagram showing a structure example of an arithmetic processor core (#1) 811 in the embodiment of the present invention.

FIG. 48 is a diagram showing a structure example of the arithmetic processor core (#1) 811 in the embodiment of the present invention. The arithmetic processor core (#1) 811 includes an arithmetic processor unit 820 and a memory flow controller 822. Note that, since the arithmetic processor cores (#2) 812 to (#8) 818 have a structure similar to that of the arithmetic processor core (#1) 811, descriptions thereof are omitted here.

The arithmetic processor unit 820 is a unit that serves as a core that performs arithmetic processing performed by the arithmetic processor core (#1) 811 and includes a unique command set different from that of the control processor unit 803 in the control processor core 801. Also, a local store (LS) 821 is mounted in the arithmetic processor unit 820.

The local store 821 is a dedicated memory of the arithmetic processor unit 820, and, at the same time, an only memory that can be directly referred to from the arithmetic processor unit 820. As the local store 821, for example, a memory whose capacity is 256 KB can be used. Note that, in order that the arithmetic processor unit 820 may access the main memory 781 and local stores in the other arithmetic processor cores (arithmetic processor cores (#2) 812 to (#8) 818), it is necessary to use the memory flow controller 822.

The memory flow controller 822 is a unit for exchanging data between the main memory 781 and the other arithmetic processor cores and the like and is a unit called an MFC (Memory Flow Controller). Here, the arithmetic processor unit 820 requests the memory flow controller 822 via an interface called a channel to transfer data, for example.

Various programming models have been proposed as programming models of the multi-core processor 800 illustrated above. Among these programming models, a model that executes a main program on the control processor core 801 and executes sub-programs on the arithmetic processor cores (#1) 811 to (#8) 818 is known as the most basic model. In the embodiment of the present invention, an arithmetic method of the multi-core processor 800 using this model will be described in detail with reference to the drawings.

Figure 49:
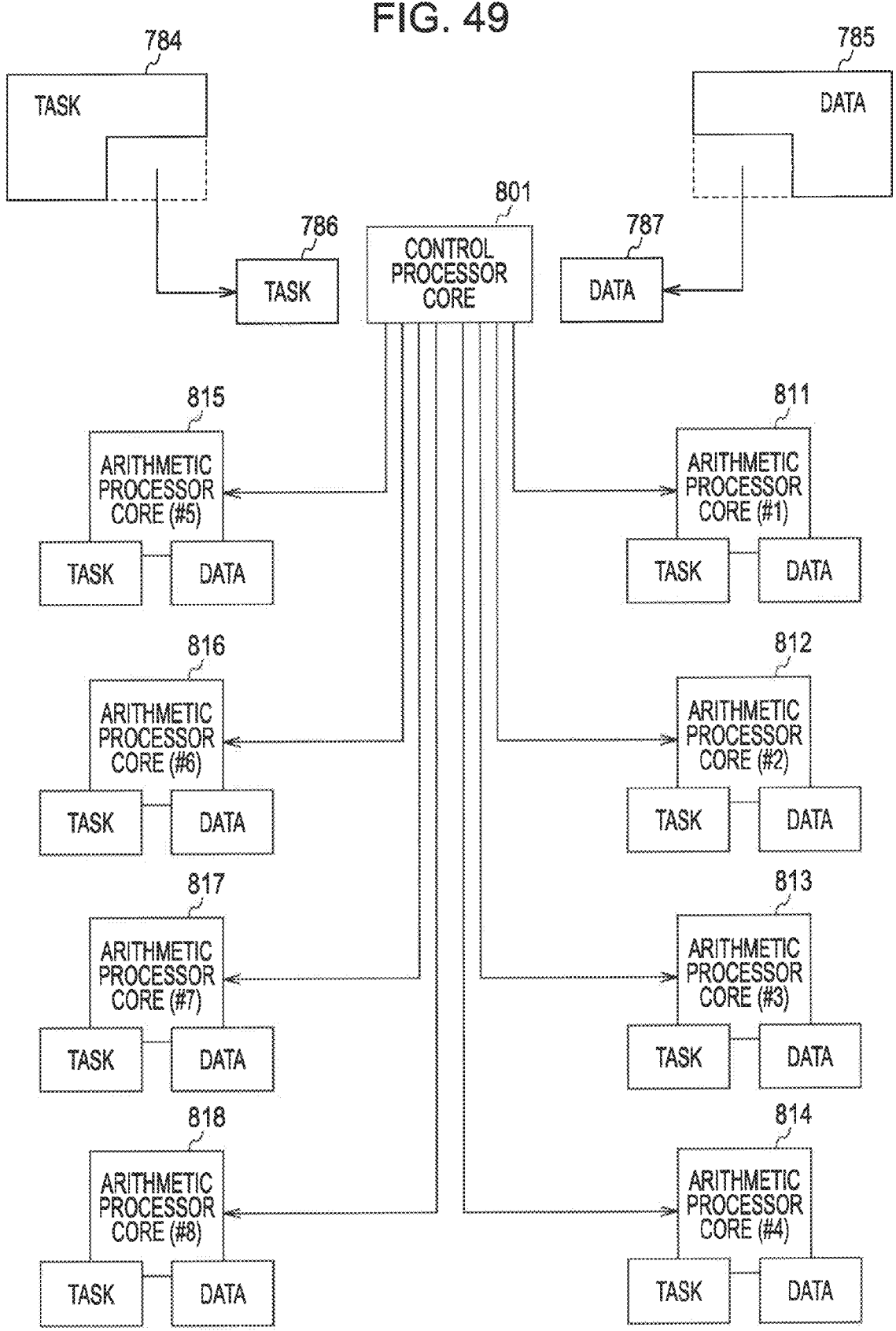
FIG. 49 is a diagram schematically showing an arithmetic method of the multi-core processor 800 in the embodiment of the present invention.

FIG. 49 is a diagram schematically showing an arithmetic method of the multi-core processor 800 in the embodiment of the present invention. In this example, the case where, when the control processor core 801 executes a task 784 using data 785, the control processor core 801 uses data 787 (part of the data 785) needed for processing of a task 786 that is part of the task 784 and causes individual arithmetic processor cores to execute the task 786 will be illustrated by way of example.

As shown in the diagram, when the control processor core 801 executes the task 784 using the data 785, the control processor core 801 uses the data 787 (part of the data 785) needed for processing of the task 786, which is part of the task 784, and causes individual arithmetic processor cores to execute the task 786. In the embodiment of the present invention, arithmetic processing is performed by individual arithmetic processor cores for each of frames constituting a moving image.

As shown in the diagram, when the multi-core processor 800 performs an operation, the arithmetic processor cores (#1) 811 to (#8) 818 can be used in parallel and many operations can be performed in a relatively short time. Additionally, relatively many arithmetic processes can be performed with a smaller number of commands by using a SIMD (Single Instruction/Multiple Data) operation on the arithmetic processor cores (#1) 811 to (#8) 818. Note that the SIMD operation will be described in detail with reference to FIG. 53 to FIG. 56 and the like.

Figure 50:
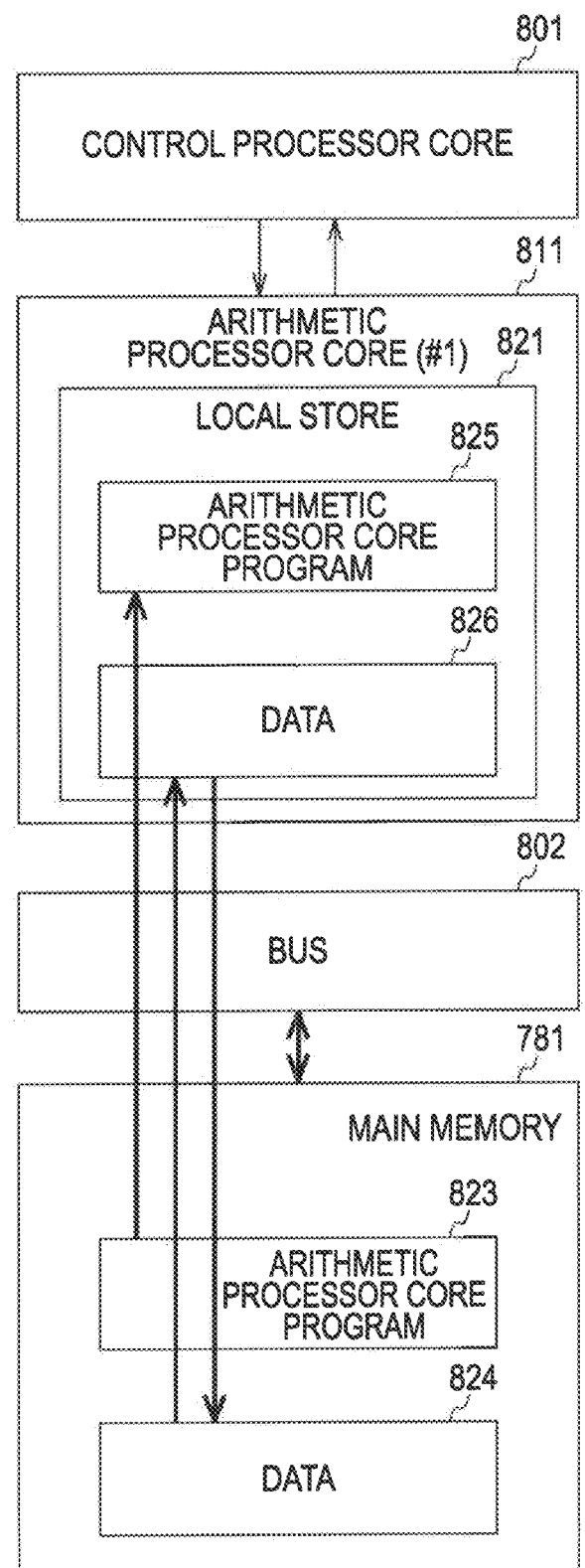
FIG. 50 is a diagram schematically showing programs and the flow of data in the case where operations are performed by the multi-core processor 800 in the embodiment of the present invention.

FIG. 50 is a diagram schematically showing programs and the flow of data in the case where operations are performed by the multi-core processor 800 in the embodiment of the present invention. Here, the description concerns, among the arithmetic processor cores (#1) 811 to (#8) 818, the arithmetic processor core (#1) 811 by way of example. However, the operations can be similarly performed using the arithmetic processor cores (#2) 812 to (#8) 818.

At first, the control processor core 801 sends, to the arithmetic processor core (#1) 811, an instruction to load an arithmetic processor core program 823 stored in the main memory 781 to the local store 821 of the arithmetic processor core (#1) 811. Accordingly, the arithmetic processor core (#1) 811 loads the arithmetic processor core program 823 stored in the main memory 781 to the local store 821.

Then, the control processor core 801 instructs the arithmetic processor core (#1) 811 to execute an arithmetic processor core program 825 stored in the local store 821.

Then, the arithmetic processor core (#1) 811 transfers, from the main memory 781 to the local store 821, data 824 needed for executing and processing the arithmetic processor core program 825 stored in the local store 821.

Then, on the basis of the arithmetic processor core program 825 stored in the local store 821, the arithmetic processor core (#1) 811 processes data 826 transferred from the main memory 781, executes processing in accordance with conditions, and stores the processing result in the local store 821.

Then, the arithmetic processor core (#1) 811 transfers, from the local store 821 to the main memory 781, the processing result of the processing executed on the basis of the arithmetic processor core program 825 stored in the local store 821.

Then, the arithmetic processor core (#1) 811 notifies the control processor core 801 of termination of the arithmetic processing.

Next, a SIMD operation performed using the multi-core processor 800 will be described in detail with reference to the drawings. Here, a SIMD operation is an arithmetic scheme that performs processing of a plurality of items of data using a single command.

Part (a) of FIG. 51 is a diagram schematically showing the outline of an arithmetic scheme of performing processing of a plurality of items of data using individual commands. The arithmetic scheme shown in part (a) of FIG. 51 is a normal arithmetic scheme and is called, for example, a scalar operation. For example, a command to add data "A1" and data "B1" gives a processing result of data "C1". Also, the other three operations can be similarly performed. A command to add items of data "A2", "A3", and "A4" and items of data "B2", "B3", and "B4" in the same row is performed in each process. With this command, values in each row are added and processed, and the processing results are obtained as "C2", "C3", and "C4". As above, in a scalar operation, for processing of a plurality of items of data, it is necessary to execute a command for processing of each item of data.

Part (b) of FIG. 51 is a diagram schematically showing the outline of a SIMD operation, which is an arithmetic scheme that performs processing of a plurality of items of data using a single command. Here, groups of items of data for a SIMD operation (items of data enclosed by dotted lines 827 and 828) may be called items of vector data. Also, a SIMD operation performed using such vector data may be called a vector operation.

For example, a single command to add vector data enclosed by dotted lines 827 ("A1", "A2", "A3", and "A4") and vector data enclosed by dotted lines 828 ("B1", "B2", "B3", and "B4") gives a processing result of "C1", C2", "C3", and "C4" (items of data enclosed by dotted lines 829). As above, since processing of a plurality of items of data can be performed using a single command in a SIMD operation, arithmetic processing can be quickly performed. Also, a command for these SIMD operations is executed by the control processor core 801 in the multi-core processor 800, and, for arithmetic processing of items of data in response to the command, the arithmetic processor cores (#1) 811 to (#8) 818 perform parallel processing.

In contrast, for example, processing to perform addition of data "A1" and "B1", subtraction of data "A2" and "B2", multiplication of data "A3" and "B3", and division of data "A4" and "B4" cannot be performed by a SIMD operation. That is, when different processing is to be done on a plurality of items of data, processing cannot be performed by a SIMD operation.

Next, a specific arithmetic method of a SIMD operation in the case where a feature-point extracting process and an optical-flow calculating process are performed will be described in detail with reference to the drawings.

Figure 52:
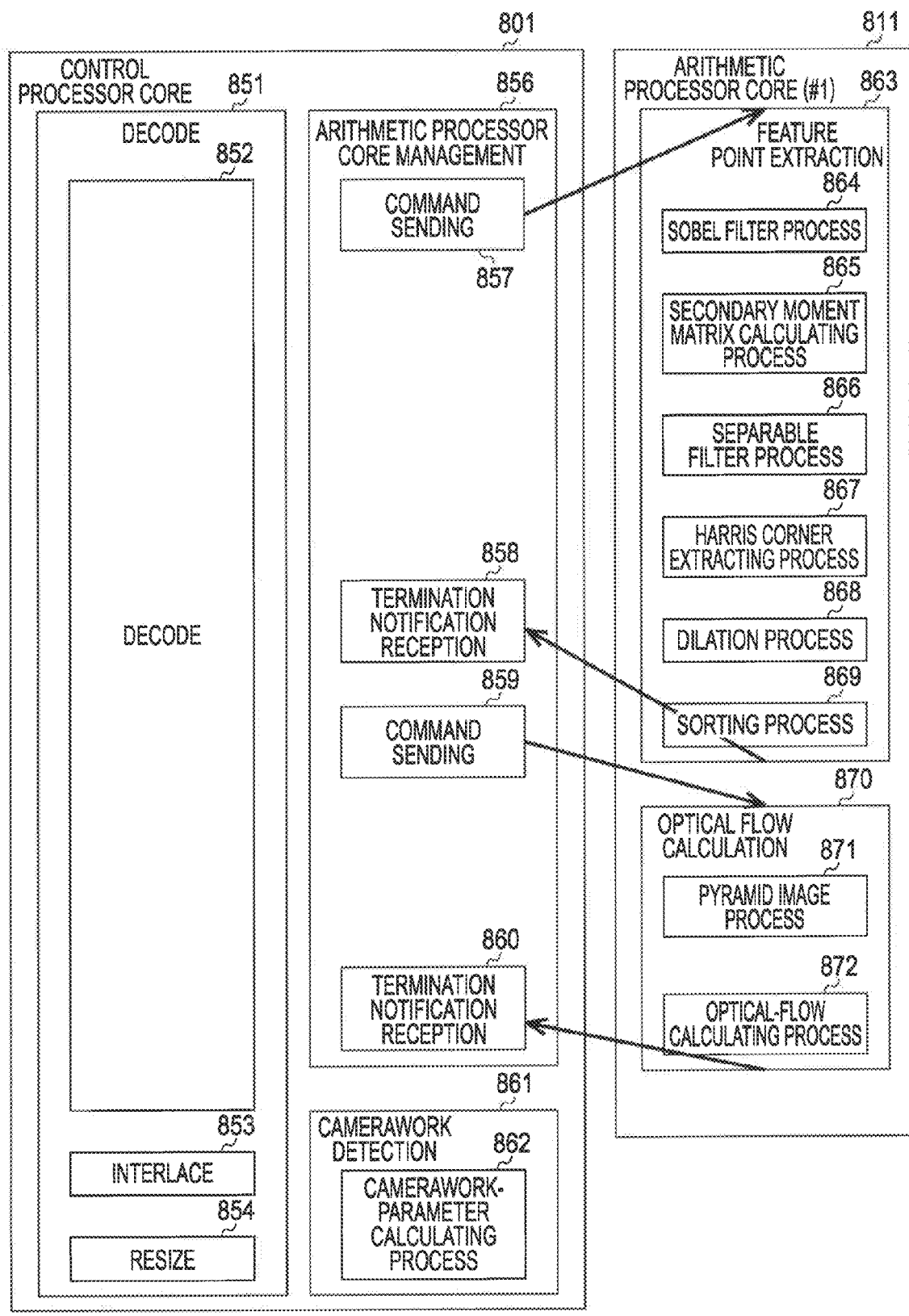
FIG. 52 is a diagram showing a structure example of a program executed by the control processor core 801 or the arithmetic processor core (#1) 811 in the embodiment of the present invention.

FIG. 52 is a diagram showing a structure example of a program executed by the control processor core 801 or the arithmetic processor core (#1) 811 in the embodiment of the present invention. Here, only the arithmetic processor core (#1) 811 is illustrated. However, similar processing is performed by the arithmetic processor cores (#2) 812 to (#8) 818.

The control processor core 801 executes, as decoding 851, decoding 852, interlacing 853, and resizing 854. The decoding 852 is a process to decode a moving image file. The interlacing 853 is a process to deinterlace each decoded frame. The resizing 854 is a process to reduce the size of each deinterlaced frame.

Also, the control processor core 801 executes, as arithmetic processor core management 856, command sending 857 and 859 and termination notification reception 858 and 860. The command sending 857 and 859 is a process to send a command to execute a SIMD operation to the arithmetic processor cores (#1) 811 to (#8) 818. The termination notification reception 858 and 860 is a process to receive, from the arithmetic processor cores (#1) 811 to (#8) 818, a termination notification of a SIMD operation in response to the above-described command. Furthermore, the control processor core 801 executes, as camerawork detection 861, a camerawork-parameter calculating process 862. The camerawork-parameter calculating process 862 is a process to calculate affine transformation parameters on a frame-by-frame basis on the basis of optical flows calculated by a SIMD operation performed by the arithmetic processor cores (#1) 811 to (#8) 818.

The arithmetic processor core (#1) 811 executes, as a feature-point extracting process 863, a Sobel filter process 864, a secondary moment matrix (Second Moment Matrix) calculating process 865, a separable filter process 866, a Harris corner extracting (Calc Harris) process 867, a dilation process 868, and a sorting process 869.

The Sobel filter process 864 is a process to calculate a value dx in the x direction obtained by using a P2 filter (x direction), and a value dy in the y direction obtained by using a filter in the Y direction. Note that calculation of the value dx in the x direction will be described in detail with reference to FIG. 53 to FIG. 56.

The secondary moment matrix calculating process 865 is a process to calculate individual values $dx^2$, $dy^2$, and $dx \cdot dy$ by using dx and dy calculated by the Sobel filter process 864.

The separable filter process 866 is a process to apply a Gaussian filter (blurring process) to $dx^2$, $dy^2$, and $dx \cdot dy$ obtained by the secondary moment matrix calculating process 865.

The Harris corner extracting process 867 is a process to calculate the score for Harris corners using the individual values $dx^2$, $dy^2$, and $dx \cdot dy$ to which the blurring process is applied by the separable filter process 866. The score S for Harris corners is calculated by, for example, the following equation.

$$S = (dx^2 \times dy^2 - dx \cdot dy \times dx \cdot dy)/(dx^2 + dy^2 + \epsilon)$$

The dilation process 868 is a process to perform a blurring process of an image constituted by the scores for Harris corners, which are calculated by the Harris corner extracting process 867.

The sorting process 869 is a process of sorting pixels in descending order of the scores for Harris corners, which are calculated by the Harris corner extracting process 867, picking up a predetermined number, starting from the highest score, and extracting the picked up points as feature points.

The arithmetic processor core (#1) 811 executes, as an optical-flow computing process 870, a pyramid image (Make Pyramid Image) process 871 and an optical-flow calculating (Calc Optical Flow) process 872.

The pyramid image process 871 is a process to sequentially generate size-reduced images obtained by reducing, at multiple levels, the image size of an image at the time of image capturing using a camera. The generated images are called multiple-resolution images.

The optical-flow calculating process 872 is a process to calculate optical flows in an image with the lowest resolution, among multiple-resolution images generated by the pyramid image process 871, and, using the calculated result, calculate again optical flows in an image with the next higher resolution. This series of processes is repeatedly performed until an image with the highest resolution is reached.

As above, for example, for the feature-point extracting process performed by the feature-point extracting unit 121 shown in FIG. 1 and the like and the optical-flow calculating process performed by the optical-flow calculating unit 122, processing results can be obtained by performing a SIMD operation using the multi-core processor 800 performing parallel processing. Note that the feature-point extracting process and the optical-flow calculating process shown in FIG. 52 and the like are only exemplary. A SIMD operation may be performed using the multi-core processor 800 performing other processing implemented by various filtering processes, threshold processes, and the like performed on images constituting a moving image.

FIG. 53 is a diagram schematically showing the data structure and the flow of a process in the case where a filtering process is performed using a Sobel filter 830 on image data stored in the main memory 781 (image data corresponding to one frame included in a moving image captured by a camera) in the embodiment of the present invention. Note that image data stored in the main memory 781 shown in the drawing is simplified and shown as having 32 horizontal pixels. Also, the Sobel filter 830 is a 3×3 edge extraction filter. As shown in the diagram, a filtering process of image data stored in the main memory 781 is performed using the Sobel filter 830, and the result of the filtering process is output. In this example, an example where four filtering results are obtained at the same time using a SIMD operation will be described.

Figure 54:
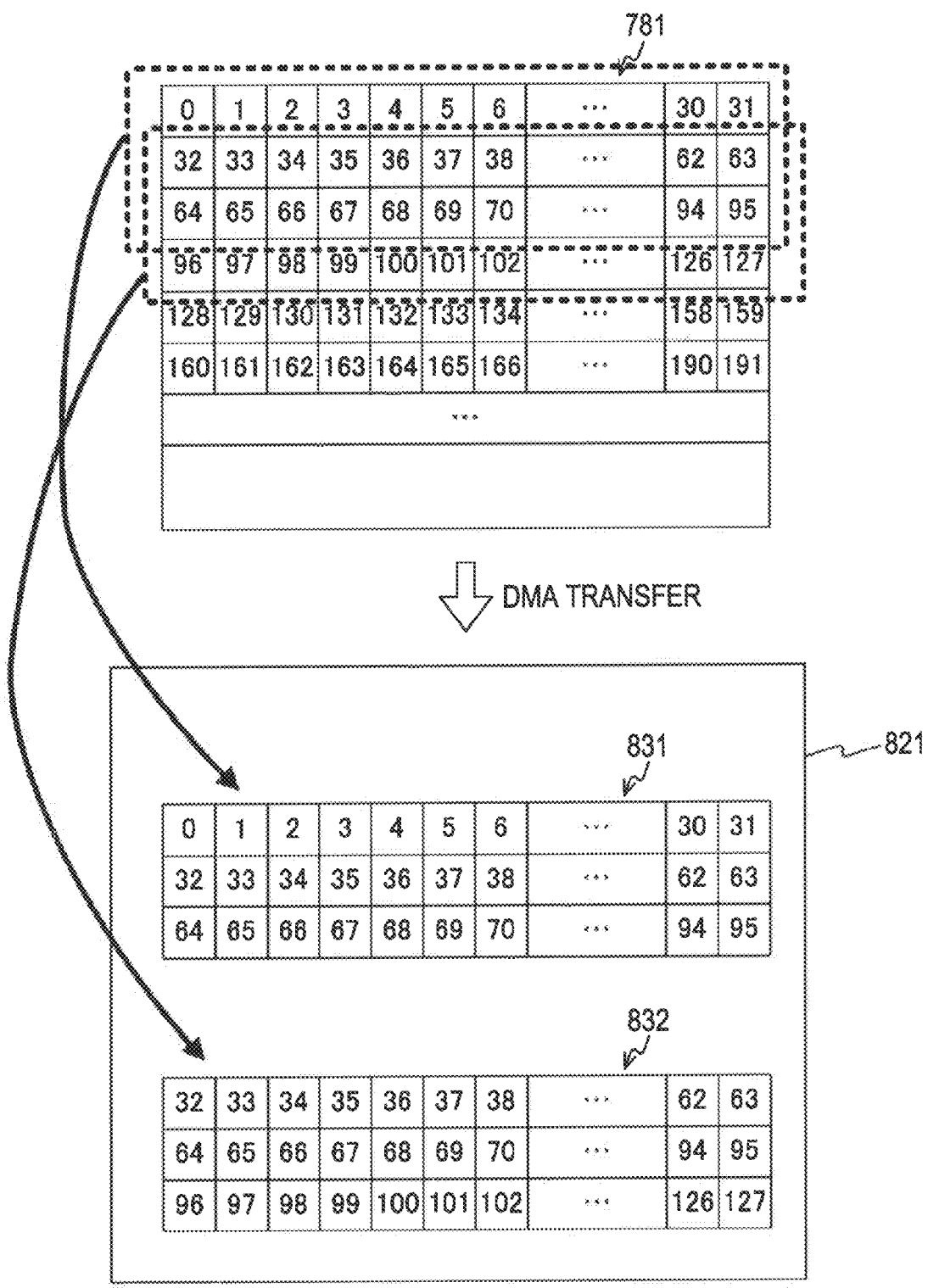
FIG. 54 is a diagram schematically showing the flow of data in the case where a SIMD operation is performed using the Sobel filter 830 on the image data stored in the main memory 781 in the embodiment of the present invention.

FIG. 54 is a diagram schematically showing the flow of data in the case where a SIMD operation is performed using the Sobel filter 830 on the image data stored in the main memory 781 in the embodiment of the present invention. At first, a predetermined number of lines (e.g., three lines), including the first line, of image data stored in the main memory 781 are DMA (Direct Memory Access)-transferred to a first buffer 831 included in the local store 821 of an arithmetic processor core. Additionally, the lines that have been DMA-transferred to the first buffer 831 are individually shifted one line down, and the next predetermined number of lines are DMA-transferred to a second buffer 832. As above, delay due to DMA transfer can be concealed by using double buffers.

Figure 55:
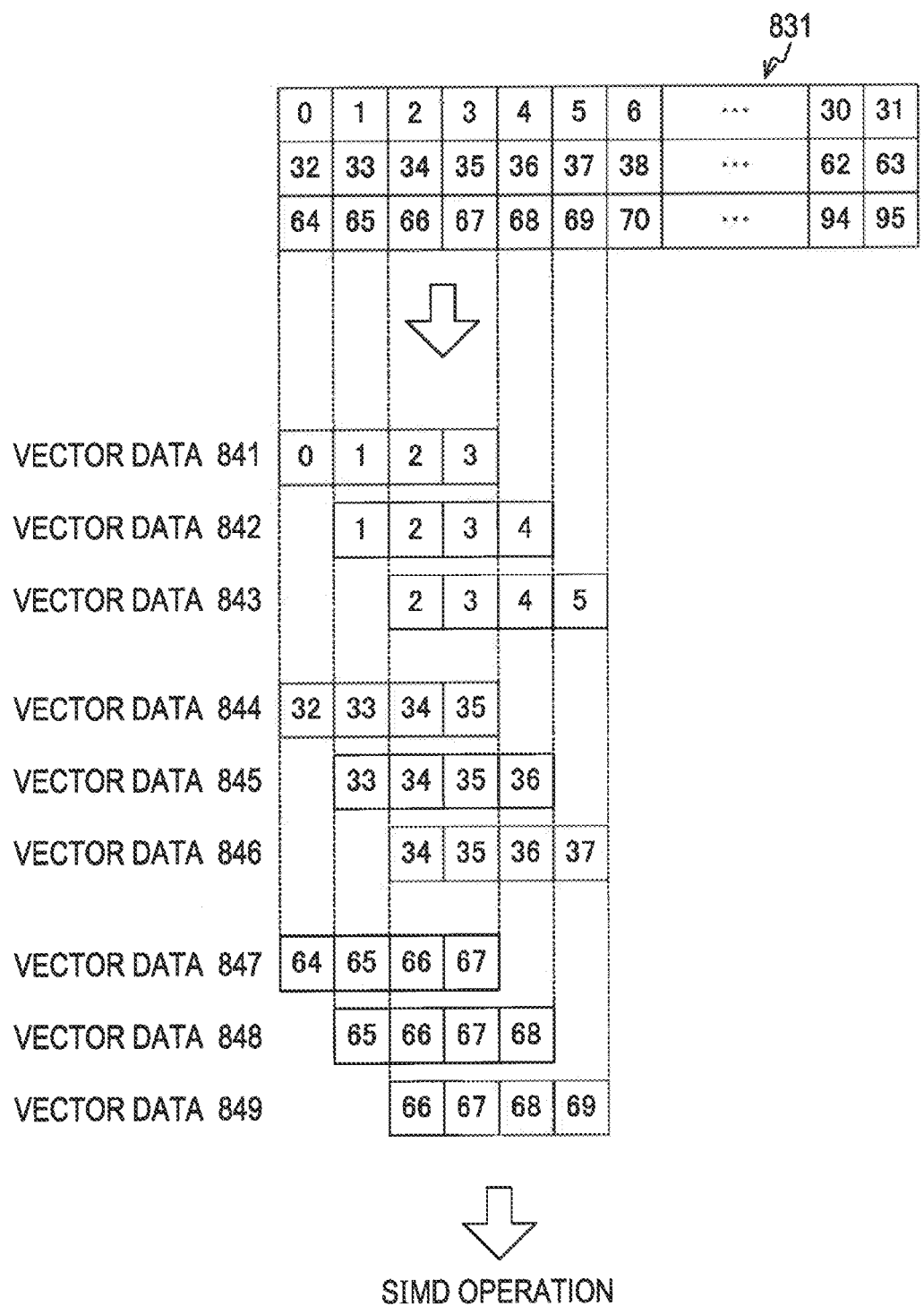
FIG. 55 is a diagram schematically showing a vector generating method of generating nine vectors from image data stored in a first buffer 831 in the case where a filtering process is performed using the Sobel filter 830 in the embodiment of the present invention.

FIG. 55 is a diagram schematically showing a vector generating method of generating nine vectors from image data stored in the first buffer 831 in the case where a filtering process is performed using the Sobel filter 830 in the embodiment of the present invention. As shown in FIG. 55, after DMA transfer is performed, nine vectors are generated from image data stored in the first buffer 831. Specifically, vector data 841 is generated from four items of data, starting from the left-hand corner, of one line of image data stored in the first buffer 831. These four items of data are shifted one to the right, and, from the next four items of data, vector data 842 is generated. Similarly, the four items of data are shifted one to the right, and, from the next four items of data, vector data 843 is generated. Also, items of vector data 844 to 849 are similarly generated individually from four items of data of the second line and the third line.

FIG. 56 is a diagram schematically showing a vector operation method of performing vector operations using SIMD commands on the items of vector data 841 to 849 in the case where a filtering process is performed using the Sobel filter 830 in the embodiment of the present invention. Specifically, SIMD operations are sequentially performed on the items of vector data 841 to 843, and a vector A is obtained. In the SIMD operations, at first, a SIMD operation of "'−1'ב'vector data 841'" is performed. Then, a SIMD operation of "'0'×'vector data 842'" is performed, and a SIMD operation of "'1'ב'vector data 843'" is performed. Here, since the operation result of "'0'ב'vector data 842'" is determined to be "0", this operation may be omitted. Also, since the operation result of "'1'ב'vector data 843'" is determined to be the same value as the "vector data 843", this operation may be omitted.

Then, an addition process of the operation result of "'−1'ב'vector data 841'" and the operation result of "'0'ב'vector data 842'" is performed using a SIMD operation. Then, an addition process of the result of this addition process and the operation result of "'1'ב'vector data 843'" is performed using a SIMD operation. Here, for example, an operation on the data structure "vector data 1"ב"vector data 2"+"vector data 3" can be performed using SIMD operations. Therefore, for an operation for the vector A, for example, SIMD operations of "'0'ב'vector data 842'" and "'1'ב'vector data 843'" may be omitted, and "'−1'ב'vector data 841'+'vector data 843'" may be performed using a single SIMD operation.

Also, similarly, SIMD operations are performed on the items of vector data 844 to 846, and a vector B is obtained. SIMD operations are performed on the items of vector data 847 to 849, and a vector C is obtained.

Then, a SIMD operation of the vectors A to C obtained by the SIMD operations is performed, and a vector D is obtained. As above, the results, the number of which is the number of components of a vector (four items of data in this example), can be obtained at the same time by performing a SIMD operation.

After the vector D is calculated, the position of data to be taken out is shifted one to the right in the image data stored in the first buffer 831 shown in FIG. 55, and similar processes are repeatedly executed, thereby sequentially calculating individual vectors D. When the processing of an item at the right end of the image data stored in the first buffer 831 shown in FIG. 55 is completed, the processing results are DMA-transferred to the main memory 781.

Then, of image data stored in the main memory 781, individual lines that are DMA-transferred to the second buffer 832 are shifted one down, and the next predetermined number of lines are DMA-transferred to the first buffer 831. Additionally, the above-described processes are repeatedly performed on image data stored in the second buffer 832. Similar processes are repeatedly performed until, among the individual lines of image data stored in the main memory 781, a line at the bottom end is reached.

Similarly, the major part of processing of feature point extraction and optical flow calculation is performed using SIMD operations, whereby an increase in the speed can be realized.

Figure 57:
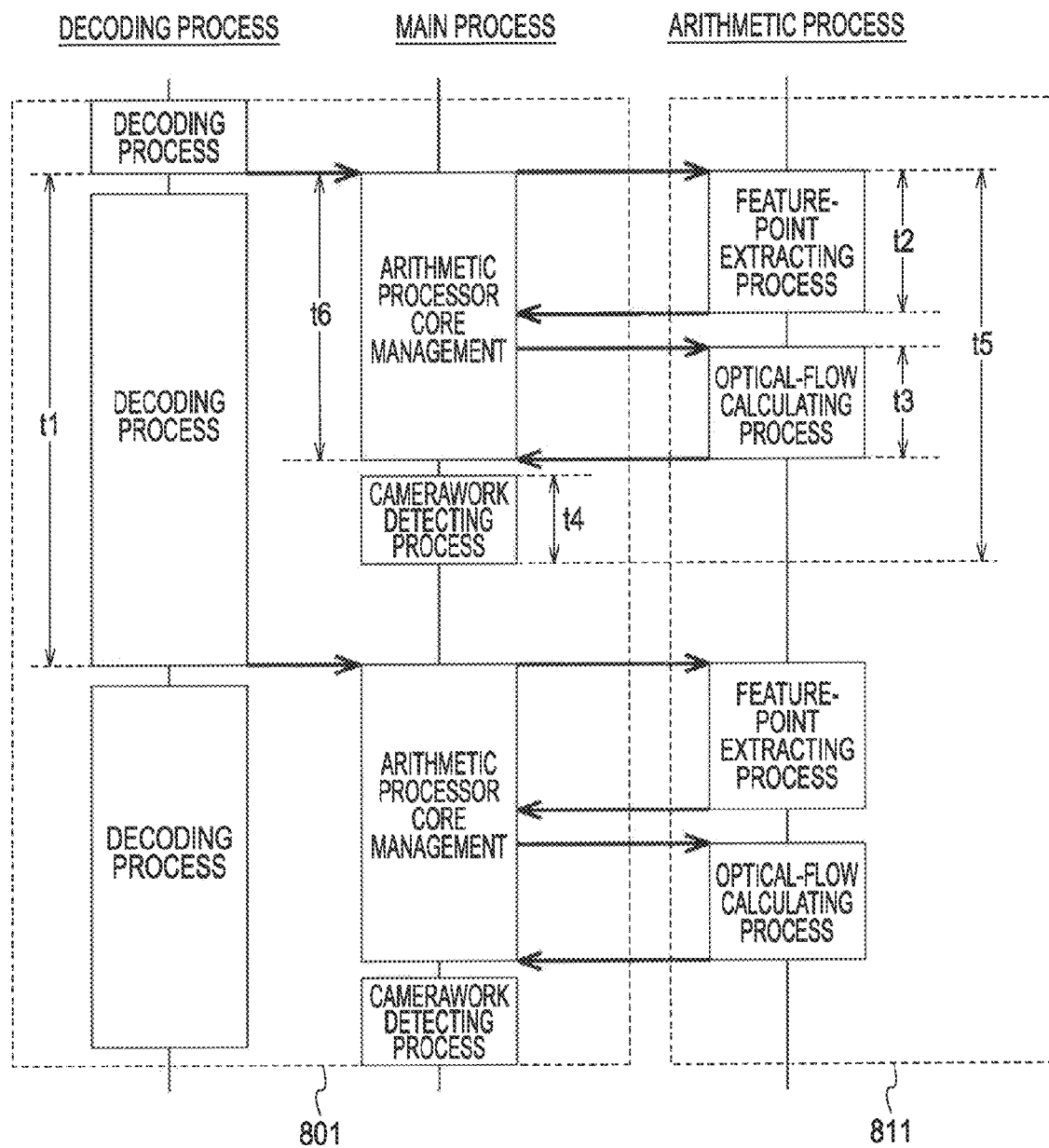
FIG. 57 is a diagram schematically showing the flow of a camerawork-parameter calculating process in time series in the embodiment of the present invention.

FIG. 57 is a diagram schematically showing the flow of a camerawork-parameter calculating process in time series in the embodiment of the present invention. As has been described above, for example, decoding and analysis processing of a moving image can be performed in parallel by performing SIMD operations using the multi-core processor 800. Therefore, the analysis time of one frame included in a moving image can be reduced to be shorter than the decoding time.

For example, in the diagram, t1 denotes a time required for the control processor core 801 to perform a decoding process of one frame included in a moving image; t2 denotes a time required for the arithmetic processor cores (#1) 811 to (#8) 818 to perform a feature-point extracting process of one frame included in a moving image; t3 denotes a time required for the arithmetic processor cores (#1) 811 to (#8) 818 to perform an optical-flow calculating process of one frame included in a moving image; and t4 denotes a time required for the control processor core 801 to perform a camerawork detecting process of one frame included in a moving image. Note that t5 denotes a time required for the control processor core 801 and the arithmetic processor cores (#1) 811 to (#8) 818 to perform a camerawork detecting process of one frame included in a moving image. Also, t6 denotes a time required for the control processor core 801 to perform a process of managing the arithmetic processor cores (#1) 811 to (#8) 818. For example, t1 can be set to "25.0 ms", t2 can be set to "7.9 ms", t3 can be set to "6.7 ms" t4 can be set to "1.2 ms", and t5 can be set to "15.8 ms".

Next, the case where moving image content is played using a meta-data file in an embodiment of the present invention will be described in detail with reference to the drawings.

Figure 58:
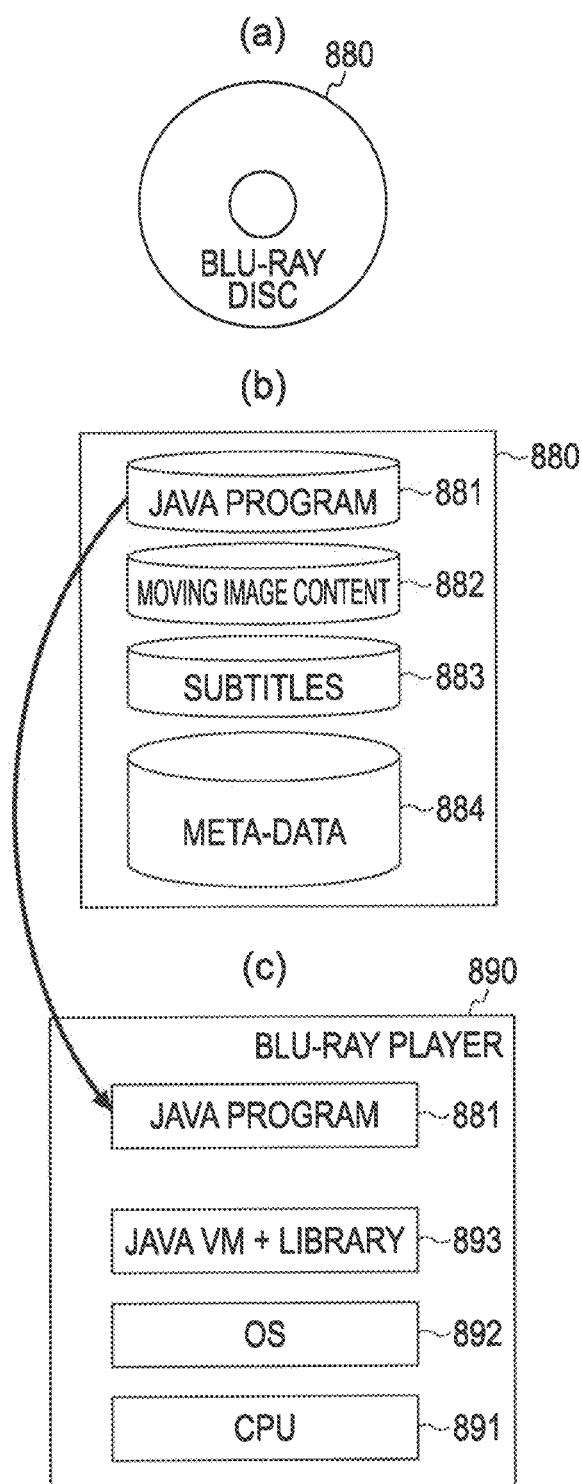
FIG. 58 includes a diagram schematically showing a Blu-ray Disc 880 which is an example of a recording medium, a diagram schematically showing items of data 881 to 884 recorded on the Blu-ray Disc 880, and a diagram schematically showing the internal structure of a Blu-ray player 890 that can play the Blu-ray Disc 880.

Part (a) of FIG. 58 is a top view schematically showing a Blu-ray Disc (registered trademark) 880 which is an example of a recording medium, and part (b) of FIG. 58 is a diagram schematically showing items of data 881 to 884 recorded on the Blu-ray Disc 880. On the Blu-ray Disc 880, for example, together with moving image content 882 which is a moving image captured by a camera or the like, subtitles 883 of the moving image content 882, and meta-data obtained by analyzing the moving image content 882 (e.g., meta-data file shown in part (b) of FIG. 33) 884, a Java (registered trademark) program 881 relating to playback of a moving image in the embodiment of the present invention is recorded.

Part (c) of FIG. 58 is a diagram schematically showing the internal structure of a Blu-ray player (Blu-ray Disc Player) 890 that can play the Blu-ray Disc 880. Here, since the Blu-ray player 890 capable of playing a Blu-ray disc includes, as a standard, besides a CPU 891 and an OS 892, a Java (registered trademark) VM (Java (registered trademark) virtual machine) and library 893, the Blu-ray player 890 can execute a Java (registered trademark) program. Therefore, by mounting the Blu-ray Disc 880 into the Blu-ray player 890, the Blu-ray player 890 can load and execute the Java (registered trademark) program 881. Accordingly, when the Blu-ray player 890 plays the moving image content 882, using the meta-data 884, playback of a moving image in the embodiment of the present invention can be performed. That is, playback of a moving image in the embodiment of the present invention can be realized on all Blu-ray players without using dedicated PC software or the like.

Also, the information processing apparatus in the embodiments of the present invention may be connected to a network such as the Internet, and a moving image may be played by combining it with an image or a moving image received via the network. For example, the image processing apparatus receives a landscape image of a predetermined park via a network, regards the received landscape image of the park as a background image, and plays a captured moving image of a child while combining it with the background image. Accordingly, a pseudo-playback image appearing as if the child were moving through the park can be provided.

As has been described above, in the embodiments of the present invention, since images corresponding to frames prior to the currently displayed image are combined with the current image and a composite image is displayed, together with a target serving as the center of image shooting, a background or the like that has been shot at least in a partial time zone can be easily browsed. Therefore, for example, when a viewer wishes to watch again a background or the like that has been shot at least in a partial time zone, the viewer can watch the currently displayed image, and, at the same time, the background thereof or the like, without performing a rewinding operation, a search operation, or the like. Also, when a viewer broses a moving image shot by a camera, the viewer can easily understand the details of the moving image.

Also, in the display examples shown in FIGS. 7, 11, 15, and the like, since an image corresponding to preceding frames is fixed, a viewer can easily recognize spatial extension. Furthermore, in the display examples shown in FIGS. 8, 12, 16, and the like, since an image corresponding to the current frame is displayed at a fixed position, a viewer can easily recognize the current display portion.

That is, using past frames, a moving image can be spatially expanded and appreciated. Accordingly, for example, an appreciation method in which, for example, a panoramic image is completed while playing a moving image can be provided, whereby a viewer can appreciate the moving image with much fun.

Also, by playing a moving image using the moving-image playing method shown in FIG. 35 to FIG. 43 and the like, switching to another display mode can be easily performed even during playback of a moving image. Therefore, for example, appreciation in which a panoramic image is completed while playing a moving image can be enjoyed, and additionally, switching can be easily performed among a plurality of display modes, whereby a viewer can appreciate the moving image with much more fun. Also, since an image in a state prior to being saved in the image memory 684 can be sequentially displayed as a current image, a relatively clean image can be displayed.

Also, in the embodiments of the present invention, the example in which playback and displaying are performed using pre-detected affine transformation parameters has been described. However, affine transformation parameters may be calculated at the time of playback, and, using the calculated affine transformation parameters, playback and displaying may be performed. For example, affine transformation parameters of one frame can be calculated within a decoding process time of one frame by calculating affine transformation parameters using SIMD operations by using a multi-core processor. Accordingly, even in the case where a moving image for which no affine transformation parameters have been calculated is to be played, the moving image can be played while calculating affine transformation parameters. Therefore, appreciation of a moving image while spatially expanding the moving image can be promptly performed.

Also, for example, when a moving image shot with SD (Standard Definition) image quality is to be appreciated or a moving image shot using a moving-image saving function or the like of a digital still camera or a cellular phone is to be appreciated on a high-definition TV (Television), if the moving image is displayed in a state with the original image size, it may fail to fully employ the number of pixels of the high-definition TV. Also, when enlargement and displaying are performed, in many cases, image roughness becomes striking. Therefore, by performing displaying described in the embodiments of the present invention, appreciation in which the number of pixels of a high-definition TV is fully employed, without making image roughness striking, can be performed.

Note that a composite image generated by the combining in steps S926, S942, S954, and the like may be recorded on a recording medium or the like so that the composite image may be used for other types of playback and display. Also, in the embodiments of the present invention, the example in which a composite image corresponding to frames preceding the current frame is displayed has been described. However, the composite image may be sequentially erased as time elapses. In this case, rendering may be applied in such a manner that the composite image is erased while leaving a residual image. Also, an image corresponding to the current frame may be displayed in color, and additionally, rendering may be applied to a composite image corresponding to frames preceding the current frame in such a manner that, as time elapses, displaying in color changes to displaying in sepia.

Also, in the embodiments of the present invention, the case in which the camera movement is obtained in the case where the size of a moving object is relatively small with respect to the area of an image included in a moving image, and, using the camera movement, the moving image is played has been described. However, the embodiments of the present invention are also applicable to the case where the size of a moving image is relatively large with respect to the area of an image included in a moving image. For example, when an image of a train departing from a station is captured, with the train serving as a central subject of the image, so that the proportion of the train with respect to the image area becomes large, if the above-described affine transformation parameters are calculated, the movement of the train is calculated. In this case, using the train movement, a moving image can be played by the above-described displaying method. In the case where a moving image is played in such a manner, the background is fixed, and additionally, the train is displayed as if the train were progressing as the current image progresses. As above, movement information relating to relative amounts of movement of a camera and a photographic subject at the time of capturing an image can be calculated and used as transformation information for transforming images constituting a moving image.

That is, according to the embodiments of the present invention, in the case where a first image and a second image captured by an image capturing apparatus such as a digital video camera are to be displayed, the second image can be placed on the first image and displayed using the relative positional relationship between the first image and the second image, which indicates movement of the image capturing apparatus or movement of a photographic subject at the time of shooting the images. Accordingly, playback of a moving image on a display unit in a manner as if time goes by only in a small window gazed by a user can be realized.

Also, in the embodiments of the present invention, an image processing apparatus that displays a composite image generated by an image combining unit on a display unit has been described by way of example. However, the embodiments of the present invention are applicable to an image processing apparatus that has image output means for outputting image information for displaying a composite image generated by an image combining unit on another image display apparatus. Furthermore, the embodiments of the present invention are applicable to a moving-image playing apparatus capable of playing a moving image, an image capturing apparatus such as a digital video camera capable of playing a shot moving image, and the like.

Also, in the embodiments of the present invention, a moving image captured by a camera has been described. However, for example, the embodiments of the present invention are applicable to an edited moving image in the case where a moving image captured by a camera is edited, a moving image partially added with animation or the like, or the like. Also, although the example in which part or all history images are displayed has been described in the embodiments of the present invention, only the transformed current image may be displayed. That is, only the current image that is last held in the image memory may be sequentially displayed. Also, in the case of calculating affine transformation parameters, for example, by narrowing down a region where movement vectors of feature points in a captured image are calculated, for example, a camera is placed facing a moving train, and one moving image of the train and a gigantic image thereof can be generated.

Note that the embodiments of the present invention are illustrated by way of example to realize the present invention. Although there is a correspondence between the embodiments and the features of the claims, which will be described below, the present invention is not limited thereto, and various modifications can be made without departing from the gist of the present invention.

That is, in claim 1 or 25, moving-image input means corresponds to, for example, the moving-image input unit 110. Also, transformation-information calculating means corresponds to, for example, the camerawork detecting unit 120. Also, image holding means corresponds to, for example, the image memory 170 or the image memory 684. Also, image transforming means corresponds to, for example, the image transforming unit 160 or the image transforming unit 682. Also, operation accepting means corresponds to, for example, the operation accepting unit 195. Also, image combining means corresponds to, for example, the image combining unit 180 or the image combining unit 683. Also, output means corresponds to, for example, the display unit 191 or the display unit 689. Also, control means corresponds to, for example, the display control unit 190 or the display control unit 687.

Also, in claim 25, display means corresponds to, for example, the display unit 191 or the display unit 689.

Also, in claim 5 or 9, output-image extracting means corresponds to, for example, the display-region extracting unit 685.

Also, in claim 18, feature-point extracting means corresponds to, for example, the feature-point extracting unit 121. Also, movement-amount calculating means corresponds to, for example, the optical-flow calculating unit 122. Also, transformation-parameter calculating means corresponds to, for example, the camerawork-parameter calculating unit 123.

Also, in claim 21, compression means corresponds to, for example, the image combining unit 683.

Also, in claim 22, moving-image obtaining means corresponds to, for example, the moving-image obtaining unit 140. Also, transformation-information extracting means corresponds to, for example, the camerawork-parameter extracting unit 150. Also, image holding means corresponds to, for example, the image memory 170 or the image memory 684. Also, image transforming means corresponds to, for example, the image transforming unit 160 or the image transforming unit 682. Also, operation accepting means corresponds to, for example, the operation accepting unit 195. Also, image combining means corresponds to, for example, the image combining unit 180 or the image combining unit 683. Also, output means corresponds to, for example, the display unit 191 or the display unit 689. Also, control means corresponds to, for example, the display control unit 190 or the display control unit 687.

Also, in claim 23, transformation-information storage means corresponds to, for example, the meta-data storage unit 670. Also, moving-image obtaining means corresponds to, for example, the file obtaining unit 652 or the file obtaining unit 681. Also, transformation-information obtaining means corresponds to, for example, the file obtaining unit 652 or the file obtaining unit 681. Also, image holding means corresponds to, for example, the image memory 170 or the image memory 684. Also, image transforming means corresponds to, for example, the image transforming unit 160 or the image transforming unit 682. Also, operation accepting means corresponds to, for example, the operation accepting unit 195. Also, image combining means corresponds to, for example, the image combining unit 180 or the image combining unit 683. Also, output means corresponds to, for example, the display unit 191 or the display unit 689. Also, control means corresponds to, for example, the display control unit 190 or the display control unit 687.

Also, in claim 24, moving-image input means corresponds to, for example, the moving-image input unit 110. Also, transformation-information calculating means corresponds to, for example, the camerawork detecting unit 120. Also, image transforming means corresponds to, for example, the image transforming unit 160 or the image transforming unit 682. Also, control means corresponds to, for example, the display control unit 190 or the display control unit 687.

Also, in claim 26, moving-image input means corresponds to, for example, the moving-image input unit 110. Also, captured-moving-image storage means corresponds to, for example, the moving-image storage unit 200. Also, transformation-information calculating means corresponds to, for example, the camerawork detecting unit 120. Also, recording control means corresponds to, for example, the recording control unit 130.

Also, in claim 27, moving-image input means corresponds to, for example, the moving-image input unit 110. Also, metadata storage means corresponds to, for example, the metadata storage unit 670. Also, transformation-information calculating means corresponds to, for example, the camerawork detecting unit 120. Also, recording control means corresponds to, for example, the recording control unit 651.

Also, in claim 29 or 30, a moving-image input step corresponds to, for example, step S900. Also, a transformation-information calculating step corresponds to, for example, steps S903 to S913. Also, an image holding step corresponds to, for example, steps S926, S942, and S954. An image transforming step corresponds to, for example, steps S925, S941, S952, and S953. An operation accepting step is performed by, for example, the operation accepting unit 195. Also, an image combining step corresponds to, for example, steps S926, S942, and S954. Also, a control step corresponds to, for example, step S927 or S970.

Note that the processing procedures described in the embodiments of the present invention may be considered as a method having the series of procedures or may be considered as a program for allowing a computer to execute the series of procedures or as a recording medium having the program recorded thereon.

The invention claimed is:

1. An image processing apparatus comprising:
  circuitry configured to:
  receive a captured moving image captured by an image capturing apparatus;
  calculate, on a basis of a first captured image included in the captured moving image and a second captured image positioned subsequent to the first captured image along a time axis of the captured moving image, transformation information relating to the first captured image and the second captured image;
  hold a history image, the history image being a combination of individual captured images including the first captured image, the individual captured images being positioned prior to the second captured image along the time axis of the captured moving image;
  transform at least one of the history image and the second captured image on a basis of the calculated transformation information;
  accept a selecting operation of selecting an image to be transformed;
  combine the history image and the second captured image by writing the second captured image over the history image, at least one of which has been transformed in response to the accepted selecting operation, to generate a composite image;
  hold the composite image as a new history image;
  combine the new history image and a third captured image by writing the third captured image over the history image, at least one of which has been transformed, to generate a new composite image, the third captured image being positioned subsequent to the second captured image along the time axis of the captured moving image;
  output the composite image and the new composite image; and
  sequentially display the composite image and the new composite image.

2. The image processing apparatus according to claim 1, wherein the circuitry is configured to write the second captured image, which has been transformed, over the history image and to combine the transformed second captured image with the history image by transforming an image quality of the transformed second captured image in accordance with the history image.

3. The image processing apparatus according to claim 2, wherein the circuitry is configured to
  write the third captured image, which has been transformed, which existed before the transformation of the image quality, over the new history image to generate the new composite image, and
  sequentially output the new composite image.

4. The image processing apparatus according to claim 3, wherein the circuitry is configured to:
  extract an output image to be output from the new history image,
  write the transformed third captured image, which existed before the transformation of the image quality, over the output image and combine the third captured image with the output image to generate a new output image, and
  sequentially output the new output image.

5. The image processing apparatus according to claim 4, wherein the circuitry is configured to:
  calculate, on the basis of a position and size of the transformed second captured image in a holding region and a position and size of the output image in the holding region, a position at which the transformed third captured, which existed before the transformation of the image quality, is written over the output image and a size of the third captured image, and
  write the transformed third captured image, which existed before the transformation of the image quality, over the output image and combine the third captured image with the output image, on the basis of the calculated position and size.

6. The image processing apparatus according to claim 4, wherein, when at least a portion of the transformed second captured image included in the new history image protrudes from an output region that is a region for extracting the output image, the circuitry is configured to move the output region in a direction of the protruding image portion and extracts the output image from the new history image.

7. The image processing apparatus according to claim 2, wherein the image quality is at least one of a resolution and a compression ratio.

8. The image processing apparatus according to claim 1, wherein the circuitry is configured to:
   extract, as an output image to be output, an image included in a region calculated on the basis of the calculated transformation information, from the new history image,
   write the second captured image that existed before the transformation over the output image and combine the second captured image with the output image to generate a new output image, and
   sequentially output the new output image.

9. The image processing apparatus according to claim 8, wherein the circuitry is configured to:
   transform, on the basis of the calculated transformation information, the output image in a direction opposite to a direction in which the second captured image is transformed, and
   write the second captured image that existed before the transformation over the transformed output image and combine the second captured image with the transformed output image to generate the new output image.

10. The image processing apparatus according to claim 1, wherein the circuitry is configured to transform, on the basis of the calculated transformation information, the history image in a direction opposite to a direction in which the second captured image is transformed.

11. The image processing apparatus according to claim 1, wherein
   the transformation information includes elements relating to enlargement/reduction, movement, and rotation, and
   the circuitry is configured to transform the second captured image on the basis of the elements relating to movement and rotation, which are included in the calculated transformation information, and to transform the history image on the basis of the element relating to enlargement/reduction, which is included in the calculated transformation information.

12. The image processing apparatus according to claim 11, wherein the circuitry is configured to transform the history image in a direction opposite to a direction in which the second captured image is transformed.

13. The image processing apparatus according to claim 1, wherein the circuitry is configured to:
   sequentially calculate the transformation information for each of frames constituting the captured moving image,
   transform, for each of the frames, at least one of the history image and the second captured image,
   sequentially combine, for each of the frames, the history image and the second captured image, at least one of which has been transformed, and
   sequentially output the composite image for each of the frames.

14. The image processing apparatus according to claim 1, wherein the first captured image and the second captured image are images corresponding to two successive frames included in the captured moving image.

15. The image processing apparatus according to claim 14, wherein
   the transformation information is movement information of the image capturing apparatus at a time the first captured image or the second captured image was captured, and
   the circuitry is configured to calculate the transformation information by comparing the first captured image and the second captured image.

16. The image processing apparatus according to claim 14, wherein
   the transformation information is movement information relating to relative amounts of movement of the image capturing apparatus and a photographic subject at the time the first captured image or the second captured image was captured, and
   the circuitry is configured to calculate the transformation information by comparing the first captured image and the second captured image.

17. The image processing apparatus according to claim 1, wherein the circuitry is configured to:
   extract feature points in the first captured image and the second captured image on a basis of individual pixels constituting the first captured image and the second captured image,
   calculate an amount of movement relating to the first captured image and the second captured image on a basis of the extracted feature points, and
   calculate the transformation information by calculating a predetermined transformation parameter on a basis of the calculated amount of movement.

18. The image processing apparatus according to claim 17, wherein the circuitry is configured to
   extract feature amounts in the first captured image and the second captured image by performing parallel processing using SIMD operations on the individual pixels constituting the first captured image and the second captured image.

19. The image processing apparatus according to claim 17, wherein the
   circuitry is configured to calculate the amount of movement relating to the first captured image and the second captured image by performing parallel processing using SIMD operations on the extracted feature points.

20. The image processing apparatus according to claim 1, wherein the circuitry is configured to compress the captured moving image, and
   wherein the history image at a time of outputting the composite image is a compressed history image, and the second captured image is a non-compressed image or a captured image with a higher resolution than the compressed history image.

21. An image processing apparatus comprising:
   circuitry configured to:
   obtain a captured moving image with which transformation information for transforming at least one of a first captured image and a second captured image included in the captured moving image is associated and recorded, the captured moving image being captured by an image capturing apparatus;
   extract the transformation information from the obtained captured moving image;
   hold a history image, the history image being a combination of individual captured images including the first captured image, the individual captured images being positioned prior to the second captured image along a time axis of the captured moving image;
   transform at least one of the history image and the second captured image on a basis of the extracted transformation information;
   accept a selecting operation of selecting an image to be transformed;
   combine the history image and the second captured image by writing the second captured image over the history image, at least one of which has been transformed in response to the accepted selecting operation, to generate a composite image;
   hold the composite image as a new history image;

combine the new history image and a third captured image by writing the third captured image over the history image to generate a new composite image, the third captured image being positioned subsequent to the second captured image along the time axis of the captured moving image;
output the composite image and new composite image; and
sequentially display the composite image and the new composite image.

22. An image processing apparatus comprising:
circuitry configured to:
store transformation information for transforming at least one of a first captured image and a second captured image included in a captured moving image captured by an image capturing apparatus, in association with each frame constituting the captured moving image;
obtain the captured moving image;
obtain transformation information stored in association with the obtained captured moving image;
hold a history image, the history image being a combination of individual captured images including the first captured image, the individual captured images being positioned prior to the second captured image along a time axis of the captured moving image;
transform at least one of the history image and the second captured image on a basis of the obtained transformation information;
accept a selecting operation of selecting an image to be transformed;
combine the history image and the second captured image by writing the second captured image over the history image, at least one of which has been transformed in response to the accepted selecting operation, to generate a composite image;
hold the composite image as a new history image;
combine the new history image and a third captured image by writing the third captured image over the history image, at least one of which has been transformed, to generate a new composite image, the third captured image being positioned subsequent to the second captured image along the time axis of the captured moving image;
output the composite image and the new composite image; and
sequentially output the composite image and the new composite image.

23. An image processing apparatus comprising:
circuitry configured to:
receive a captured moving image captured by an image capturing apparatus including a first captured image, second captured image and a third capture image;
calculate transformation information for transforming, with reference to at least one captured image among captured images constituting the captured moving image, another captured image for each of the captured images;
transform, on a basis of the transformation information calculated with reference to, as a reference image, the at least one captured image among the captured images constituting the captured moving image, a captured image corresponding to the transformation information;
hold a history image, the history image being a combination of individual captured images including the first captured image, the individual captured images being positions prior to the second captured image along a time axis of the captured moving image;
combine the history image and the second captured image by writing the second captured image over the history image to generate a composite image;
hold the composite image as a new history image;
combine the new history image and the third captured image by writing the third captured image over the history image to generate a new composite image, the third captured image being positioned subsequent to the second captured image along the time axis of the captured moving image;
sequentially output the composite image and the new composite image; and
sequentially display the composite image and the new composite image.

24. A moving-image playing apparatus comprising:
circuitry configured to:
receive a captured moving image captured by an image capturing apparatus;
calculate, on a basis of a first captured image included in the captured moving image and a second captured image positioned subsequent to the first captured image along a time axis of the captured moving image, transformation information relating to the first captured image and the second captured image;
hold a history image, the history image being a combination of individual captured images including the first captured image, the individual captured images being positioned prior to the second captured image along the time axis of the captured moving image;
transform at least one of the history image and the second captured image on a basis of the calculated transformation information;
accept a selecting operation of selecting an image to be transformed;
combine the history image and the second captured image by writing the second captured image over the history image, at least one of which has been transformed in response to the accepted selecting operation, to generate a composite image;
hold the composite image as a new history image;
combine the new history image and a third captured image by writing the third captured image over the history image to generate a new composite image, the third captured image being positioned subsequent to the second captured image along the time axis of the captured moving image; and
sequentially display the composite image and the new composite image.

25. An image processing apparatus comprising:
circuitry configured to:
receive a captured moving image captured by an image capturing apparatus including a first captured image, second captured image and a third capture image;
store the captured moving image;
calculate, for each of frames constituting the captured moving image, transformation information for transforming, with reference to at least one captured image among captured images constituting the captured moving image, another captured image; and
record the calculated transformation information in association with each of the frames;
hold a history image, the history image being a combination of individual captured images including the first captured image, the individual captured images being positions prior to the second captured image along a time axis of the captured moving image;

combine the history image and the second captured image by writing the second captured image over the history image to generate a composite image;

hold the composite image as a new history image;

combine the new history image and the third captured image by writing the third captured image over the history image to generate a new composite image, the third captured image being positioned subsequent to the second captured image along the time axis of the captured moving image;

output the composite image and the new composite image; and sequentially display the composite image and the new composite image.

26. An image processing apparatus characterized by comprising:

circuitry configured to:

receive a captured moving image captured by an image capturing apparatus including a first captured image, second captured image and a third capture image;

store meta-data relating to the captured moving image;

calculate, for each of frames constituting the captured moving image, transformation information for transforming, with reference to at least one captured image among captured images constituting the captured moving image, another captured image; and record, as the meta-data, the calculated transformation information in association with the captured moving image and the frame;

hold a history image, the history image being a combination of individual captured images including the first captured image, the individual captured images being positions prior to the second captured image along a time axis of the captured moving image;

combine the history image and the second captured image by writing the second captured image over the history image to generate a composite image;

hold the composite image as a new history image;

combine the new history image and the third captured image by writing the third captured image over the history image to generate a new composite image, the third captured image being positioned subsequent to the second captured image along the time axis of the captured moving image; and sequentially display the composite image and the new composite image.

27. The image processing apparatus according to claim 26, wherein the meta-data includes at least position information and posture information described in a coordinate system of the image capturing apparatus.

28. An image processing method comprising:

receiving a captured moving image captured by an image capturing apparatus;

calculating, on a basis of a first captured image included in the captured moving image and a second captured image positioned subsequent to the first captured image along a time axis of the captured moving image, transformation information relating to the first captured image and the second captured image;

holding a history image, the history image being a combination individual captured images including the first captured image, the individual captured images being positioned prior to the second captured image along the time axis of the captured moving image;

transforming at least one of the history image and the second captured image on a basis of the calculated transformation information;

accepting a selecting operation of selecting an image to be transformed;

combining the history image and the second captured image by writing the second captured image over the history image, at least one of which has been transformed in response to the accepted selecting operation, to generate a composite image;

holding the composite image as a new history image;

combining the new history image and a third captured image by writing the third captured image over the history image to generate a new composite image, the third captured image being positioned subsequent to the second captured image along the time axis of the captured moving image; and sequentially displaying the composite image and the new composite image.

29. A non-transitory computer readable storage medium having instructions stored therein, which when executed by a processor in an image processing apparatus causes the processor to perform:

receiving a captured moving image captured by an image capturing apparatus;

calculating, on a basis of a first captured image included in the captured moving image and a second captured image positioned subsequent to the first captured image along a time axis of the captured moving image, transformation information relating to the first captured image and the second captured image;

holding a history image, the history image being a combination individual captured images including the first captured image, the individual captured images being positioned prior to the second captured image along the time axis of the captured moving image;

transforming at least one of the history image and the second captured image on a basis of the calculated transformation information;

accepting a selecting operation of selecting an image to be transformed;

combining the history image and the second captured image by writing the second captured image over the history image, at least one of which has been transformed in response to the accepted selecting operation, to generate a composite image;

holding the composite image as a new history image;

combining the new history image and a third captured image by writing the third captured image over the history image to generate a new composite image, the third captured image being positioned subsequent to the second captured image along the time axis of the captured moving image; and sequentially displaying the composite image and the new composite image.

* * * * *